United States Patent
Mather et al.

(10) Patent No.: US 7,813,042 B2
(45) Date of Patent: Oct. 12, 2010

(54) MULTIPLE-VIEW DIRECTIONAL DISPLAY

(75) Inventors: Jonathan Mather, Greater Leys (GB); Robert Winlow, Meadow (GB); Akira Nakagawa, Matsubara (JP); Diana U. Kean, Watlington (GB); Grant Bourhill, Stow-on-the-Wold (GB)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 11/365,813

(22) Filed: Mar. 2, 2006

(65) Prior Publication Data
US 2007/0058258 A1 Mar. 15, 2007

Related U.S. Application Data

(63) Continuation-in-part of application No. 11/223,206, filed on Sep. 12, 2005.

(51) Int. Cl.
*G02B 27/10* (2006.01)
*G09G 3/04* (2006.01)
*H04N 13/00* (2006.01)

(52) U.S. Cl. .................. 359/619; 345/33; 348/42
(58) Field of Classification Search .................. 359/619, 359/621–623
See application file for complete search history.

(56) References Cited

U.S. PATENT DOCUMENTS

| | | | |
|---|---|---|---|
| 4,404,471 A | | 9/1983 | Winnek et al. |
| 4,957,351 A | * | 9/1990 | Shioji .......................... 349/15 |
| 5,663,831 A | | 9/1997 | Mashitani et al. |
| 5,666,226 A | * | 9/1997 | Ezra et al. ................... 359/621 |
| 5,969,850 A | | 10/1999 | Harrold et al. |
| 6,204,967 B1 | * | 3/2001 | Morishima et al. .......... 359/462 |
| 6,215,594 B1 | * | 4/2001 | Inoguchi et al. ............. 359/619 |
| 6,297,911 B1 | * | 10/2001 | Nishikawa et al. .......... 359/619 |
| 6,459,532 B1 | | 10/2002 | Montgomery et al. |
| 7,139,042 B2 | * | 11/2006 | Nam et al. .................... 349/15 |
| 7,199,845 B2 | | 4/2007 | Koyama et al. |

(Continued)

FOREIGN PATENT DOCUMENTS

GB 2 278 222 A 11/1994

(Continued)

OTHER PUBLICATIONS

U.S. Office Action mailed Oct. 22, 2007 in corresponding U.S. Appl. No. 11/223,206.

(Continued)

*Primary Examiner*—Scott J Sugarman
*Assistant Examiner*—Dawayne A Pinkney
(74) *Attorney, Agent, or Firm*—Nxion & Vanderhye, P.C.

(57) ABSTRACT

A parallax optic comprises plural, spaced apart lenses which are separated by regions which are non-transmissive of/to visible light. In some embodiments, the spaced apart lenses of the parallax optic are discrete elements of a lens array. In other embodiments, the lens elements are formed as convex elements integral with and extending from a lenticular layer. Parallax optic devices are combined with one or more image display elements to form an image display device. For embodiments of image display devices featuring or providing two-dimensional (2D) viewability, the parallax optic is preferably near or included in the image display element. On the other hand, for embodiments of image display devices featuring or providing three-dimensional (3D) viewability, the parallax optic is situated outside the image display element.

20 Claims, 26 Drawing Sheets

U.S. PATENT DOCUMENTS

| | | | |
|---|---|---|---|
| 2002/0001128 A1 | 1/2002 | Moseley et al. | |
| 2003/0107805 A1* | 6/2003 | Street | 359/464 |
| 2003/0137620 A1* | 7/2003 | Wang et al. | 349/95 |
| 2003/0214459 A1* | 11/2003 | Nishihara et al. | 345/6 |
| 2004/0008251 A1 | 1/2004 | Mashitani et al. | |
| 2004/0119896 A1 | 6/2004 | Kean et al. | |
| 2004/0196560 A1* | 10/2004 | Nagasawa et al. | 359/619 |
| 2005/0073577 A1 | 4/2005 | Sudo et al. | |
| 2005/0200781 A1* | 9/2005 | Takatani | 349/122 |
| 2005/0243253 A1 | 11/2005 | Imai et al. | |
| 2006/0098281 A1 | 5/2006 | Fukushima et al. | |
| 2006/0152812 A1* | 7/2006 | Woodgate et al. | 359/619 |
| 2006/0164578 A1 | 7/2006 | Matsumoto et al. | |
| 2006/0238863 A1* | 10/2006 | Saishu | 359/472 |
| 2007/0058127 A1 | 3/2007 | Mather et al. | |

FOREIGN PATENT DOCUMENTS

| | | |
|---|---|---|
| GB | 2 405 542 A | 3/2005 |
| JP | 3-230699 | 10/1991 |
| JP | 7-104212 | 4/1995 |
| JP | 9-50019 A | 2/1997 |
| JP | 10-268230 | 10/1998 |
| WO | WO 99/09750 | 2/1999 |

OTHER PUBLICATIONS

U.S. Office Action mailed Mar. 21, 2008 in co-pending U.S. Appl. No. 11/075,738.

U.S. Appl. No. 12/071,331, filed Feb. 20, 2008, entitled "A Multiple-View Directional Display".

English translation of Chinese Office Action mailed Jul. 11, 2008 in corresponding JP application 200710127494.X.

U.S. Appl. No. 12/440,146, filed Mar. 5, 2009, entitled Image Display Device, Electronic Device, and Parallax Barrier Element.

* cited by examiner

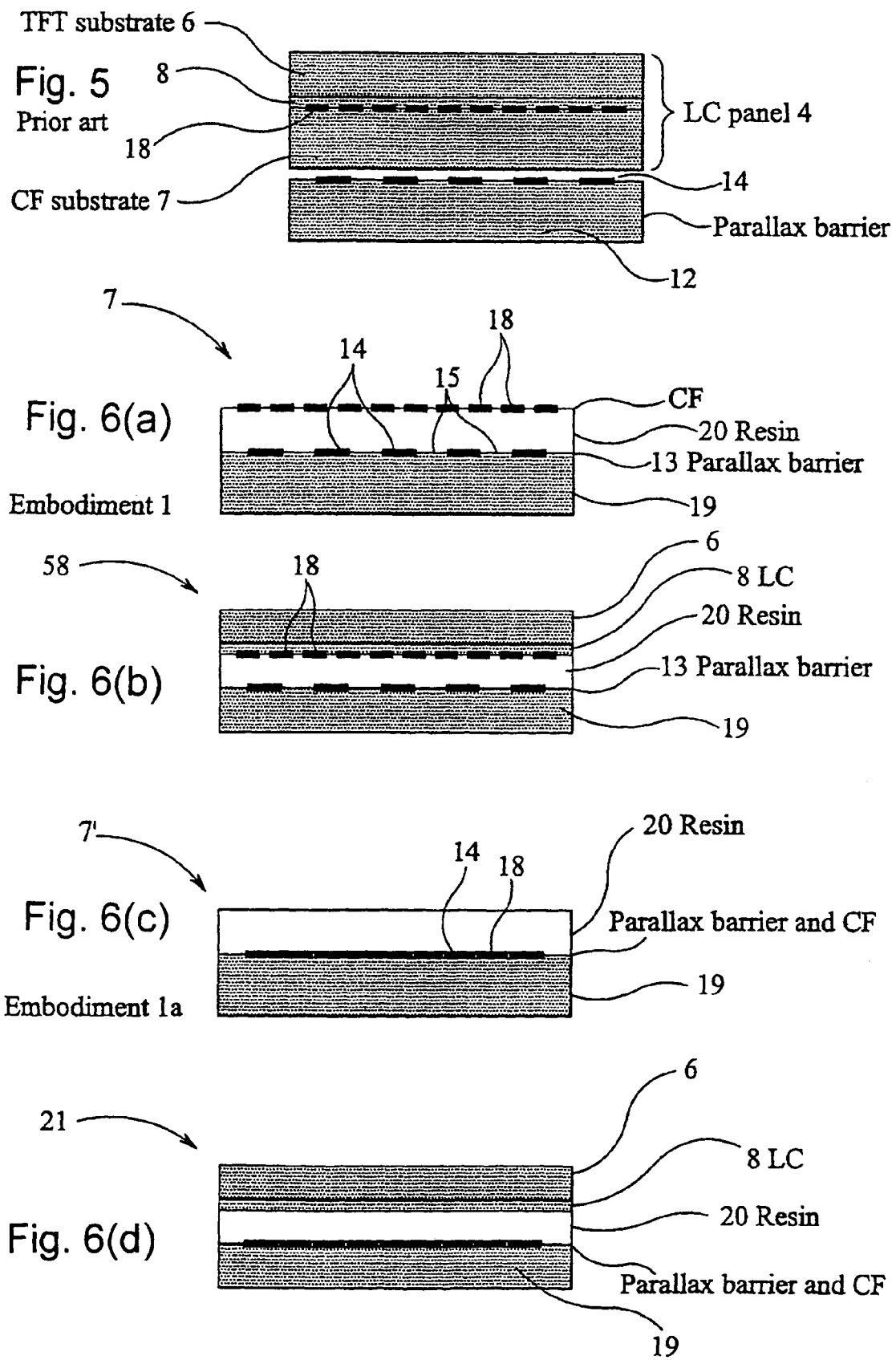

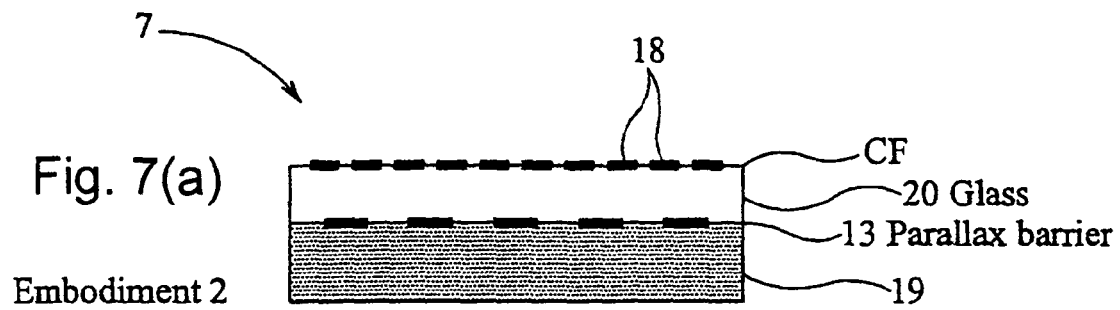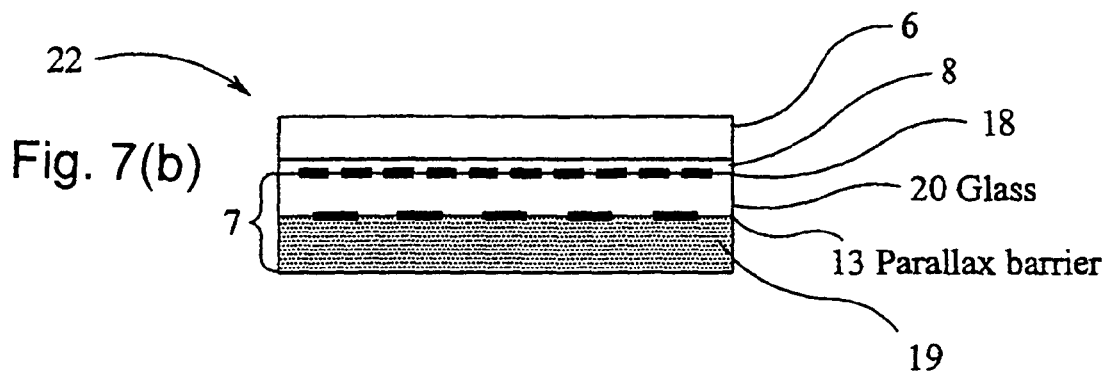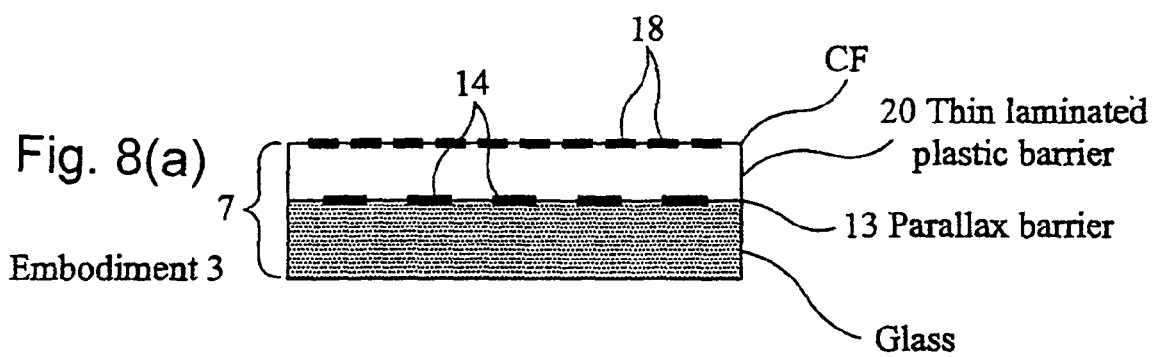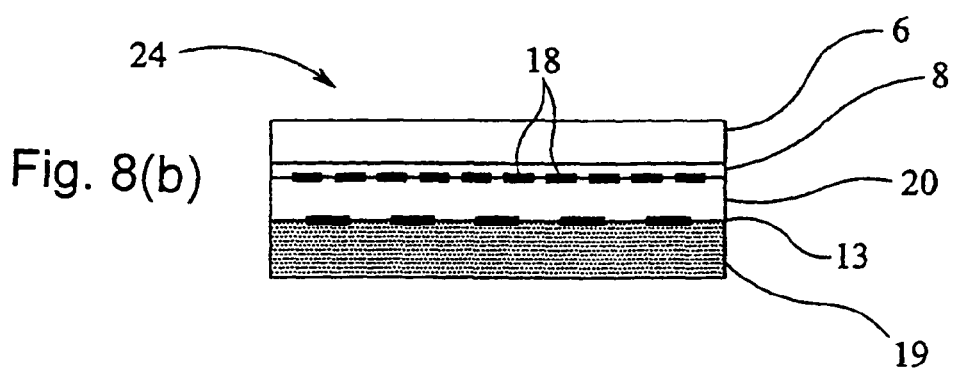

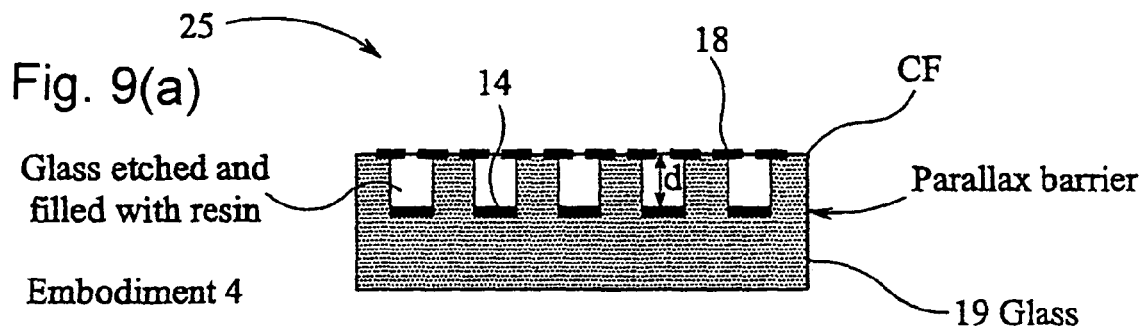
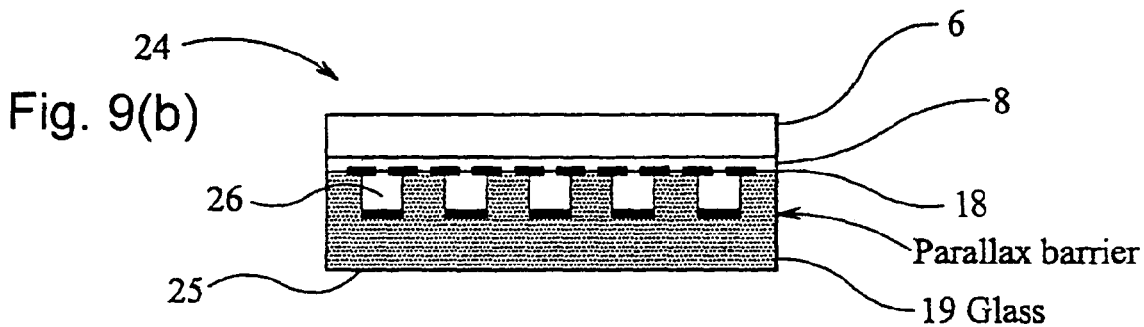
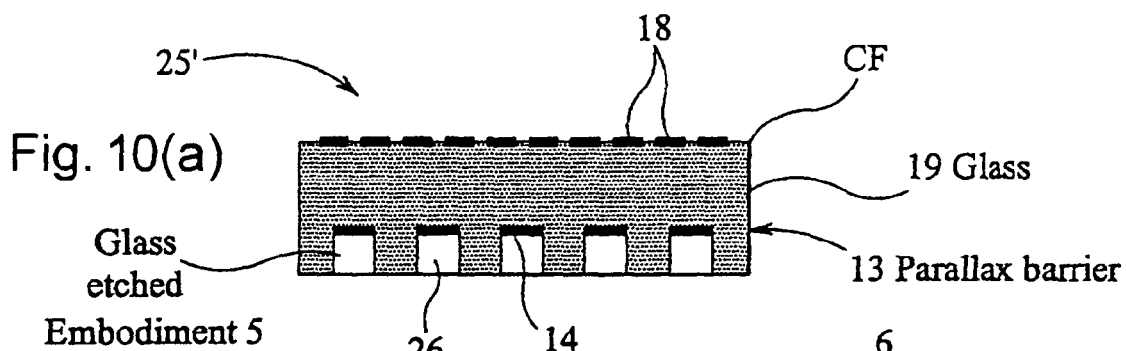
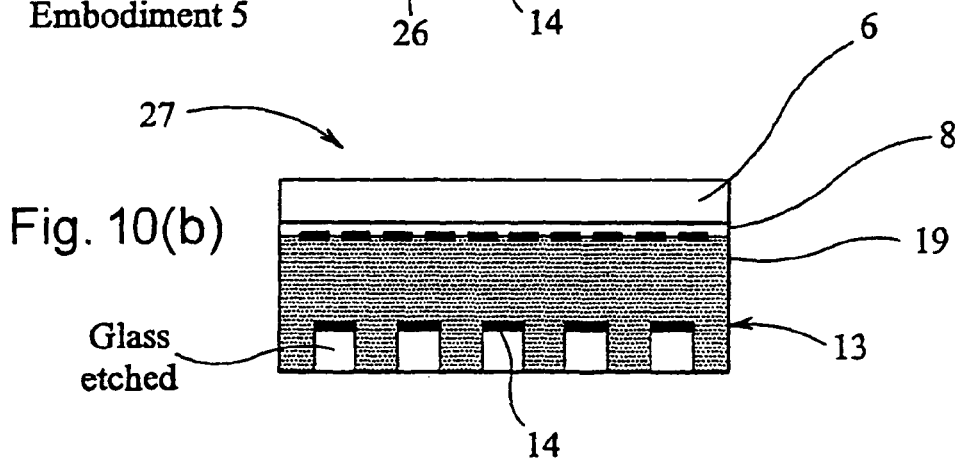

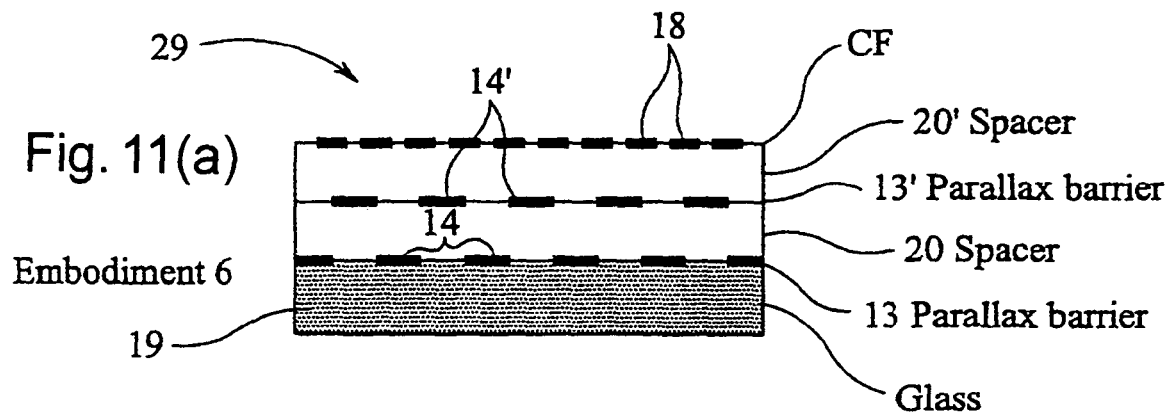
Fig. 11(a) Embodiment 6
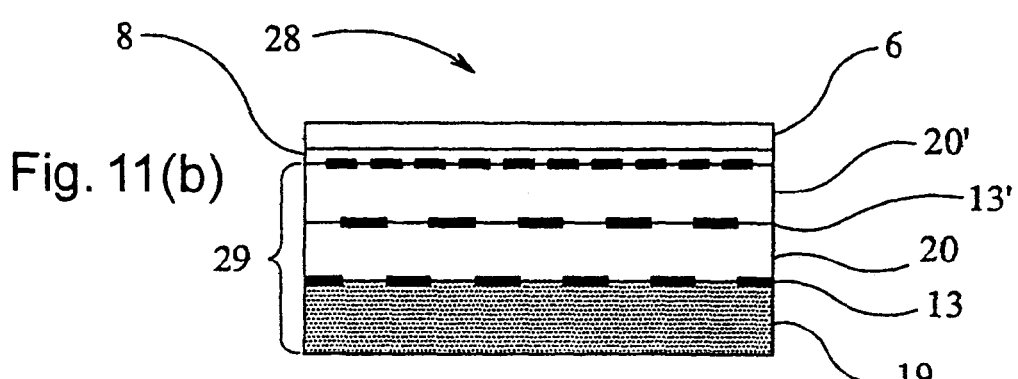
Fig. 11(b)
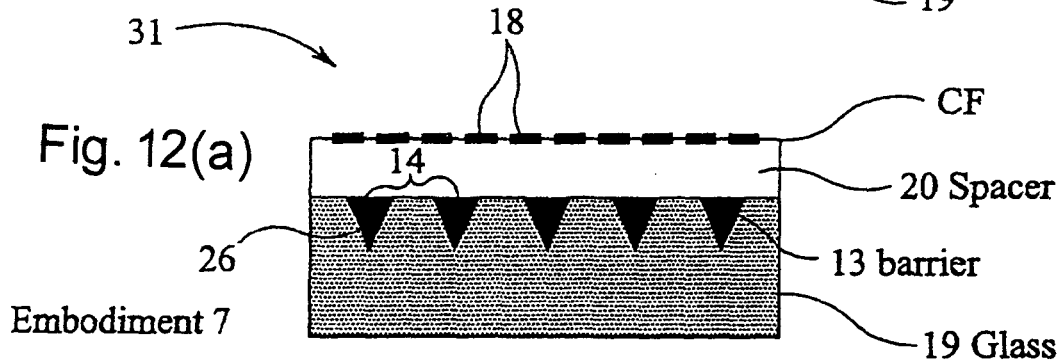
Fig. 12(a) Embodiment 7
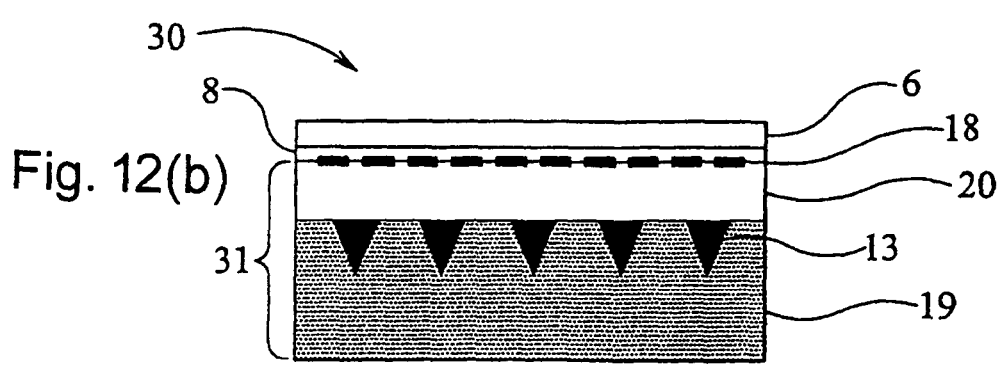
Fig. 12(b)

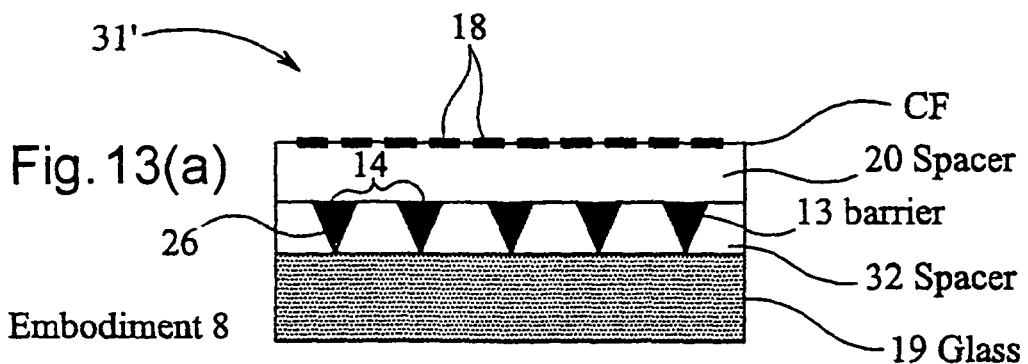
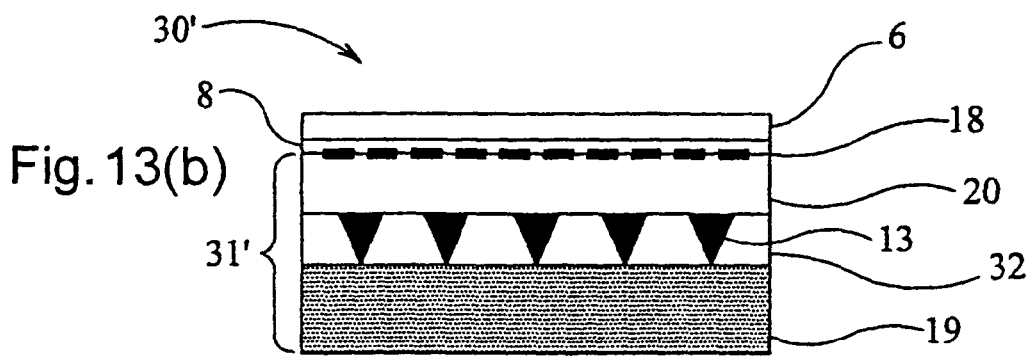
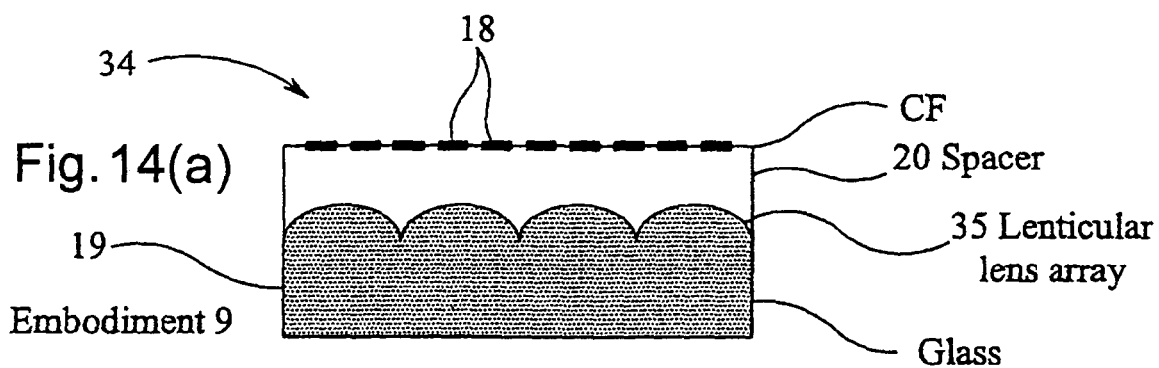
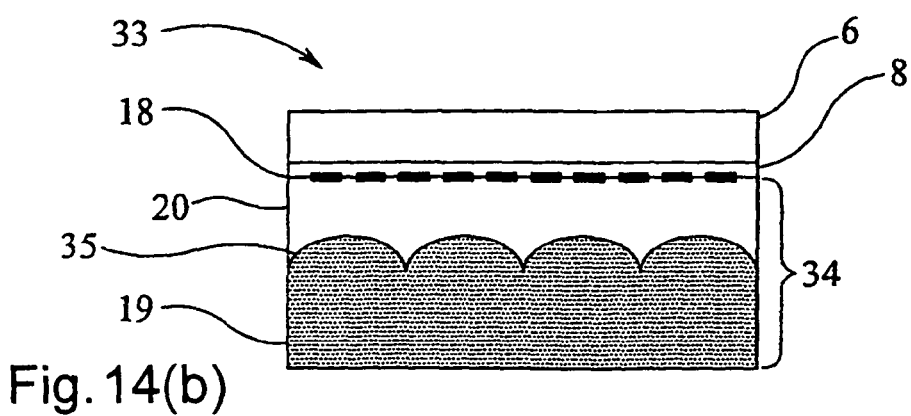

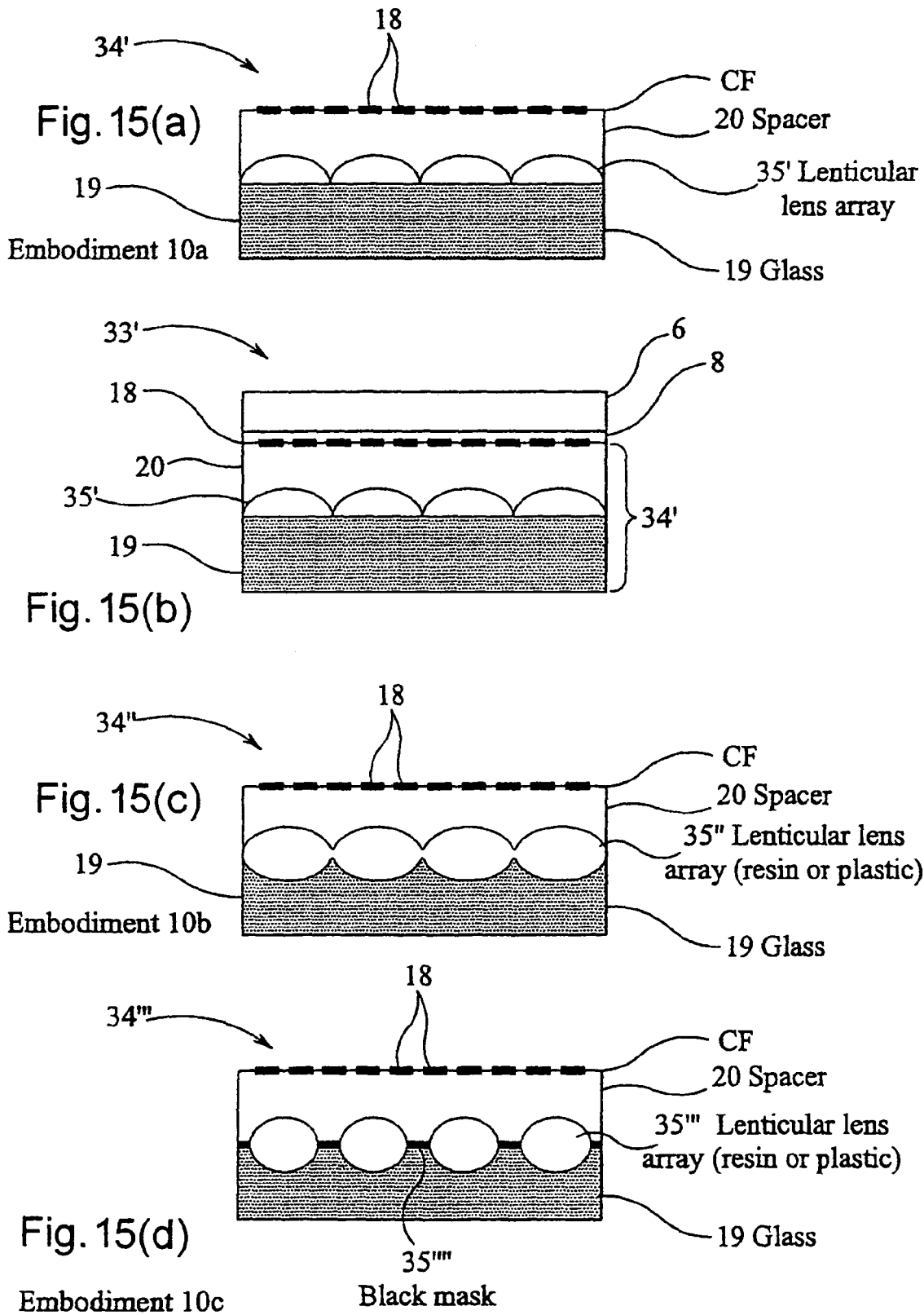

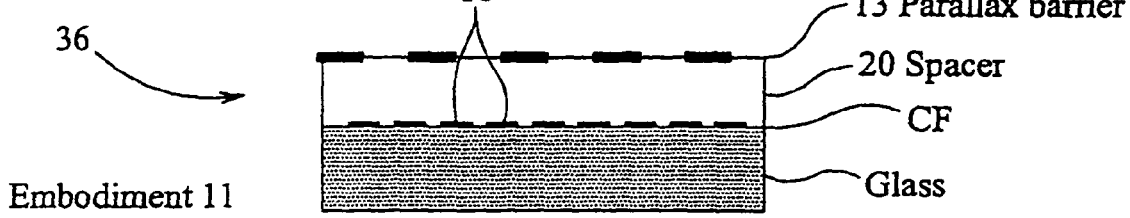
Fig. 16(a) Embodiment 11
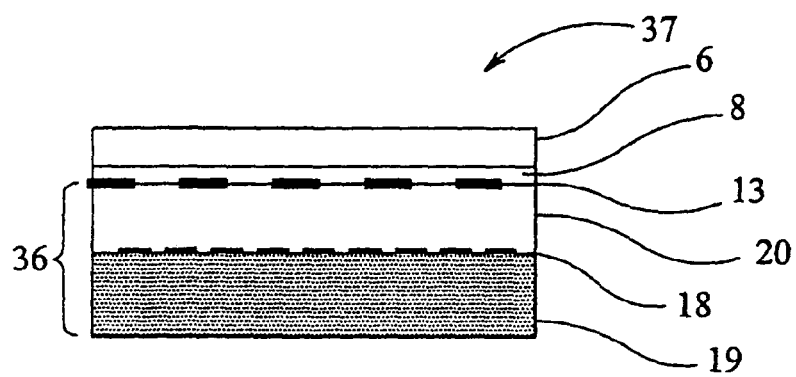
Fig. 16(b)
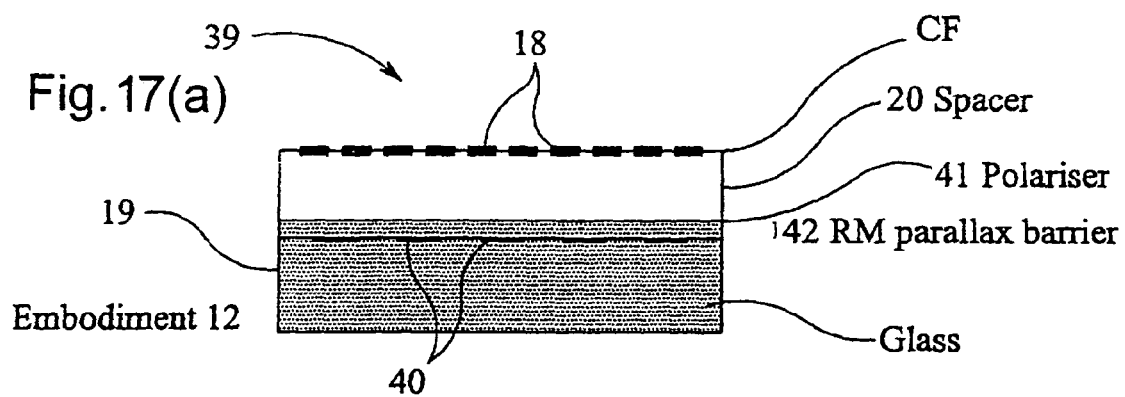
Fig. 17(a) Embodiment 12
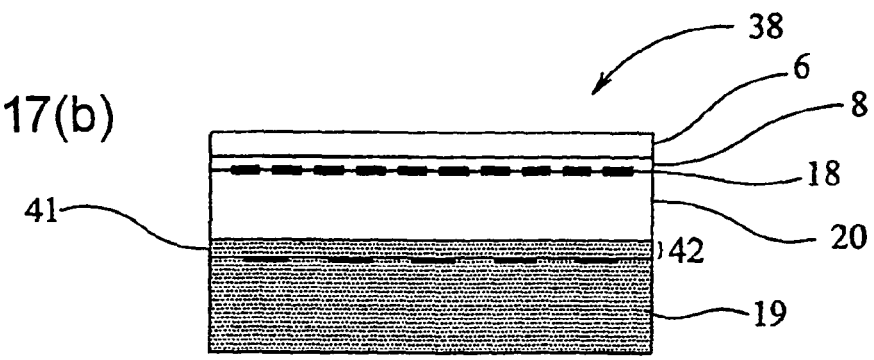
Fig. 17(b)

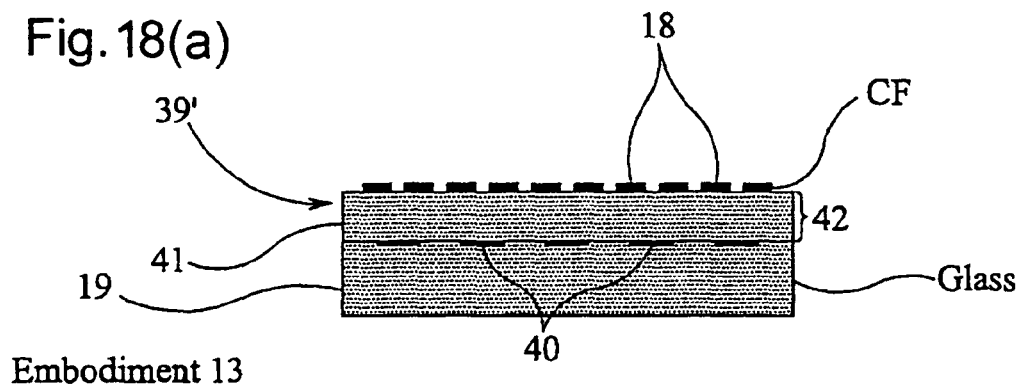
Fig. 18(a) Embodiment 13
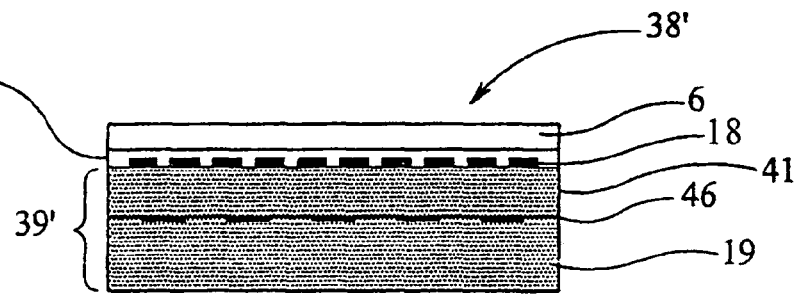
Fig. 18(b)
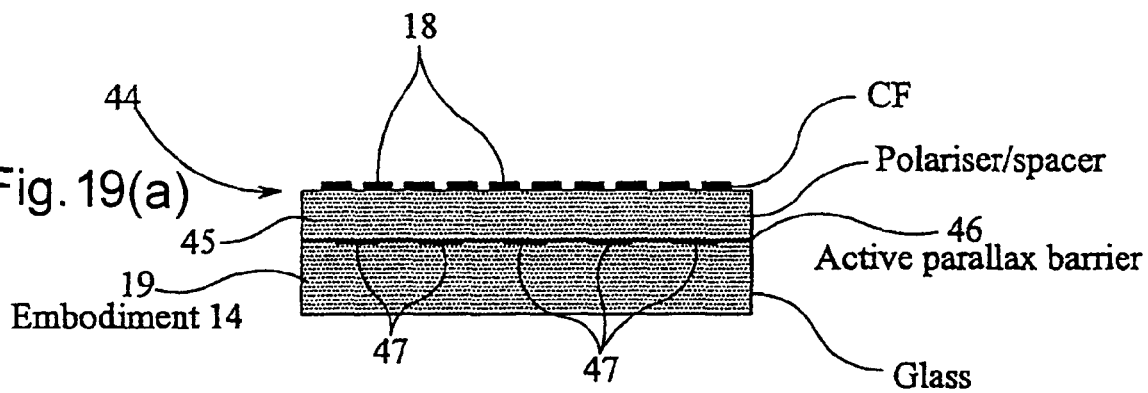
Fig. 19(a) Embodiment 14
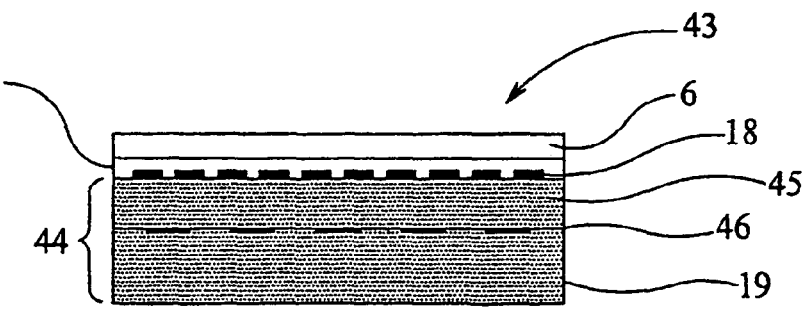
Fig. 19(b)

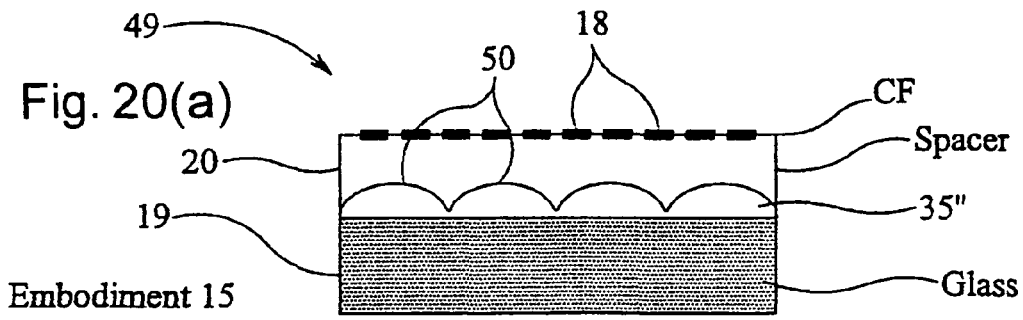
Fig. 20(a) Embodiment 15
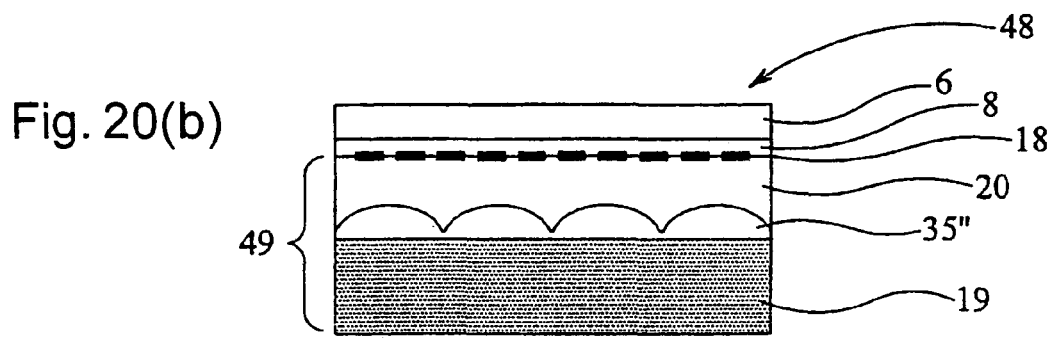
Fig. 20(b)
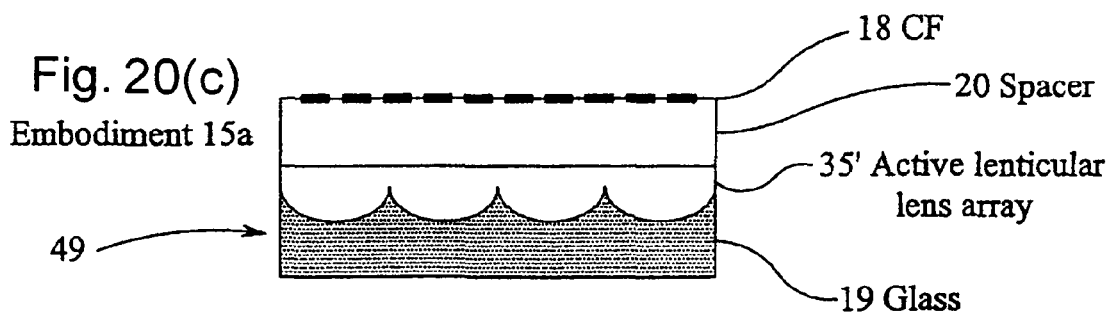
Fig. 20(c) Embodiment 15a
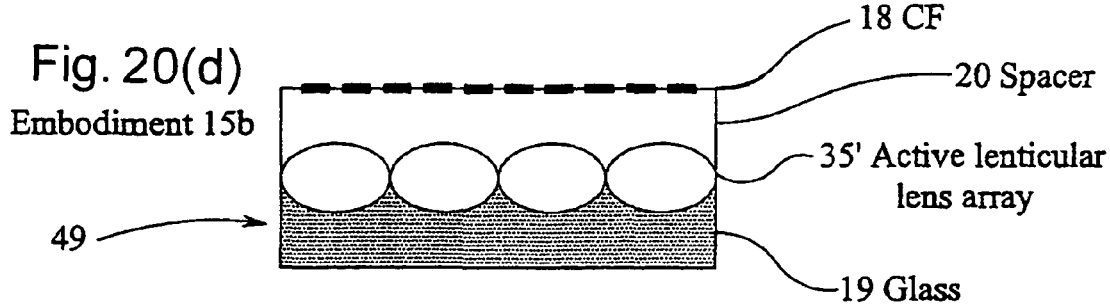
Fig. 20(d) Embodiment 15b

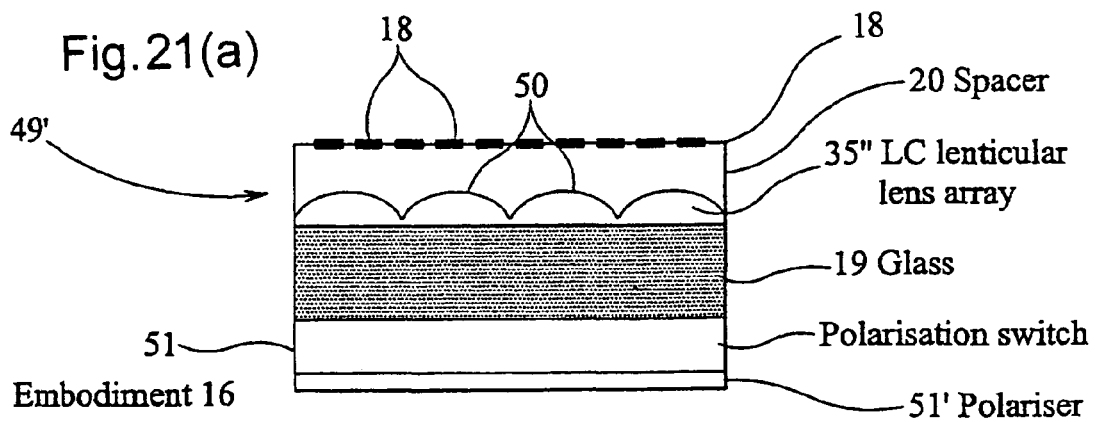
Fig.21(a) Embodiment 16
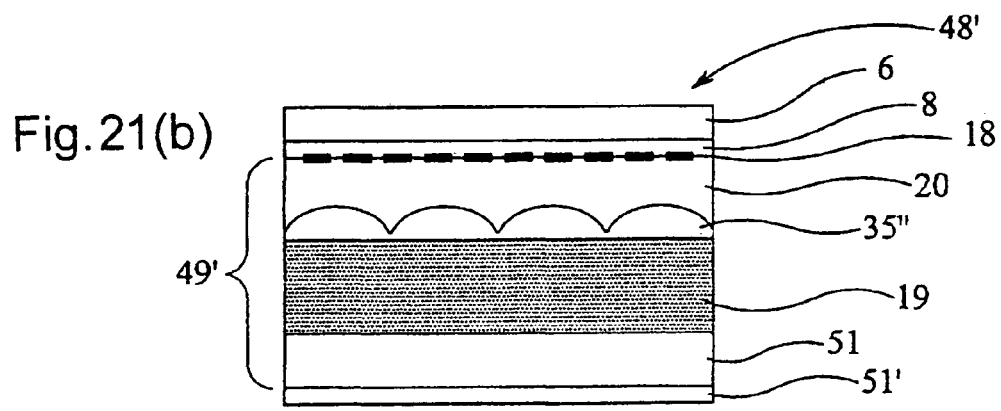
Fig.21(b)
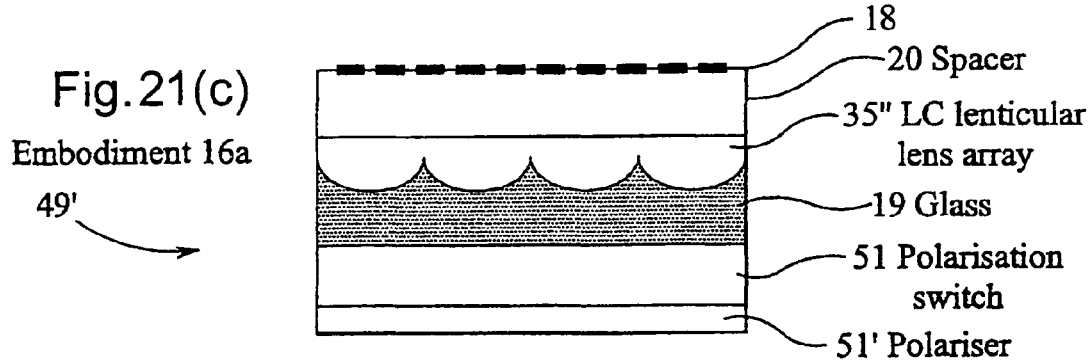
Fig.21(c) Embodiment 16a
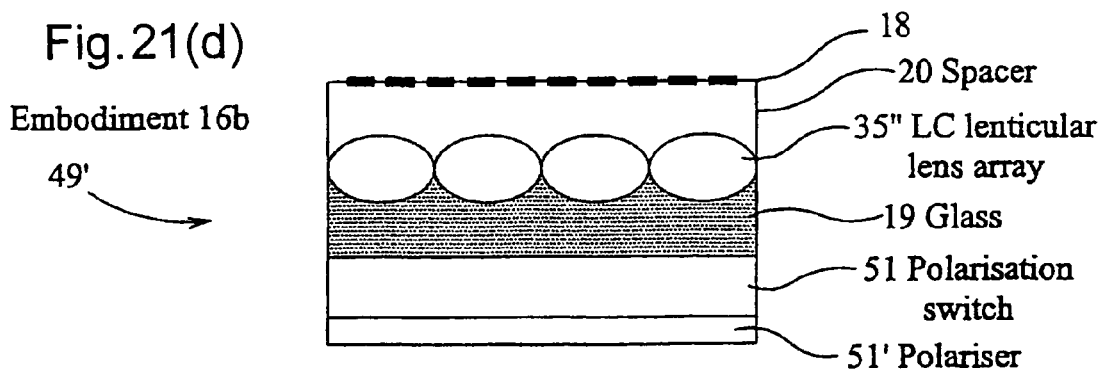
Fig.21(d) Embodiment 16b Embodiment 17

Embodiment 17a

Embodiment 18

Embodiment 19

MULTIPLE-VIEW DIRECTIONAL DISPLAY

This application is a continuation-in-part of U.S. patent application Ser. No. 11/223,206, filed Sep. 12, 2005, entitled "Multiple-View Directional Display", which is incorporated herein by reference in its entirety.

BACKGROUND

1. Field of the Invention

The present invention relates to a multiple-view directional display, which displays two or more images such that each image is visible from a different direction. Thus, two observers who view the display from different directions will see different images to one another. Such a display may be used as, for example, an autostereoscopic display device or a dual view display device. The invention also relates to a parallax barrier substrate, and to a method of manufacturing a multiple-view directional display.

2. Related Art and Other Considerations

For many years conventional display devices have been designed to be viewed by multiple users simultaneously. The display properties of the display device are made such that viewers can see the same good image quality from different angles with respect to the display. This is effective in applications where many users require the same information from the display—such as, for example, displays of departure information at airports and railway stations. However, there are many applications where it would be desirable for individual users to be able to see different information from the same display. For example, in a motor car the driver may wish to view satellite navigation data while a passenger may wish to view a film. These conflicting needs could be satisfied by providing two separate display devices, but this would take up extra space and would increase the cost. Furthermore, if two separate displays were used in this example it would be possible for the driver to see the passenger's display if the driver moved his or her head, which would be distracting for the driver. As a further example, each player in a computer game for two or more players may wish to view the game from his or her own perspective. This is currently done by each player viewing the game on a separate display screen so that each player sees their own unique perspective on individual screens. However, providing a separate display screen for each player takes up a lot of space and is costly, and is not practical for portable games.

To solve these problems, multiple-view directional displays have been developed. One application of a multiple-view directional display is as a 'dual-view display', which can simultaneously display two or more different images, with each image being visible only in a specific direction—so an observer viewing the display device from one direction will see one image whereas an observer viewing the display device from another, different direction will see a different image. A display that can show different images to two or more users provides a considerable saving in space and cost compared with use of two or more separate displays.

Examples of possible applications of multiple-view directional display devices have been given above, but there are many other applications. For example, they may be used in aeroplanes where each passenger is provided with their own individual in-flight entertainment programmes. Currently each passenger is provided with an individual display device, typically in the back of the seat in the row in front. Using a multiple view directional display could provide considerable savings in cost, space and weight since it would be possible for one display to serve two or more passengers while still allowing each passenger to select their own choice of film.

A further advantage of a multiple-view directional display is the ability to preclude the users from seeing each other's views. This is desirable in applications requiring security such as banking or sales transactions, for example using an automatic teller machine (ATM), as well as in the above example of computer games.

A further application of a multiple view directional display is in producing a three-dimensional display. In normal vision, the two eyes of a human perceive views of the world from different perspectives, owing to their different location within the head. These two perspectives are then used by the brain to assess the distance to the various objects in a scene. In order to build a display which will effectively display a three dimensional image, it is necessary to re-create this situation and supply a so-called "stereoscopic pair" of images, one image to each eye of the observer.

Three dimensional displays are classified into two types depending on the method used to supply the different views to the eyes. A stereoscopic display typically displays both images of a stereoscopic image pair over a wide viewing area. Each of the views is encoded, for instance by color, polarization state, or time of display. The user is required to wear a filter system of glasses that separate the views and let each eye see only the view that is intended for it.

An autostereoscopic display displays a right-eye view and a left-eye view in different directions, so that each view is visible only from respective defined regions of space. The region of space in which an image is visible across the whole of the display active area is termed a "viewing window". If the observer is situated such that their left eye is in the viewing window for the left eye view of a stereoscopic pair and their right eye is in the viewing window for the right-eye image of the pair, then a correct view will be seen by each eye of the observer and a three-dimensional image will be perceived. An autostereoscopic display requires no viewing aids to be worn by the observer.

An autostereoscopic display is similar in principle to a dual-view display. However, the two images displayed on an autostereoscopic display are the left-eye and right-eye images of a stereoscopic image pair, and so are not independent from one another. Furthermore, the two images are displayed so as to be visible to a single observer, with one image being visible to each eye of the observer.

For a flat panel autostereoscopic display, the formation of the viewing windows is typically due to a combination of the picture element (or "pixel") structure of the image display unit of the autostereoscopic display and an optical element, generically termed a parallax optic. An example of a parallax optic is a parallax barrier, which is a screen with transmissive regions, often in the form of slits, separated by opaque regions. This screen can be set in front of or behind a spatial light modulator (SLM) having a two-dimensional array of picture elements to produce an autostereoscopic display.

FIG. 1 is a plan view of a conventional multiple view directional device, in this case an autostereoscopic display. The directional display 1 consists of a spatial light modulator (SLM) 4 that constitutes an image display device, and a parallax barrier 5. The SLM of FIG. 1 is in the form of a liquid crystal display (LCD) device having an active matrix thin film transistor (TFT) substrate 6, a counter-substrate 7, and a liquid crystal layer 8 disposed between the substrate and the counter substrate. The SLM is provided with addressing electrodes (not shown) which define a plurality of independently-addressable picture elements, and is also provided with alignment layers (not shown) for aligning the liquid crystal layer.

Viewing angle enhancement films 9 and linear polarizers 10 are provided on the outer surface of each substrate 6, 7. Illumination 11 is supplied from a backlight (not shown).

The parallax barrier 5 comprises a substrate 12 with a parallax barrier aperture array 13 formed on its surface adjacent the SLM 4. The aperture array comprises vertically extending (that is, extending into the plane of the paper in FIG. 1) transparent apertures 15 separated by opaque portions 14. An anti-reflection (AR) coating 16 is formed on the opposite surface of the parallax barrier substrate 12 (which forms the output surface of the display 1).

The pixels of the SLM 4 are arranged in rows and columns with the columns extending into the plane of the paper in FIG. 1. The pixel pitch (the distance from the centre of one pixel to the centre of an adjacent pixel) in the row or horizontal direction being p. The width of the vertically-extending transmissive slits 15 of the aperture array 13 is 2w and the horizontal pitch of the transmissive slits 15 is b. The plane of the barrier aperture array 13 is spaced from the plane of the liquid crystal layer 8 by a distances.

In use, the display device 1 forms a left-eye image and a right-eye image, and an observer who positions their head such that their left and right eyes are coincident with the left-eye viewing window 2 and the right-eye viewing window 3 respectively will see a three-dimensional image. The left and right viewing windows 2,3 are formed in a window plane 17 at the desired viewing distance from the display. The window plane is spaced from the plane of the aperture array 13 by a distance $r_o$. The windows 2,3 are contiguous in the window plane and have a pitch e corresponding to the average separation between the two eyes of a human. The half angle to the centre of each window 10, 11 from the normal axis to the display normal is $\alpha_s$.

The pitch of the slits 15 in the parallax barrier 5 is chosen to be close to an integer multiple of the pixel pitch of the SLM 4 so that groups of columns of pixels are associated with a specific slit of the parallax barrier. FIG. 1 shows a display device in which two pixel columns of the SLM 4 are associated with each transmissive slit 15 of the parallax barrier.

FIG. 2 shows the angular zones of light created from an SLM 4 and parallax barrier 5 where the parallax barrier has a pitch of an exact integer multiple of the pixel column pitch. In this case, the angular zones coming from different locations across the display panel surface intermix and a pure zone of view for image 1 or image 2 (where 'image 1' and 'image 2' denote the two images displayed by the SLM 4) does not exist. In order to address this, the pitch of the parallax barrier is preferably reduced slightly so that it is slightly less than an integer multiple of the pixel column pitch. As a result, the angular zones converge at a pre-defined plane (the "window plane") in front of the display. This effect is illustrated in FIG. 3 of the accompanying drawings, which shows the image zones created by an SLM 4 and a modified parallax barrier 5'. The viewing regions, when created in this way, are roughly kite-shaped in plan view.

FIG. 4 is a plan view of another conventional multiple view directional display device 1'. This corresponds generally to the display device 1 of FIG. 1, except that the parallax barrier 5 is placed behind the SLM 4, so that it is between the backlight and SLM 4. This device may have the advantages that the parallax barrier is less visible to an observer, and that the pixels of the display appear to be closer to the front of the device. Furthermore, although FIGS. 1 and 4 each show a transmissive display device illuminated by a backlight, reflective devices that use ambient light (in bright conditions) are known. In the case of a transflective device, the rear parallax barrier of FIG. 4 will absorb none of the ambient lighting. This is an advantage if the display has a 2D mode that uses reflected light.

In the display devices of FIGS. 1 and 4, a parallax barrier is used as the parallax optic. Other types of parallax optic are known. For example, lenticular lens arrays may be used to direct interlaced images in different directions, so as to form a stereoscopic image pair or to form two or more images, each seen in a different direction.

Holographic methods of image splitting are known, but in practice these methods suffer from viewing angle problems, pseudoscopic zones and a lack of easy control of the images.

Another type of parallax optic is a micropolarizer display, which uses a polarized directional light source and patterned high precision micropolarizer elements aligned with the pixels of the SLM. Such a display offers the potential for high window image quality, a compact device, and the ability to switch between a 2D display mode and a 3D display mode. The dominant requirement when using a micropolarizer display as a parallax optic is the need to avoid parallax problems when the micropolarizer elements are incorporated into the SLM.

Where a color display is required, each pixel of the SLM 4 is generally given a filter associated with one of the three primary colors. By controlling groups of three pixels, each with a different color filter, many visible colors may be produced. In an autostereoscopic display each of the stereoscopic image channels must contain sufficient of the color filters for a balanced color output. Many SLMs have the color filters arranged in vertical columns, owing to ease of manufacture, so that all the pixels in a given column have the same color filter associated with them. If a parallax optic is disposed on such an SLM with three pixel columns associated with each slit or lenslet of the parallax optic, then each viewing region will see pixels of one color only. Care must be taken with the color filter layout to avoid this situation. Further details of suitable color filter layouts are given in EP-A-0 752 610.

The function of the parallax optic in a directional display device such as those shown in FIGS. 1 and 4 is to restrict light transmitted through the pixels of the SLM 4 to certain output angles. This restriction defines the angle of view of each of the pixel columns behind a given element of the parallax optic (such as for example a transmissive slit). The angular range of view of each pixel is determined by the pixel pitch p, the separation s between the plane of the pixels and the plane of the parallax optic, and the refractive index n of the material between the plane of the pixels and the plane of the parallax optic (which in the display of FIG. 1 is the substrate 7). H Yamamoto et al. show, in "Optimum parameters and viewing areas of stereoscopic full-color LED displays using parallax barrier", IEICE Trans. Electron., vol. E83-C, No. 10, p 1632 (2000), that the angle of separation between images in an autostereoscopic display depends on the distance between the display pixels and the parallax barrier.

The half-angle α of FIG. 1 or 4 is given by:

$$\sin\alpha = n\sin\left(\arctan\left(\frac{p}{2s}\right)\right) \tag{1}$$

One problem with many existing multiple view directional displays is that the angular separation between the two images is too low. In principle, the angle 2α between viewing windows may be increased by increasing the pixel pitch p, decreasing the separation between the parallax optic and the pixels s or by increasing the refractive index of the substrate n.

Acknowledgement of the Prior Art

Co-pending UK patent application No. 0315171.9 describes a novel pixel structures for use with standard parallax barriers which provides a greater angular separation between the viewing windows of a multiple-view directional display. However, it would be desirable to be able to use a standard pixel structure in a multiple-view directional display.

Co-pending UK patent application Nos. 0306516.6 and 0315170.1 propose increasing the angle of separation between the viewing windows of a multiple-view directional display by increasing the effective pitch of the pixels.

JP-A-7 28 015 propose increasing the pixel pitch and therefore the angular separation between viewing windows of a multiple-view directional display by rotating the pixel configuration such that the color sub pixels run horizontally rather than vertically. This results in a threefold increase in pixel width and therefore roughly three times increase in viewing angle. This has the disadvantage that the pitch of the parallax barrier pitch must increase as the pixel pitch increases which, in turn, increases the visibility of the parallax barrier to an observer. The manufacture and driving of such a non-standard panel may not be cost effective. In addition there may be applications in which the increase in viewing angle needs to be greater than three times the standard configuration and in these cases simply rotating the pixels will not be sufficient. This is often the case with high resolution panels.

In general, however, the pixel pitch is typically defined by the required resolution specification of the display device and therefore cannot be changed.

It is not always practical or cost effective significantly to change the refractive index of the substrates, which are normally made of glass.

Other attempts at increasing the angular separation between the viewing windows of a multiple-view directional display device have attempted to reduce the separation between the parallax optic and the plane of the pixels of the SLM. However, this has been difficult as will be explained with respect to FIG. 5, which is a schematic block view of the display device 1 of FIG. 1 with an LCD as the SLM 4.

The LCD panel which forms the SLM 4 is made from two glass substrates. The substrate 6 carries TFT switching elements for addressing the pixels of the SLM, and is therefore known as a "TFT substrate". It will in general also carry other layers for, for example, aligning the liquid crystal layer 8 and allowing electrical switching of the liquid crystal layer. On the other substrate 7 (corresponding to the counter substrate of FIG. 1) color filters 18 are formed, together with other layers for, for example, aligning the liquid crystal layer. The counter substrate 7 is therefore generally known as a "color filter substrate" or CF substrate. The LCD panel is formed by placing the color filter substrate opposite to the TFT substrate, and sandwiching the liquid crystal layer 8 between the two substrates. In previous directional displays the parallax optic has been adhered to the completed LCD panel as shown in FIG. 5. The distance between the LCD pixels and the parallax optic is determined primarily by the thickness of the CF substrate of the LCD. Reducing the thickness of the CF substrate will reduce the distance between the LCD pixels and the parallax optic, but will make the substrate correspondingly weaker. A realistic minimum for LC substrate thickness is about 0.5 mm, but the pixel-to-parallax optic separation would still be too large for many applications if a parallax optic were adhered to a substrate of this thickness.

Japanese Patent No. 9-50 019 discloses a method for increasing the angular separation between the viewing windows of a multiple-view directional display device thereby to decrease viewing distance. This patent proposes reducing the thickness between the LC and barrier. This is done by constructing the stereoscopic LCD panel with the following order of components: LCD panel, parallax barrier, polarizer. Previously the order had been: LCD panel, polarizer, parallax barrier, as shown in FIG. 1. This reduces the separation between the parallax barrier and the pixel plane by the thickness of the polarizer, but this results in only a limited increase in the angular separation between the viewing windows of a multiple-view directional display device.

GB 2 278 222 discloses a spatial light modulator in which a microlens array is disposed close to a liquid crystal layer to prevent the occurrence of second order imaging at high angles of incidence.

GB 2 296 099 discloses a spatial light modulator in which elements such as polarizers and a half wave plate 32 are disposed between the two substrates of a spatial light modulator. This is done to avoid the need to use highly isotropic substrates, so that cheaper and lighter plastics substrates can be used. If a polarizer is disposed outside a spatial light modulator it is necessary for the substrates of the spatial light modulator to be highly isotropic to prevent the substrates from causing changes in the polarization direction of light passing through the substrates.

U.S. Pat. No. 5,831,765 discloses a directional display which has a liquid crystal panel and a parallax barrier. The parallax barrier is not disposed within the liquid crystal panel; the parallax barrier is outside the liquid crystal panel and is separated from liquid crystal layer by a diffuser as well as by a substrate of the liquid crystal panel.

U.S. Pat. No. 4,404,471 discloses a lenticular film for use with X-rays. Mercury, lead or tungsten powder, or other flowable X-ray absorbing material is introduced into recesses in an X-ray transmissive material.

SUMMARY

A multiple view directional display has an image display element and a parallax optic, wherein the image display element comprises: a first substrate; a second substrate; and an image display layer sandwiched between the first substrate and the second substrate. In at least some embodiments, the parallax optic is disposed within the image display element to put the parallax optic closer to the image display layer, thereby reducing the separation s of equation (1) and increasing the angular separation between two viewing windows produced by the display device.

In other embodiments, the parallax optic need not be provided within an image display element.

According to one aspect of the technology, a parallax optic is provided which comprises plural spaced apart lenses, the lenses being arranged in an array in an array plane and spaced apart within the array plane. Preferably the spaced apart lenses are separated by regions in the array plane which are non-transmissive to visible light. The regions which are non-transmissive to visible light can be filled with light-absorptive material or light reflecting material or both. The regions which are non-transmissive to visible light can be, for example, black mask regions (e.g., regions occupied by a light non-transmissive mask).

In some example embodiments, the lenticules are spaced apart discrete lenses, while in other example embodiments, the lenticules are formed as convex elements on a lenticule layer, with regions between the convex elements being covered with or carrying a mask to form the regions which are non-transmissive to visible light.

In differing implementations, the lenses can diversely configured, such as convexo-convex or plano-convex, to name two examples.

In one example configuration, the lenses are formed in an array. At least one parameter of each lens of the array is chosen for controlling f-number for the array. Preferably one or more of the following parameters for the lens array is chosen for controlling f-number for the array: lens radius, lens width, lens refractive index.

According to another aspect of the technology, a parallax optic is combined with an image display element in an image display device for providing multiple-view directionality. In some example embodiments of an image display device, the parallax optic is disposed within the image display element. In yet other example embodiments of an image display device, the parallax optic is situated outside the image display element.

BRIEF DESCRIPTION OF THE DRAWINGS

Preferred embodiments of the technology will now be described by way of illustrative example with reference to the accompanying figures in which:

FIG. 5 is a schematic plan view showing the principle components of a conventional multiple-view directional display device;

FIGS. 6(a) and 6(b) illustrate a display according to a first example embodiment;

FIGS. 6(c) and 6(d) illustrate a display according to a further example embodiment;

FIGS. 7(a) and 7(b) illustrate a display according to a further example embodiment;

FIGS. 8(a) and 8(b) illustrate a display according to a further example embodiment;

FIGS. 9(a) and 9(b) illustrate a display according to a further example embodiment;

FIGS. 10(a) and 10(b) illustrate a display according to a further example embodiment;

FIGS. 11(a) and 11(b) illustrate a display according to a further example embodiment;

FIGS. 12(a) and 12(b) illustrate a display according to a further example embodiment;

FIGS. 13(a) and 13(b) illustrate a display according to a further example embodiment;

FIGS. 14(a) and 14(b) illustrate a display according to a further example embodiment;

FIGS. 15(a) and 15(b) illustrate a display according to a further example embodiment;

FIGS. 15(c) and 15(d) illustrate color filter substrates of displays according to further embodiments of the invention;

FIGS. 16(a) and 16(b) illustrate a display according to a further example embodiment;

FIGS. 17(a) and 17(b) illustrate a display according to a further example embodiment;

FIGS. 18(a) and 18(b) illustrate a display according to a further example embodiment;

FIGS. 19(a) and 19(b) illustrate a display according to a further example embodiment;

FIGS. 20(a) and 20(b) illustrate a display according to a further example embodiment;

FIGS. 20(c) and 20(d) illustrate color filter substrates of displays according to further embodiments of the invention;

FIGS. 21(a) and 21(b) illustrate a display according to a further example embodiment;

FIGS. 21(c) and 21(d) illustrate color filter substrates of displays according to further embodiments of the invention;

Like reference numerals denote like components throughout the drawings.

DETAILED DESCRIPTION OF THE DRAWINGS

Figure 1:
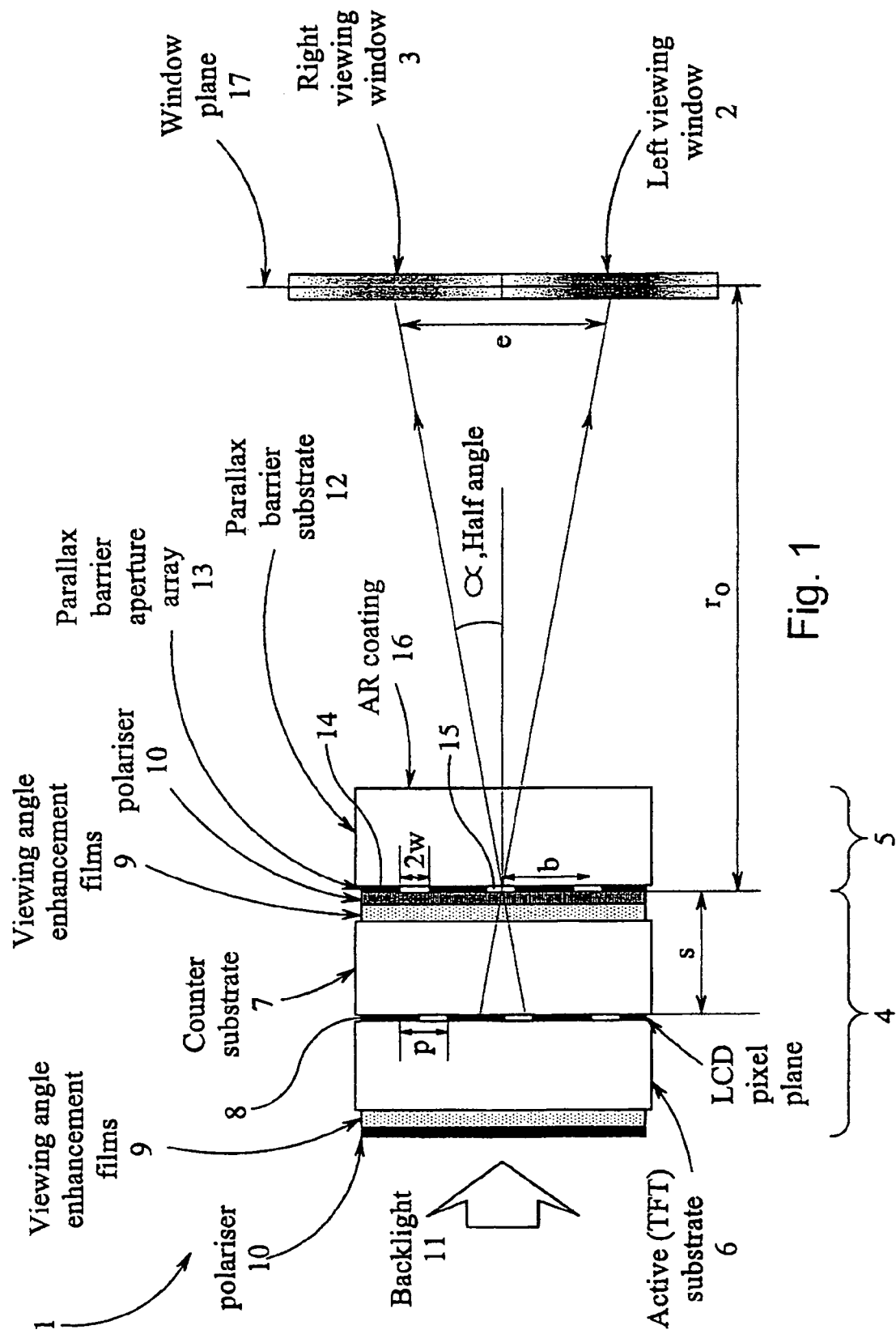
FIG. 1 is a schematic plan view of a conventional auto-stereoscopic display device.
Figure 2:
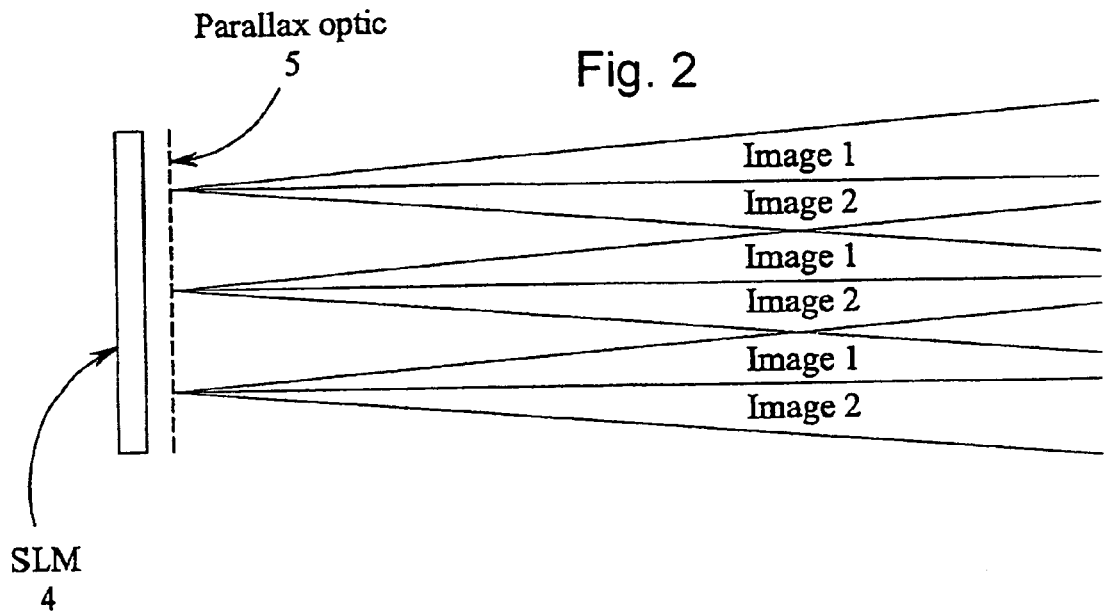
FIG. 2 is a schematic illustration of viewing windows provided by a conventional multiple-view display device.
Figure 3:
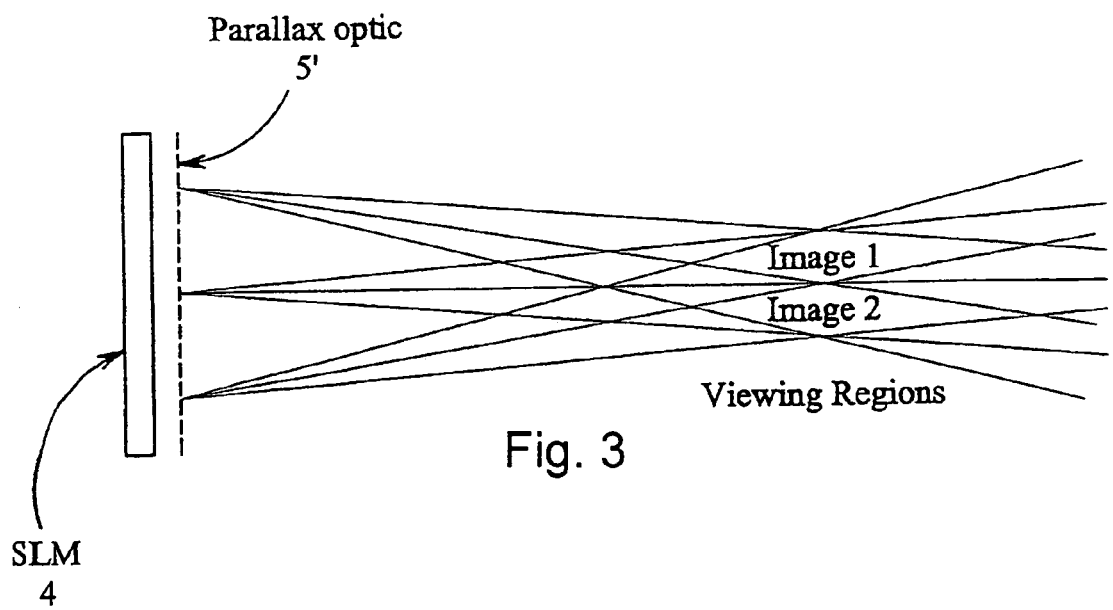
FIG. 3 is a schematic plan view of viewing windows produced by another conventional multiple-view directional display device.

FIG. 6(b) is a schematic plan view of a multiple-view directional display according to a first example embodiment. The display device 58 comprises a first transparent substrate 6 and a second transparent substrate 7, with an image display layer 8 disposed between the first substrate 6 and the second substrate 7. An array of color filters 18 is provided on the second substrate 7, and the second substrate will therefore be referred to as a color filter substrate.

The first substrate 6 is provided with pixel electrodes (not shown) for defining an array of pixels in the image display layer 8, and is also provided with switching elements (not shown) such as thin film transistors (TFTs) for selectively addressing the pixel electrodes. The substrate 6 will be referred to as a 'TFT substrate'.

The image display layer 8 is, in this example, a liquid crystal layer 8. The invention is not limited to this, however, and any transmissive image display layer may be used. Moreover, where the display is used in a "front barrier mode", with the parallax optic disposed between the image display layer and an observer, the display layer may alternatively be an emissive display layer such as a plasma display or an organic light-emitting device (OLED) layer.

The display 58 is assembled such that the color filters 18 are each substantially opposite a respective pixel of the image display layer 8. Other components such as alignment layers may be disposed on the surfaces of the substrate 6, 7 adjacent to the image display layer, and a counter electrode or electrodes may also be disposed on the CF substrate 7; these components are conventional, and will not be described further. Furthermore, the display 58 may comprise further components such as polarizers, viewing-angle enhancement films, anti-reflection films etc., disposed outside the image display element; these components are also conventional and will not be described further.

The color filter substrate 7 is shown in more detail in FIG. 6(a). The color filter substrate 7 comprises a base substrate 19 made of a light-transmissive material such as glass. A parallax barrier aperture array 13 is disposed on one principal surface of the base substrate 19. In the embodiment of FIG. 6(a) the parallax barrier aperture array 13 is formed by depositing opaque strips 14 on the surface of the base substrate, thereby defining transmissive slits 15 between the opaque strips.

The color filter substrate further comprises a spacer layer 20, in this embodiment formed of light-transmissive resin, provided over the parallax barrier aperture array 13. Thus, the parallax barrier aperture array is disposed within the thickness of the substrate 7. Finally, the color filters 18 are disposed on the upper surface of the spacer layer 20.

In this embodiment, the parallax barrier aperture array 13 is separated from the pixels of the liquid crystal layer 8 by the thickness of the resin spacer layer 20. The resin layer 20 can be made very thin, so that the separation s of equation (1) is small leading to a large angular separation of the viewing windows. Although the resin layer 20 is shown as a single layer, in practice it may be necessary to deposit two or more separate resin layers in order to obtain a spacer layer having the desired thickness. For example, the layer 20 may have a thickness of 50 microns and may comprise polyethylene perephthalate.

FIG. 6(d) is a schematic plan views of display 21 according to a further example embodiment, and FIG. 6(c) shows the counter substrate of this display. Only the differences between this embodiment and the previous embodiment will be described.

In this embodiment, the parallax barrier aperture array 13 and the color filters 18 are both disposed on a first principal surface of the base substrate 19 of the color filter substrate 7'. The spacer layer 20 of the color filter substrate, again formed of resin, is then disposed over the parallax barrier aperture array 13 and the array of color filters. Thus, the parallax barrier aperture array is disposed within the thickness of the substrate 7'. Again, the parallax barrier aperture array 13 is separated from the pixels in the liquid crystal layer 8 by the thickness of the resin layer 20, and this can be made small. The array of color filters is similarly separated from the liquid crystal layer 8 and no additional array of color filters is needed at the said liquid crystal layer. Providing the parallax barrier and color filters in the same plane simplifies the manufacture of the display.

The resin layer 20 of FIGS. 6(a) to 6(d) is easy to manufacture with a uniform thickness. The layer may be deposited by, for example, spin-coating or printing.

FIG. 7(b) is a plan view of a display 22 according to a further example embodiment, and FIG. 7(a) shows the color filter substrate of the display 22. Only the differences between this embodiment and the first embodiment will be described.

In the embodiment of FIGS. 7(a) and 7(b) the parallax barrier aperture array 13 is deposited on a principal surface of the base substrate 19. The color filter substrate 7 further comprises a spacer layer 20 placed over the parallax barrier aperture array 13 and the array of color filters is disposed over the spacer layer 20. Thus, the parallax barrier aperture array is disposed within the thickness of the color filter substrate 7. In this embodiment, the spacer layer 20 is a glass spacer layer rather than a resin spacer layer. The glass spacer layer is adhered to the parallax barrier, and may be etched in situ to a desired thickness.

Use of a glass layer 20 makes further processing steps straightforward. For example, when the transmissive layer is a glass layer, manufacturing the color filters 18 onto the transmissive layer 20 should be very similar to manufacturing color filters onto a normal glass substrate.

FIG. 8(b) is a schematic plan-view of a display 23 according to a further example embodiment, and FIG. 8(a) shows the CF substrate of this display. The display 23 of this embodiment corresponds generally to the display of FIG. 6(b), and only the differences between the embodiments will be described. In the display 23, the spacer layer 20 between the parallax barrier aperture array and the array of color filters 18 is a layer of a plastics material. The layer of plastics material is adhered to the parallax barrier aperture array 13 by a suitable method such as lamination or gluing. The plastics material 20 may alternatively be printed over the parallax barrier aperture array.

Use of a laminated plastics layer as the transmissive layer 20 is potentially cheaper than using a spin-coating technique to for a resin light transmissive layer. There may also be less waste material than if resin is used, and the laminating process may be quicker.

FIG. 9(b) is a schematic plan view of a multiple view directional display 24 according to a further example embodiment, and FIG. 9(a) shows the CF substrate 25 of the display. The display 24 again comprises a TFT substrate 6, a color filter substrate 25, and a liquid crystal layer or other image display layer 8 disposed between the TFT substrate 6 and the color filter substrate 25.

FIG. 9(a) shows the color filter substrate 25 of the display. As can be seen from the figure, a plurality of recesses 26 is formed in a first principal surface of a base substrate 19. The base substrate 19 may be formed of any suitable light-transmissive material such as, for example, glass, plastic, or glass-reinforced plastic. The recesses 26 may be formed by any suitable process such as, for example, an etching or cutting process. The recesses 26 are preferably in the form of slots that extend across the entire vertical height of the base substrate 19—that is, they extend into the plane of the paper in FIG. 9(*a*). The recesses 26 preferably have substantially the same depth and width as one another.

A parallax barrier aperture array is defined in the base substrate 19 by depositing an opaque material into each recess 26 so that it covers at least the bottom face of each recess. The opaque material thereby defines opaque strips 14 of a parallax barrier aperture array, and light-transmissive regions are defined between the opaque strips 14. The opaque strips 14, and thus the parallax barrier aperture array, are disposed within the thickness of the substrate 25.

The opaque material that forms the opaque regions of the parallax barrier aperture array may be any suitable opaque material, and may be deposited by any suitable method. For example, an opaque resin may be deposited in the recesses 26 using a spinning process.

Once the opaque material has been deposited, the recesses are then filled with a light-transmissive material in order to planarise the surface of the base substrate 19. For example, a light-transmissive resin may be deposited in the recesses 26 using a spinning process.

Once the surface of the base substrate 19 has been made flat, an array of color filters 18 may be deposited over the base substrate 19 to complete the color filter substrate 25.

In this embodiment, the separation between the parallax barrier aperture array and the liquid crystal layer is approximately equal to the depth d of the recesses 26. The depth d of the recesses can be made small, for example 50 microns, so that a large angular separation between viewing windows can be obtained.

FIG. 10(*b*) shows a display 27 according to a further example embodiment. The display 27 again comprises a TFT substrate 6, a color filter substrate 25', and a liquid crystal layer (or other image display layer) 8 disposed between the TFT substrate 6 and the color filter substrate 25'. This embodiment corresponds generally to the embodiment of FIGS. 9(*a*) and 9(*b*), and only the differences between the two embodiments will be described.

FIG. 10(*a*) is a schematic plan view of the color filter substrate 25' of the display 27. In this embodiment, the color filters 18 are deposited on a first principal surface of the base substrate 19. Recesses 26 are defined in a second principal surface of the base substrate 19, for example using an etching or cutting technique. An opaque material is then deposited in the recesses, to form the opaque strips 14 of a parallax barrier aperture array. The opaque strips 14, and thus the parallax barrier aperture array, are disposed within the thickness of the substrate 25. If desired, the recesses may then be filled with a light-transmissive material in order to planarise the second principal surface of the base substrate 19. As in the previous embodiment, any suitable material may be deposited as the opaque material, and may be deposited by any suitable technique. In one preferred embodiment, an opaque resin is deposited into the recesses 26 using a spinning technique.

Compared to the conventional display of FIG. 5, the separation between the parallax barrier and the liquid crystal layer is reduced by the depth of the recesses, for example 50 microns, so that the angular separation between viewing windows is therefore increased. Since the thickness of the base substrate is reduced only where the recesses are present, the structural strength of the base substrate may be greater than if the entire substrate had been made with a reduced thickness.

FIG. 11(*b*) is a schematic plan view of a multiple-view directional display 28 according to a further example embodiment. This display again consists of a TFT substrate 6, a color filter substrate 29, and a liquid crystal layer 8 or other image display layer disposed between the TFT substrate 6 and the color filter substrate 29.

The color filter substrate 29 is shown in FIG. 11(*a*). As can be seen, the color filter substrate 29 is generally similar to the color filter substrate 7 of FIG. 6(*a*), except that it is provided with two parallax barriers 13, 13'. The color filter substrate 29 comprises a base substrate 19 which is made of any suitable light-transmissive material such as, for example, glass. A first parallax barrier aperture array 13 is disposed over a first surface of the base substrate. The parallax barrier aperture array may be formed by, for example, depositing stripes 14 of an opaque material over the substrate to form the opaque portions 14 of a parallax barrier aperture array 13.

A first light-transmissive spacer layer 20 is then deposited over the surface of the substrate 19 on which the parallax barrier aperture array is formed. The first spacer layer may be formed of, for example, a light-transmissive resin, glass, or a transparent plastics material as in the embodiments of FIGS. 6(*a*), 7(*a*) and 8(*a*) described above.

A second parallax barrier aperture array 13' is disposed over the upper surface of the first spacer layer 20. This second parallax barrier aperture array may again be provided by depositing opaque material over the spacer layer 20 in order to form opaque portions 14' of the second parallax barrier aperture array.

The color filter substrate further comprises a second spacer layer 20' provided over the second parallax barrier aperture array. Both parallax barrier aperture arrays 13, 13' are disposed within the thickness of the substrate 29. The second spacer layer may again be any suitable light-transmissive material such as a light-transmissive resin, a glass layer, glass, or a light-transmissive plastics material.

The color filters 18 are deposited over the upper surface of the second spacer layer 20'.

The two parallax barriers 13, 13' are arranged such that a transmissive region of the second barrier 13' is not disposed directly in front of an transmissive region of the first parallax barrier 13. The two parallax barriers are arranged such that a transmissive region in the second barrier 13' is aligned with an opaque region 14 of the first parallax barrier 13, and so that an opaque region 14' of the second parallax barrier 13' is aligned with a transmissive region of the first parallax barrier 13. As a result, light emitted by the backlight in a direction parallel to, or close to, the normal of the display face of the display is blocked by one or other of the parallax barriers 13, 13'. Because the two parallax barriers are arranged such that transmissive region in the first parallax barrier 13 are laterally offset with respect to transmissive regions in the second parallax barrier 13', light that leaves the second parallax barrier 13' is travelling in first and second ranges of directions that are inclined with respect to the normal.

Many backlights provide their greatest intensity along the normal axis, and this is a disadvantage in a multiple view directional display since the viewing windows are generally located at positions that are angularly displaced from the normal axis. In a typical dual view display the two viewing windows may be at ±40 degrees to the normal. The use of two parallax barriers as in the display of FIG. 11(*b*) can provide a "black central window"—that is, a region centred about the normal to the display face of the display in which the intensity is low.

This embodiment is not limited to the provision of two parallax barriers on the color filter substrate. In principle, three or more parallax barrier aperture arrays could be provided over the substrate 19, with each pair of adjacent parallax barrier aperture arrays being separated by a respective spacer layer.

In the embodiment of FIG. 11(*a*), it is not necessary for the two spacer layers 20, 20' to be formed of the same material. The two spacer layers may be made of different materials—thus, as an example, the first spacer layer 20 could be a glass layer whereas the second spacer layer 20' could be a light-transmissive resin layer.

In another embodiment (not illustrated), the color filter substrate comprises two parallax barrier aperture arrays, one disposed on each side of the base substrate 19. In this embodiment, a first parallax barrier array would be formed on one principal surface of the base substrate 19 and the filters 18 would be provided over the first parallax barrier aperture array with a light-transmissive spacer layer being interposed between the first parallax barrier aperture array and the color filters 18 as in FIG. 6(*a*), 7(*a*), or 8(*a*). A second parallax barrier aperture array would be formed on the second principal surface of the base substrate 19, and this would be overlaid by a light-transmissive layer so that both parallax barrier aperture arrays would be disposed within the thickness of the color filter substrate.

FIGS. 12(*a*) and 12(*b*) show a further example embodiment. FIG. 12(*b*) is a schematic plan view of a multiple-view directional display 30 according to this example embodiment. The display device again comprises a TFT substrate 6, a color filter substrate 31, and a liquid crystal layer 8 or other image display layer disposed between the TFT substrate 6 and the color filter substrate 31.

FIG. 12(*a*) is a schematic plan view of the color filter substrate 31 of this example embodiment. The color filter substrate 31 comprises a base substrate 19 which may be made of any suitable light-transmissive material. A plurality of recesses 26 are defined in one surface of the substrate 19, by any suitable process such as etching or cutting. When the substrate 31 is seen in front view, the recesses 26 appear as parallel strips that run from top to bottom of the base substrate 19.

As shown in FIG. 12(*a*), in this embodiment the width of a recess, parallel to the surface of the substrate 19, decreases with distance into the substrate. In the embodiment of FIG. 12(*a*) the recesses 26 have a triangular cross-section, but the recesses are not limited to this specific cross-section.

A parallax barrier aperture array 13 is formed by depositing an opaque (or reflective) material (or both) into the recesses 26 so as to form opaque portions 14 of the parallax barrier aperture array. The opaque material preferably substantially fills the recesses 26, so as to planarise the upper surface of the base substrate 19. In a preferred embodiment, the opaque material is an opaque resin that is deposited in the recesses 26 by a spinning process—however, in principle, any opaque material may be used.

The color filter substrate 31 further comprises a light-transmissive spacer layer 20 deposited over the upper face of the base substrate 19. The parallax barrier aperture array is thus disposed within the thickness of the substrate 31. As described above, the light-transmissive spacer layer may be a light-transmissive resin layer, a glass layer, a layer of light-transmissive plastics material, etc. The spacer layer may be adhered to the substrate 19 in any suitable manner.

Finally, the color filters 18 are deposited on the upper surface of the spacer layer 20 to form the color filter substrate 31.

In this embodiment, the parallax barrier has a three-dimensional profile, since the opaque elements 14 of the parallax barrier aperture array extend over a finite depth, for example 50 microns, into the substrate. The parallax barrier acts in a similar way to a conventional parallax barrier, such as the parallax barrier of FIG. 6(*a*). However, owing to the three-dimensional structure of the parallax barrier, light that is incident on the parallax barrier at high angles to the normal to the plane of the substrate 19 is blocked whereas such rays would be transmitted by a conventional parallax barrier of the type shown in FIG. 6(*a*). This may be beneficial in preventing secondary windows.

In the color filter substrate of FIG. 12(*a*), the depth of the recesses may be varied over the substrate 19, in order to vary the depths of the opaque portions of the parallax barrier. Doing this would mean that the cut-off angle, relative to the normal to the plane of the substrate, at which light rays are blocked would vary across the display device.

FIG. 13(*a*) shows a further color filter substrate 31', and FIG. 13(*b*) shows the color filter substrate of 13(*a*) incorporated in a display 30'. These embodiments are generally similar to the embodiments of FIGS. 12(*a*) and 12(*b*) respectively, and only the differences will be described here.

In the color filter substrate 31' of FIG. 13(*a*), the recesses 26 are not formed in the base substrate 19. Instead, the color filter substrate comprises a light-transmissive spacer layer 32 provided over the base substrate 19, and the recesses 26 are formed in the spacer layer 32. The spacer layer 32 may be of any suitable material such as, for example, light-transmissive resin, glass, or a light-transmissive plastics material. The recesses 26 may be formed in the spacer layer 32 by any suitable method, such as cutting or etching.

An opaque material is deposited in the recesses 26 in the spacer layer 32 to form the opaque portions 14 of a parallax barrier aperture array, as described in connection with FIG. 12(*a*) above. Finally, a second spacer layer 20 is deposited over the first spacer layer 32, and color filters 18 are formed over the upper surface of the second spacer layer 20. The parallax barrier aperture array is thus disposed within the thickness of the substrate 31'.

In the embodiments described above, the parallax optic has been constituted by a parallax barrier aperture array. The present invention is not, however, limited to this particular form of parallax optic, but may be employed with other types of parallax optic.

FIGS. 14(*a*) and 14(*b*) illustrate a further example embodiment, in which the parallax optic is formed by a lenticular lens array.

FIG. 14(*b*) is a schematic plan view of a multiple-view directional display according to this example embodiment. The display 33 again comprises a TFT substrate 6, a color filter substrate 34, and a liquid crystal layer or other image display layer 8 disposed between the color filter substrate 34 and the TFT substrate 6.

FIG. 14(*a*) shows the color filter substrate 34 of the display device 33. The color filter substrate 34 comprises a light-transmissive base substrate 19 having an upper surface which is profiled so as to form a lenticular lens array 35. The base substrate 19 may be formed in any suitable manner such as, for example, by moulding a light-transmissive plastics material using a suitable mould to provide the lenticular lens array 35 on one surface of the base substrate 19. As an alternative, the lens array 35 may be formed by pressing a glass substrate.

The color filter substrate further comprises a spacer layer 20 deposited over the lenticular lens array 35. The spacer layer is light-transmissive, and is preferably formed of a resin or plastics material so that the lower surface of the spacer layer can follow the profile of the lenticular lens array 35. Color filters 18 are deposited on the upper surface of spacer layer 20, which is preferably flat. The lenticular array is thus disposed within the thickness of the substrate 31.

In this embodiment, the separation between the parallax optic (the lenticular lens array 35) and the liquid crystal layer 8 is equal to the thickness of the spacer layer 20, which must be at least thick enough to planarise the lenses. The spacer layer 20 may be made thin, so that a large angular separation between viewing windows can be obtained.

Figure 14C:
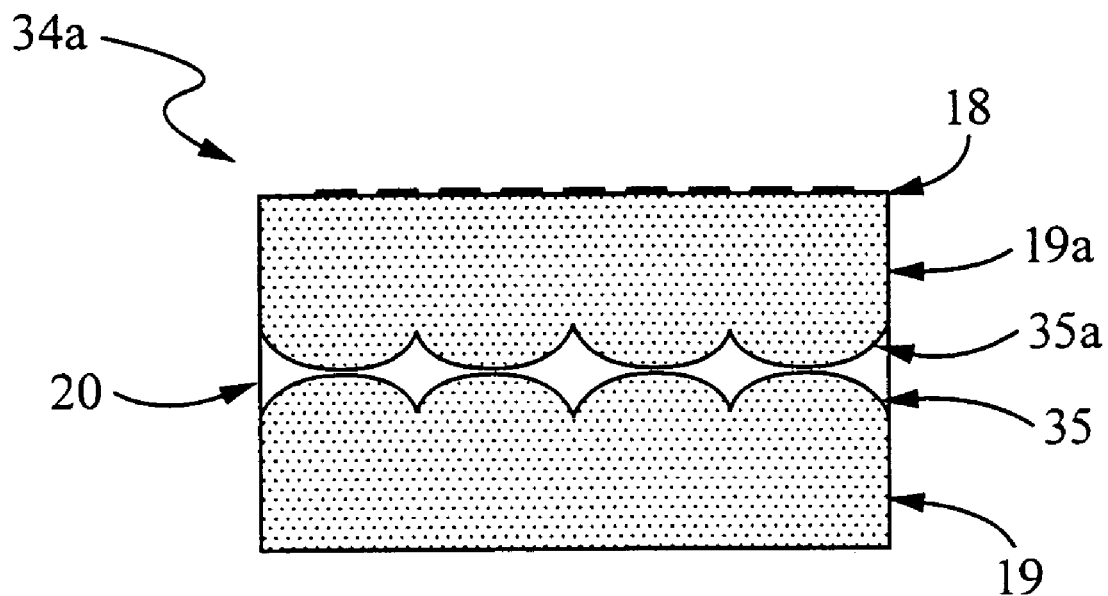
FIGS. 14(c) and 14(d) illustrate a display according to a further example embodiment.
Figure 14D:
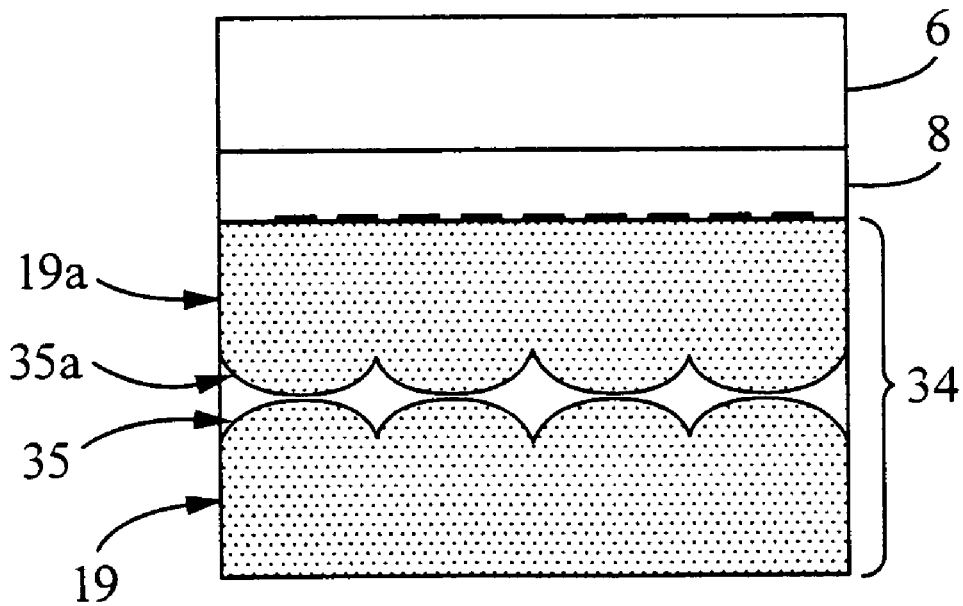

FIGS. 14(c) and 14(d) shows a further example embodiment. FIG. 14(c) shows a further substrate 34a. The substrate 34a comprises a first light-transmissive substrate 19 which has a surface that is profiled to form a first lenticular lens array 35. The substrate 34a further comprises a second light-transmissive substrate 19a which has a surface that is profiled to form a second lenticular lens array 35a. The lenticular lens arrays 35,35a may be formed in any suitable manner, for example using one of the methods described with reference to FIG. 14(a) above.

The light transmissive substrates are assembled with the surfaces on which the lenticular arrays are formed opposite to one another, as shown in FIG. 14(c). A transparent spacer layer 20 is disposed between the two lenticular lens arrays 35,35a, and the layer 20 may be, for example, a transparent resin layer or a layer of transparent adhesive. The two lenticular lens arrays 35,35a are close to one another, and combine to give a higher focal power than a lens array with only one curved surface such as the lens array of FIG. 14(a). Both lenticular arrays are disposed within the thickness of the substrate 34a.

An array of color filters 18 is deposited on one outer surface of the substrate 34a, which is preferably flat.

FIG. 14(d) shows a display 33a incorporating the substrate 34a of FIG. 14(c), an image display layer 8 such as a liquid crystal layer, and a second substrate 6.

FIGS. 15(a) and 15(b) show a further example embodiment. This embodiment is generally similar to the embodiment of FIGS. 14(a) and 14(b), and only the differences will be described.

In FIGS. 14(a) and 14(b) the lenticular lens array 35 is integral with the base substrate 19, and is obtained by suitably profiling the upper surface of the base substrate 19. In the embodiment of FIGS. 15(a) and 15(b), however, the lenticular lens array 35' is not integral with the base substrate 19. Instead, the base substrate 19 has a substantially flat upper surface, and the lenticular lens array 35' is deposited on the upper surface of the base substrate 19. This may be done by any suitable technique. For example, a layer of light-transmissive resin or light-transmissive plastics material may be deposited over the upper surface of the base substrate 19, and this layer may be patterned to form the lenticular lens array 35'.

FIG. 15(c) illustrates a CF substrate 34", which differs from the substrate 34' of FIG. 15(a) in that the lenticular lens array 34" is "double-sided". In other words, whereas the lenticules of the array 35' are plano-convex, the lenticules of the array 35" are convexo-convex. Although such an arrangement is more difficult to manufacture because recesses have to be formed in the substrate 19, optical performance is improved. For example, a display using the substrate 34", of FIG. 15(c) has a smaller crosstalk region and wider freedom of viewer movement.

FIG. 15(d) illustrates another modified CF substrate 34''', which differs from the substrate 34" of FIG. 15(c) in that the lenticules of the array 34''' are spaced apart and are separated by black mask regions 35''''. In fact, any embodiment using a lens array as the parallax optic may similarly have the individual lenses or lens elements separated by black mask regions which are non-transmissive to visible light. Moreover, FIG. 15(d) provides an example of a display wherein the parallax optic is disposed Adjacent to the image display layer 8.

The f-number of the lenticular lens array is required to be very low, which makes the array difficult to manufacture. By decreasing the diameter of each lens of the array and keeping the pitch constant (by filling the gaps between the lenses with light-absorbing material or light-reflecting material or both), the f-number of the lenses may be increased. Such an arrangement improves performance, for example in terms of providing a smaller crosstalk region and larger freedom of viewer position.

FIGS. 16(a) and 16(b) show a further example embodiment. FIG. 16(b) is a schematic plan view through a multiple-view directional display 37 of this embodiment, and FIG. 16(a) is a schematic plan view of the color filter substrate 36. This embodiment is generally similar to the embodiment of FIGS. 6(a) and 6(b), and only the differences will be described here.

In the embodiment of FIGS. 16(a) and 16(b), the positions of the parallax barrier aperture array 13 and the color filters 18 are interchanged compared to their positions in the embodiment of FIGS. 6(a) and 6(b). That is, the color filters 18 are deposited on a principal surface of the light-transmissive base substrate 19. A spacer layer 20 is deposited over the color filters 18, and the parallax optic is formed over the upper surface of the spacer layer 20. In the embodiment shown in FIGS. 16(a) and 16(b) a parallax barrier aperture array 13 forms the parallax optic, but this embodiment is not limited to this particular type of parallax optic. The spacer layer 20 may be a light-transmissive resin layer, a glass layer, a light-transmissive layer of plastics material, etc.

In the embodiment of FIGS. 16(a) and 16(b) the parallax barrier array 13 is disposed substantially adjacent to the liquid crystal layer 8. A large angular separation between different viewing windows can therefore be obtained.

FIGS. 17(a) and 17(b) illustrate a display 38 according to a further example embodiment. In this embodiment, the parallax optic is constituted by a reactive mesogen parallax barrier. This embodiment corresponds generally to the embodiment of FIGS. 6(a) and 6(b), and only the differences will be described here.

The RM parallax barrier in this embodiment is formed by strips 40 of a reactive mesogen material disposed over the upper surface of the light-transmissive base substrate 19 of the color filter substrate 39. A polarizer 41 is provided over the upper surface of the base substrate 19 including over the strips 40 of RM material. The strips 40 of RM material and the polarizer 41 form a RM parallax barrier 42. The operation of a RM parallax barrier is explained in detail in EP A 0 829 744.

The color filter substrate 39 further comprises a spacer layer 20 deposited over the upper surface of the RM parallax barrier 42, so that the parallax barrier 42 is thus disposed within the thickness of the substrate 39. Color filters 18 are deposited on the upper surface of the spacer layer 20. As in previous embodiments, the spacer layer 20 may be, for example, a light transmissive resin layer, a glass layer, a light-transmissive plastic layer, etc. The base substrate 19 may be a glass substrate, a plastics substrate, a glass-reinforced plastics substrate, etc.

In the multiple-view directional display 38 of this embodiment, the separation between the parallax barrier 42 and the liquid crystal layer 8 is again approximately equal to the thickness of the spacer layer 20. The spacer layer may be made thin, so that good angular separation between different viewing windows can be achieved.

This embodiment has the further advantage that the RM parallax barrier is an active parallax barrier, and may be switched (using suitable addressing means, not shown) to put the strips of RM material 40 in a transparent state so that the parallax barrier is disabled or "switched off". If the parallax barrier 42 is disabled, the display device will act as a conventional 2-dimensional or single view display device. Thus, this embodiment provides a display that is operable in either a 2-D display mode or a 3-D or multiple view display mode, and that can provide good angular separation between adjacent viewing windows when operating in the 3-D or multiple view display mode.

FIG. 18(b) illustrates a display 38' according to a further example embodiment, and FIG. 18(a) is a schematic sectional view of the color filter substrate 39' of the display. The display 38' of this embodiment corresponds essentially to the embodiment of FIGS. 17(a) and 17(b) except that the spacer layer 20 is omitted and the color filters 18 are disposed directly on the upper surface of the polarizer 42. All 30 other features of the display 38' of FIG. 18(b) correspond to those of the display 38 of FIG. 17(b) and so will not be described further here.

FIGS. 19(a) and 19(b) show a further example embodiment. In this embodiment, the color filter substrate 44 of the multiple-view directional display 43 is provided with an active parallax barrier 46. FIG. 19(b) is a schematic plan view through the display device 43 and FIG. 19(a) is a schematic sectional view of the color filter substrate 44.

The active parallax barrier 46 is formed by a plurality of regions 47 of a material whose optical properties are switchable disposed on the surface of the base substrate 19. The regions 47 may be in the form of strips that extend into the plane of the paper in FIG. 19(a). The active parallax barrier is formed by the regions 47 in combination with another layer 45 disposed over the regions 47 which may be a linear polarizer or a transparent spacer layer depending on the material used for the active strips 47.

In a preferred embodiment the regions 47 are regions of a liquid crystal material and the layer 45 is a linear polarizer. As is well known, a liquid crystal material may be addressed so as to either rotate or not rotate the plane of polarization of linearly polarized light passing through it. Preferably, the regions 47 of liquid crystal material can be switched between a state in which it rotates the plane of polarization of linearly polarized light by 90° and a state in which it does not rotate the plane of polarization of linearly polarized light. Thus, the regions 47 of liquid crystal material may be addressed so that light passing through the regions 47 is either transmitted by the linear polarizer 45 (in which case the regions 47 define transmissive regions) or is blocked by the linear polarizer 45 (in which case the regions 47 define opaque regions).

The display 43 is required to be illuminated from the color filter substrate side by polarized light, either from a light source that emits polarized light or from a polarizer disposed in front of a light source. Alternatively, it may be illuminated from the TFT side, in which case a further polarizer (not shown) must be disposed beyond the color filter substrate.

If light that does not pass through the regions 47 of switchable optical properties (i.e., that passes through a gap between adjacent active regions) is passed by the polarizer 45, a parallax barrier is formed when light that passes through the regions 47 is blocked by the polarizer; in this case, a 3-D or multiple view display mode is obtained. If the regions 47 are switched so that light that passes through a region 47 is transmitted by the polarizer 45, then no barrier exists and a 2-D or single view display mode is obtained.

It would in principle also be possible to arrange the transmission direction of the polarizer 45 and the polarization direction of the incident light such that light passing through the gaps between the regions 47 of liquid crystal material is blocked by the polarizer 45. In this case a parallax barrier is formed when the regions 47 rotate the plane of polarization of incident light so that it can pass through the polarizer 45. However, when the regions 47 were switched so that light passing through the strips 47 is blocked by the polarizer 45, a dark display would be produced as all light would be blocked by the polarizer.

The regions of active material 47 are not limited to liquid crystal material. Any material that can be addressed to alter its optical properties can in principle be used. For example, a polymer-dispersed liquid crystal material may be used as the material of the active parallax barrier. As is well-known, a PDLC consists of droplets of liquid crystal material dispersed through a polymer matrix. The refractive index of the liquid crystal droplets can be varied, and the PDLC will transmit light if the refractive index of the liquid crystal droplets is the same as the refractive index of the polymer matrix. However, if the liquid crystal material is switched so that its refractive index is different from the refractive index of the polymer matrix, light passing through the PDLC is scattered.

Another suitable material for the active parallax barrier is a dichroic guest-host material.

This embodiment allows the parallax barrier to be switched on and off, thereby allowing either a 3-D (or multiple view) or a 2-D display mode to be selected. Furthermore, it is possible to arrange the active parallax barrier 46 so that the configuration of transmissive and opaque areas can be altered. For example, the active parallax barrier 46 may be switched so that the opaque regions of the barrier move from one position to another. This effectively causes the barrier to be translated across the area of the display device, and this would alter the position of the viewing windows. Thus, in this embodiment, it is possible to control the position of the viewing windows by suitably addressing the active parallax barrier 46. This embodiment would be particularly useful when combined with an observer tracking device which tracks the observer of the display, as the position of the viewing windows could be controlled on the basis of the position of the observer as determined by the observer-tracking device.

It should be noted that, in this embodiment, the polarizer 45 is contained within a liquid crystal display element. The polarizer 45 must therefore be able to withstand the harsh processing conditions that occur during manufacture of a liquid crystal panel. Conventional polarizers used on the outside of a liquid crystal display may well not stand the processing conditions, and so cannot be used. This has the possible disadvantage that it may be necessary to use a polarizer having a lower contrast ratio than conventional polarizers used outside a liquid crystal panel. If this is the case, the polarizer 45 can be oriented so that its poor contrast ratio affects either the contrast ratio of the parallax barrier or the contrast ratio of the pixels of the liquid crystal layer 8.

Where the layer 45 is a spacer layer, it may be treated so that it aligns liquid crystal material, for example of the regions 47, with a particular alignment direction and pre-tilt angle. For example, the spacer layer may be coated with a polyimide layer (not shown) and rubbed and/or exposed to ultraviolet light in a conventional photo-alignment process.

In alternative embodiments, the color filters may be disposed on the TFT substrate 6 or between the active parallax barrier 46 and the substrate 19.

FIG. 20(*b*) shows a display 48 according to a further example embodiment, and FIG. 20(*a*) shows the color filter substrate 49 of the display. This embodiment corresponds generally to the embodiment of FIG. 6(*a*)-6(*b*) except that in this embodiment, the color filter substrate 49 of the multiple-view directional display 48 again comprises an active parallax optic 35". In this embodiment the active parallax optic 35" is an active lenticular lens array. The lenticular lens array can be switched between a mode in which it has substantially no lensing effect (so that no parallax optic exists) and a mode in which it has a lensing effect (so that a parallax optic is formed). The lenticular lens array 35" may be addressed by suitable addressing means (not shown).

For example, the lenticules of the lenticular lens array may be made of a liquid crystal material that is addressed by electrodes (not shown) disposed on opposite sides of the lenticules. The liquid crystal material is chosen so that, for some applied voltage across the lens array, its refractive index is as close as possible to the refractive index of the base substrate 19. When the appropriate voltage is applied between the electrodes provided on opposite sides of a lenticule, the refractive index of the liquid crystal material of that lenticule therefore closely matches the refractive index of the spacer layer 20, and the lenticule has substantially no lensing effect. By varying the applied voltage, however, the liquid crystal material of the lenticule may be changed so that its refractive index is made different to the refractive index of the substrate 19. The lenticule therefore acts as a lens, and so forms an element of a parallax optic.

The lenticules 50 of the active lenticular lens array may be arranged as graded refractive (GRIN), or they be arranged as Fresnel lenses.

FIG. 20(*c*) illustrates a substrate 49 which differs from that shown in FIG. 20(*a*) in that the glass substrate 19 is recessed to accommodate the active lenticular lens array 35". In this arrangement, the refractive index of the active array should substantially match that of the substrate 19 in the single view or non-directional mode of operation.

FIG. 20(*d*) illustrates a substrate 49 in which the lenses of the active array 35" are convexo-convex to provide improved performance, such as a smaller crosstalk region and a greater freedom of movement of the viewer. In this case, in the single view mode of operation, the refractive index of the array 35" should substantially match the refractive indices of the substrate 19 and the spacer 20.

FIG. 21(*b*) shows a display 48' according to a further example embodiment, and FIG. 21(*a*) shows the color filter substrate 49' of the display 48'. This embodiment is generally similar to the embodiment of FIGS. 20(*a*) and 20(*b*), and only the differences will be described here.

The multiple-view directional display 48' of FIG. 21(*b*) has a color filter substrate 49' that incorporates an active lenticular lens array 35". In this embodiment, however, switching of the lens array is achieved in a different way. In this embodiment, the lenticules 50 are made of liquid crystal material. However, the microscopic structure of the liquid crystal material is fixed, and the liquid crystal material is not addressed in operation of the device.

The switching of the lens array in this embodiment is achieved by making use of the fact that the refractive index of a liquid crystal material is generally dependent on the polarization state of the light passing through it. The liquid crystal material of the lenticules 50 is chosen such that, for light of one polarization state, the refractive index of the liquid crystal material is substantially the same as the refractive index of the spacer layer 20. Thus the liquid crystal material has substantially no lensing effect on light of this polarization state. However, for another polarization state, in particular for a polarization state orthogonal to the first polarization state, the refractive index of the liquid crystal material will not match the refractive index of the layer 20 so that the liquid crystal material has a lensing effect for light of the second polarization state.

The liquid crystal lenticules 50 are switched on or off by changing the polarization state of light entering the display 48. This may be done by providing a polarization switch 51 that can change the polarization state of light passing through a selected portion of the polarization switch 51, for example by selecting one of two orthogonal linear polarizations. The polarization switch 51 may be constituted by, for example, a liquid crystal cell and is followed by a polarizer 51'.

FIG. 21(*c*) illustrates another substrate 49' in which the glass substrate 19 is recessed so as to accommodate the array 35". In this case, one of the refractive indices of the material of the array 35" must substantially match the refractive index of the glass substrate 19 so as to provide a single view mode of operation.

FIG. 21(*d*) illustrates another form of the color filter substrate 49' in which both the spacer 20 and the glass substrate 19 have recesses to accommodate the lens array 35", which is convexo-convex. In this case, one of the refractive indices of the material of the array 35" is required substantially to match the refractive indices of the spacer 20 and the glass substrate 19 in order to provide a non-directional or single view mode of operation.

Figure 22:
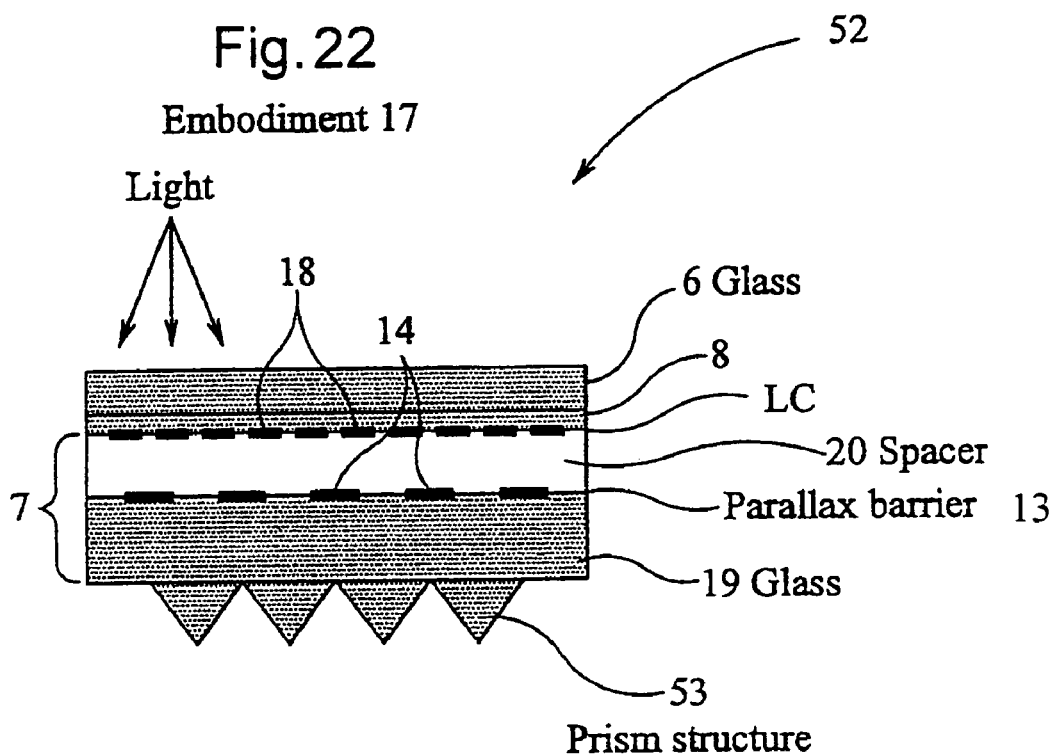
FIG. 22 illustrates a display according to a further example embodiment.

FIG. 22 is a schematic sectional view of a multiple-view directional display 52 according to a further example embodiment. This is in many ways similar to the display 58 of FIG. 6(*b*), except that a plurality of prisms 53 are provided on the external surface of the base substrate 19 of the color filter substrate 7. In FIG. 22 the prisms 53 are shown as having a triangular cross-section. The prisms 53 work in combination with the parallax barrier 13 provided inside the display device. In use, the device is illuminated by a light provided behind the TFT substrate 6, so that the base substrate 19 of the color filter substrate 7 forms the exit face of the display device. The prism structure varies the angle of separation between the left and right images induced by the parallax barrier.

In the embodiment of FIG. 22, the prisms are arranged so that they reduce the angle of separation between the viewing windows of different images.

Although the prisms are shown as having a triangular cross-section in FIG. 22, this embodiment is not limited to prisms having a triangular cross-section. In principle, any prism structure that reduces the angle of separation between two viewing windows may be used. Furthermore, where prisms having a triangular cross-section are used, it is not necessary for the prisms to have a cross-section that is an equilateral triangle. In fact any symmetrical or asymmetrical convergent or divergent element may be used, for example to suit any application of the display.

The embodiment of FIG. 22 may be of use in, for example, an autostereoscopic display device where the angular separation between the viewing windows of the left-eye image and the right-eye image is required to provide a separation between the left-eye and right-eye windows that is equal to the distance between the two eyes of a human at the desired viewing distance of the display.

Figure 23:
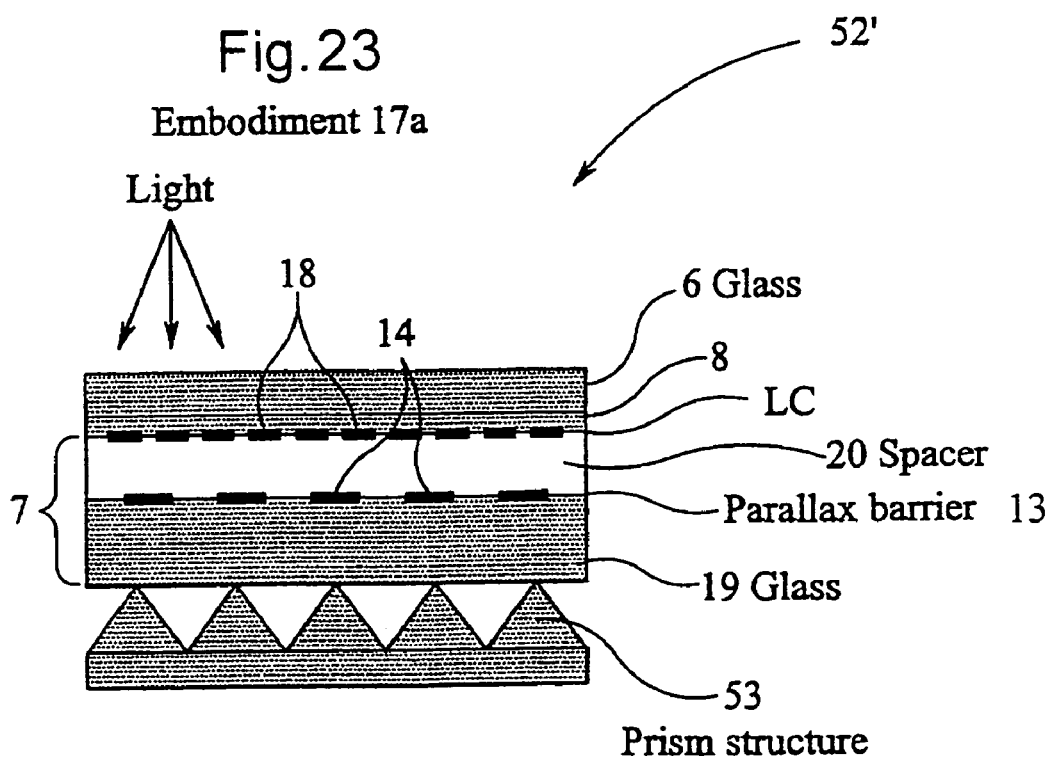
FIG. 23 illustrates a display according to a further example embodiment.

FIG. 23 shows a display 52' according to a further example embodiment. This display 52' corresponds generally to the display of FIG. 22, except that the prisms 53 provided on the surface of the base substrate 19 are intended to increase the angle of separation between the two viewing windows.

Figure 24:
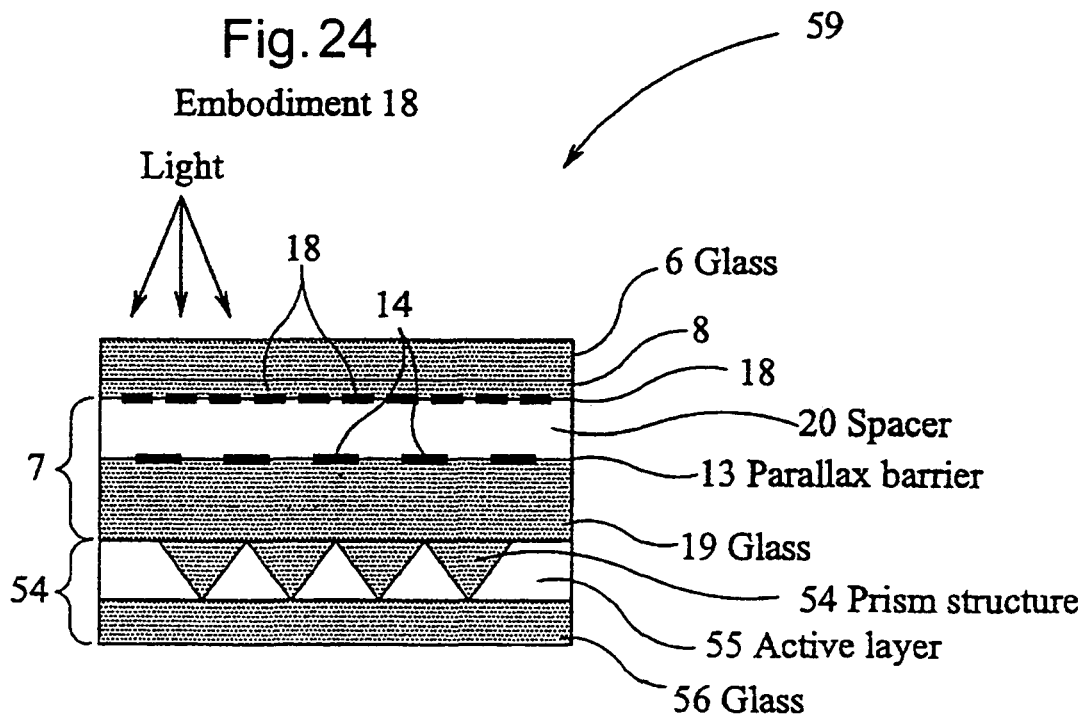
FIG. 24 illustrates a display according to a further example embodiment.

FIG. 24 illustrates a multiple-view directional display 59 according to a further example embodiment. The display 59 of this embodiment corresponds generally to the display device 20 of FIG. 6(b), except that it further comprises switchable means 54 for varying the angle between two viewing windows produced by the device. The switchable means 54 may be switched between a state in which it has substantially no effect on the angular separation between two viewing windows and another state in which it will increase or decrease the angular separation between two viewing windows. In this embodiment the switchable means 54 comprises a plurality of light-transmissive prisms 53 mounted on the external surface of the base substrate 19 of the color filter substrate. An active layer 55 is disposed over the prisms 53 so as to planarise the prisms. The active layer is contained by a transparent plate 56. The prisms and the transparent plate may be formed of glass, transparent resin, transparent plastics material, etc. The active layer 55 may comprise, for example, a liquid crystal layer. The liquid crystal layer is selected such that, when no electric field is applied across the liquid crystal material, the refractive index of the liquid crystal material matches the refractive index of the prisms 53. In this state, the prisms have substantially no effect on the angular separation between two viewing windows produced by the device 54.

The switchable means 54 further comprises electrodes (not shown) that allow an electric field to be applied across the liquid crystal layer 55. By applying a voltage across the electrodes, and thereby applying an electric field across the liquid crystal layer, it is possible to vary the refractive index of the liquid crystal material so that it becomes different from the refractive index of the prisms 53. Light passing through the interface between a prism and the liquid crystal layer therefore undergoes refraction. In consequence, the angular separation between two viewing windows formed by the display device is altered by the prisms 53. This allows the display 59 to switch, for example, between a dual-view display mode and an autostereoscopic display mode.

The switchable means 54 may allow the angular separation between two viewing windows to be controlled continuously by continually varying the electric field applied across the liquid crystal layer. This allows the angular separation between two viewing windows to be tuned to suit a particular use of the display device 54. This embodiment is particularly useful if information about the longitudinal separation between the display and an observer is available, for example from an observer tracking device—in an autostereoscopic display mode the switchable means 54 may control the angular separation between the left-eye and right-eye viewing windows so that the lateral separation at the observer is kept equal to the separation between the two eyes of a human.

Figure 25:
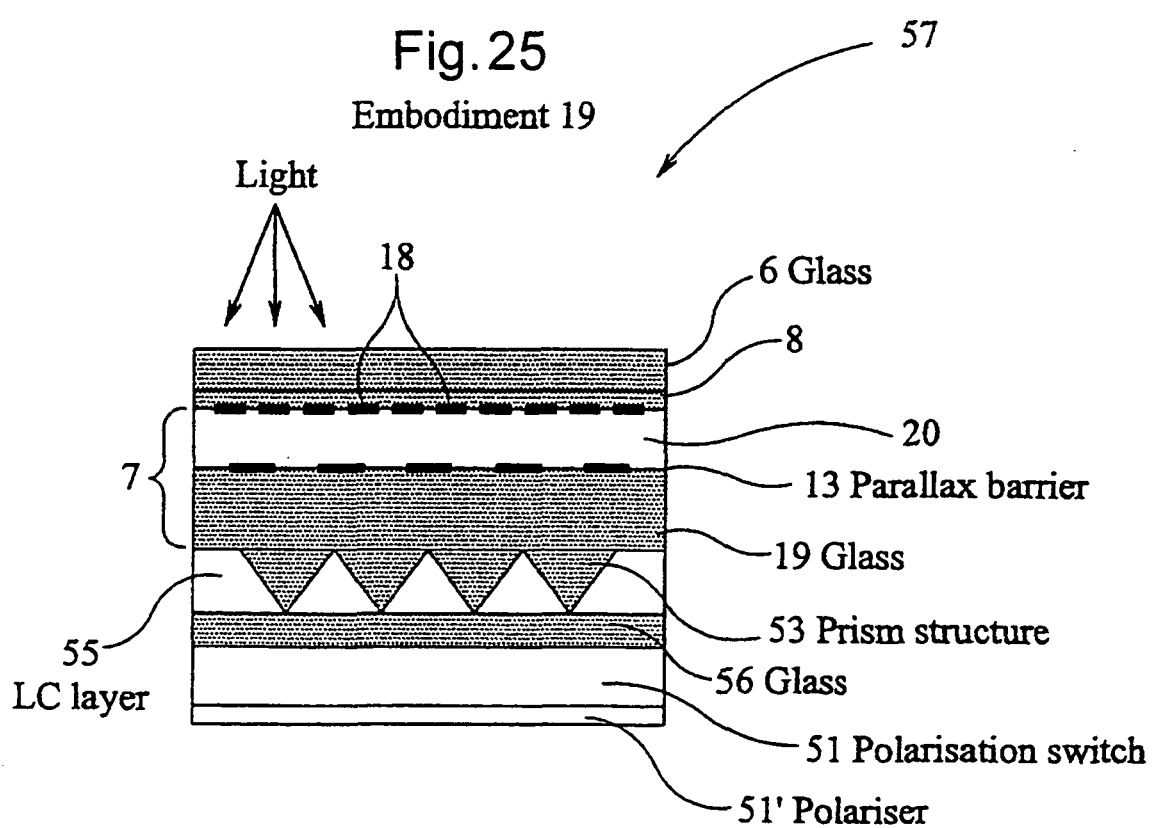
FIG. 25 illustrates a display according to a further example embodiment.

FIG. 25 shows a multiple-view directional display 57 according to a further example embodiment. This display 57 is generally similar to the display 54 of FIG. 24, and only the differences will be described here.

In the display 57 of FIG. 25, the switchable means 54 for varying the angular separation between two viewing windows formed by the display comprises prisms 53 disposed on the external surface of the substrate 19 of the color filter substrate 7. A liquid crystal-layer 55 is placed over the prisms 53, but, in contrast to the embodiment of FIG. 24, the microscopic structure of the liquid crystal layer is fixed. No means for addressing the liquid crystal layer 55 are therefore required.

The refractive index of the liquid crystal layer 55 is dependent on the state of polarization of light passing through the liquid crystal layer. The liquid crystal layer is chosen such that its refractive index, for one polarization state, is substantially equal to the polarization state of the prisms 53. In this case, light passing through the prisms undergoes substantially no refraction.

For light of another polarization state, for example a polarization state orthogonal to the first polarization state, however, the refractive index of the liquid crystal material 55 is not equal to the refractive index of the prisms 53. For light of this second polarization state, therefore, refraction occurs at the interface between the prisms and the liquid crystal layer 55, leading to a variation in the angular separation between two viewing windows formed by the display 57.

The refraction effect in this embodiment may be switched on or off by suitably selecting the polarization state of light entering of leaving the panel. This may be done by providing a polarization switch 51 and a polarizer 51' between the light source and the observer. In FIG. 25 the polarization switch 51 and the polarizer 51' are disposed between the display device and an observer, but they could alternatively be provided between the light source and the display device. The polarization switch may be, for example, a liquid crystal cell.

The embodiments of FIGS. 24 and 25 may be effected using a prism structure that tends to increase the angular separation between viewing windows, as in FIG. 23.

Figure 26A:
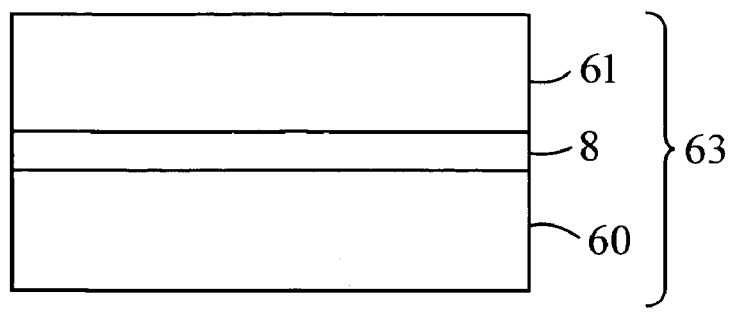
FIGS. 26(a) to 26(d) show a method of manufacturing a display of the invention.

FIGS. 26(a) to 26(d) illustrate a method of manufacturing a display. The method takes, as its starting point, a conventional image display device 63 having an image display layer 8 (such as a liquid crystal layer) disposed between two substrates 60, 61 as shown in FIG. 26(a). The image display device 63 will contain other components such as electrodes and switching elements for controlling the image display layer 8, and color filters in the case of a color image display device; there may be entirely conventional and are omitted from FIGS. 26(a)-(d) for clarity of description.

Figure 26B:
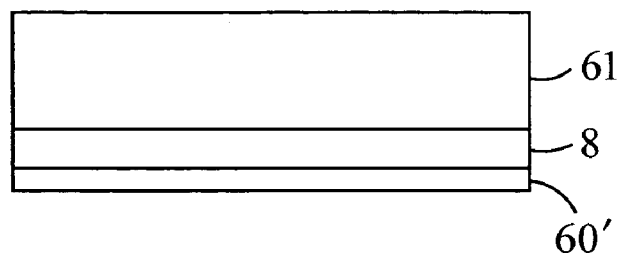

According to the method of this embodiment, the thickness of one substrate 60 of the image display device 63 is reduced, preferably to a thickness in the range of 50 μm to 150 μm. The thickness of the substrate 60 may be reduced by any suitable method such as, for example, a mechanical grinding method or a chemical etching method. The substrate 60 is thus transformed to a thin transparent layer 60', as shown in FIG. 26(b). The thickness of the thin transparent layer 60' is preferably substantially uniform over the area of the layer 60'.

Figure 26C:
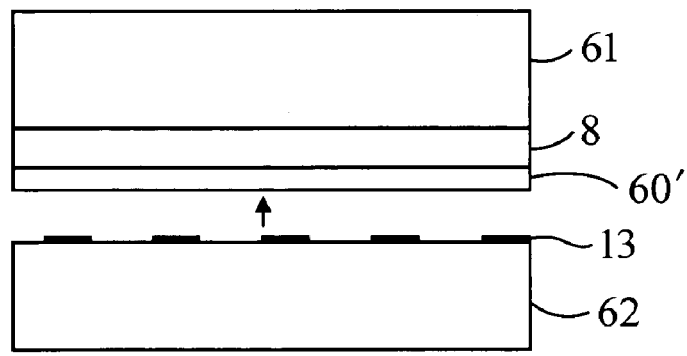

Next, a further substrate 62 is adhered to the thin transparent layer 60' such that a parallax optic 13 is disposed between the thin transparent layer 60' and the further substrate. This may conveniently be done by providing the parallax optic on or in a surface of the further substrate, and adhering that surface of the further substrate to the thin transparent layer 60'. For example, a parallax barrier aperture array may be printed onto a surface of the further substrate 62 as shown in FIG. 26(c). Alternatively, a lenticular lens array or RM parallax barrier may be defined in/on a surface of the further substrate. The further substrate 62 may be adhered to the thin transparent layer 60' using a suitable transparent adhesive. FIG. 26(a)-26(d) thus serve as an example wherein an image display layer (e.g., layer 8) is disposed adjacent the second substrate (e.g., substrate 60'), wherein the third substrate (e.g., substrate 62) comprises the parallax optic 13, and wherein the parallax optic 13 of substrate 62 is positioned adjacent to the second substrate (e.g., substrate 60').

Figure 26D:
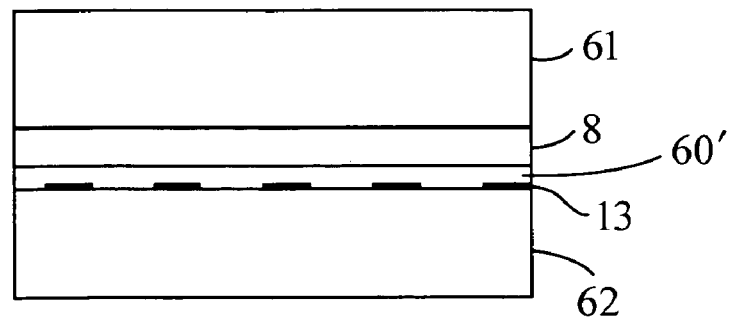

The further substrate 62 may be adhered directly to the thin transparent layer 60', as shown in FIG. 26(d). Alternatively one or more components may be interposed between the further substrate 62 and the thin transparent layer 60', as described with reference to FIG. 28 below.

The resultant display is shown in FIG. 26(*d*) (the transparent adhesive is omitted from FIG. 26(*d*) for clarity). The parallax optic is separated from the image display layer 8 by only the thin transparent layer 60' obtained by reducing the thickness of the substrate 60 (and by the thickness of the transparent adhesive). The parallax optic can thus be put close to the image display layer 8, so that the advantages described above are obtained.

In the method of FIGS. 26(*a*) to 26(*d*), the substrate 60 is incorporated in a display device 63 when its thickness is reduced. Other elements of the display device 63 provide physical support for the substrate 60 during the process of reducing its thickness and after its thickness has been reduced. It is therefore possible to reduce the thickness of the substrate 60 to as little as 50 μm without there being a serious risk of the substrate breaking. In contrast, if the thickness of an isolated substrate is reduced it is difficult to reduce the thickness significantly below 0.5 mm without there being a serious risk of the substrate breaking.

The method of FIGS. 26(*a*) to 26(*d*) may be used to manufacture, for example, a display 22 as shown in FIG. 7(*b*). If FIG. 26(*d*) is compared with FIG. 7(*b*) it will be seen that the further substrate 62 of FIG. 26(*d*) corresponds to the base substrate 19 of FIG. 7(*b*), and that the thin layer 60' of FIG. 26(*d*) (obtained by reducing the thickness of the substrate 60 of the image display element 63) corresponds to the glass layer 20 between the parallax barrier 13 and the color filter array 18 in FIG. 7(*b*).

The method of FIGS. 26(*a*) to 26(*d*) may be used in the manufacture of displays in which the parallax optic is not a parallax barrier aperture array. For example, a lens array or an RM parallax barrier may be disposed on one surface of the further substrate 62 thus allowing manufacture of a display as shown in, for example, FIG. 15(*b*) or FIG. 17(*b*).

A lens array may be adhered to the further substrate by providing a layer of transparent adhesive over the entire area of the substrate. Alternatively, a lens array may be adhered to the further substrate by disposing adhesive only at selected locations, for example around the circumference of each lens. This provides an air-gap between the lens and the substrate where the adhesive is not applied, thereby eliminating the reduction in focusing power that can occur if a layer of transparent adhesive with a refractive index close to the refractive index of the lens array is present. Where adhesive is disposed at only selected locations it is in principle possible to use an adhesive that is not transparent.

Figure 27:
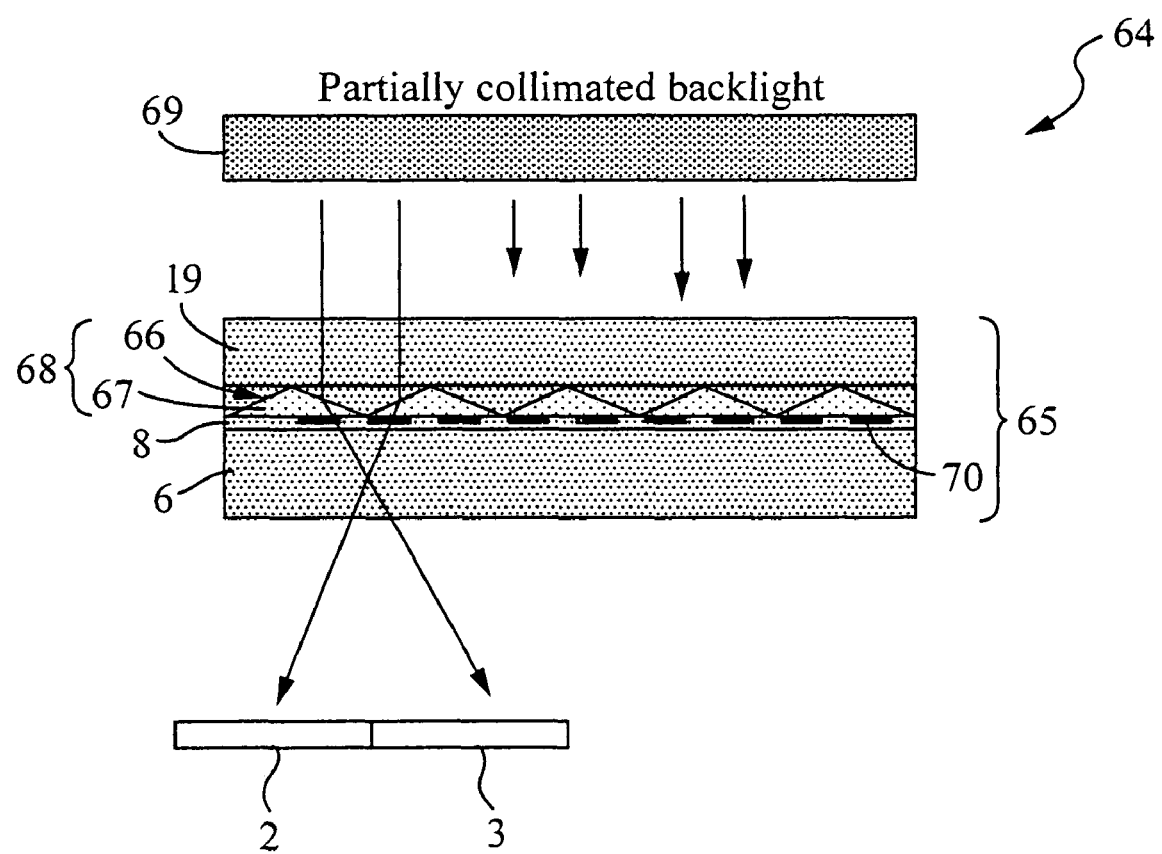
FIG. 27 illustrates a display according to a further example embodiment.

FIG. 27 is a sectional view (from above) of a display 64 according to a further example embodiment. The display again comprises an image display element 65, and has a parallax optic 66 disposed within the image display element. As used herein and illustrated in the figures, the parallax optic being disposed within the image display element means that the parallax optic is situated in or between the first substrate and the second substrate of the image display element, e.g., in or between a TFT substrate as the first substrate and a. color filter substrate as the second substrate. In this embodiment the parallax optic is a prism array 66.

The prism array 66 is formed over a base substrate 19 (which may be made of, for example, glass), and a planarizing layer 67 is provided over the prism array. The base substrate 19, prism array 66 and planarizing layer 67 form one substrate 68 of the image display element 65. An image display layer 8, for example a pixellated liquid crystal layer, is disposed between the substrate 68 and a second substrate 6. Other components of the image display element, for example such as a color filter array (in the case of a full-color display), alignment layers, switching elements and electrodes, may be entirely conventional and have been omitted from FIG. 27.

The display 64 comprises a backlight 69 that illuminates the image display element 65 with collimated or partially collimated light. The light from the backlight is refracted by the prisms of the prism array and is directed to a left viewing window 2 or to a right viewing window 3. If two interlaced images are displayed on the pixels 70 of the image display layer 8 a directional display is provided. Use of a prism array to direct light to the two viewing windows means that a backlight 69 having a relatively low degree of collimation can be used—in contrast, if a lens array were used in place of the prism array it would be necessary to use a backlight having a high degree of collimation.

One method by which the substrate 68 may be manufactured is to dispose a layer of photoresist over the base substrate 19. The refractive index of the photoresist should be as close as possible to the refractive index of the base substrate 19, and the refractive index of the photoresist is preferably equal or substantially equal to the refractive index of the base substrate 19. The prism array 66 is then defined in the photoresist layer using conventional masking, irradiation and etching steps.

The planarizing layer 67 is then disposed over the prism array 66. The planarizing layer 67 preferably has the minimum thickness required to planarise the substrate 68.

Components such as an alignment layer, color filters etc may be provided on the substrate 68 using any suitable technique. The substrate 68 may then be assembled with the second substrate 6 to form the image display element 65.

The refractive index of the planarizing layer 67 must be different from the refractive index of the prism array 66 so that light is refracted at the interface between the prism array 66 and the planarizing layer 67. The refractive index of the planarizing layer may be higher or lower than the refractive index of the prism array, although in practice it may be easier to find suitable materials for the planarizing layer that have a lower refractive index than the prism array. (The direction of refraction will depend on whether refractive index of the planarizing layer is higher or lower than the refractive index of the prism array.)

Example embodiments have been described above with reference to specific types of parallax optics. The embodiments are not, however, limited to the specific types of parallax optic shown, and may be used with other types of parallax optic.

The present technology allows a substrate on which a parallax optic is mounted to be used as a substrate of an image display element such as, for example, a liquid crystal display element. This has the advantage that the alignment of the parallax optic and the pixels of the display element is carried out during manufacture of the display element. This allows the alignment to be carried out more precisely compared to the conventional case where an external parallax optic is aligned with a complete liquid crystal display element (as in FIG. 1). Furthermore, eliminating the step of gluing or otherwise adhering a parallax optic to a completed image display element makes the manufacturing process quicker and cheaper.

Figure 28:
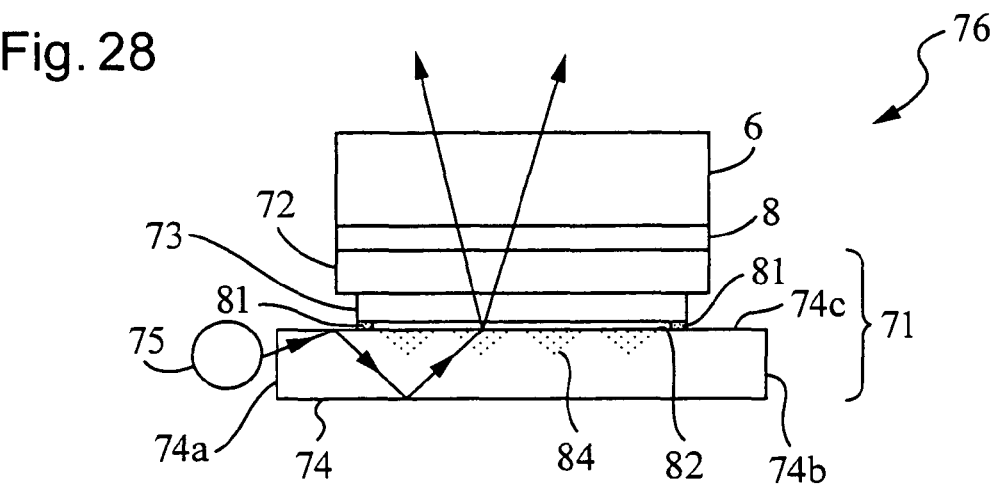
FIG. 28 illustrates a display according to a further example embodiment.

FIG. 28 is a schematic plan-sectional view of a multiple view directional display 76 according to a further example embodiment. The display 76 comprises a first transparent substrate 6 and a second transparent substrate 71, with an image display layer 8 disposed between the first substrate 6 and the second substrate 71. An array of color filters (not shown) is provided on the second substrate 71, and the second substrate will therefore be referred to as a color filter substrate.

The first substrate 6 is provided with pixel electrodes (not shown) for defining an array of pixels in the image display layer 8, and is also provided with switching elements (not shown) such as thin film transistors (TFTs) for selectively addressing the pixel electrodes. The substrate 6 will be referred to as a 'TFT substrate'. The image display layer 8 is, in this example, a liquid crystal layer 8. The invention is not limited to this, however, and any transmissive image display layer may be used.

The display 76 is assembled such that the color filters are each substantially opposite a respective pixel of the image display layer 8. Other components such as alignment layers may be disposed on the surfaces of the substrate 6, 71 adjacent to the image display layer, and a counter electrode or electrodes may also be disposed on the CF substrate 71; these components are conventional, and will not be described further. Furthermore, the display 76 may comprise further components such as viewing-angle enhancement films, anti-reflection films etc., disposed outside the image display element; these components are also conventional and will not be described further.

The color filter substrate 71 comprises a transparent waveguide 74, a linear polarizer 73 disposed on the waveguide 74, and a transparent layer 72 disposed over the linear polarizer 73. The waveguide 74 not only forms part of the color filter substrate 71 but also forms part of the backlight of the display.

In use, the backlight of the display 76 is constituted by the waveguide 74 and one or more light sources 75 arranged along sides of the waveguide. Only one light source 75 is shown in FIG. 28, arranged along one side face 74a of the waveguide 74, but the invention is not limited to the specific configuration of the backlight shown in FIG. 28, and more than one light source could be used. As an example, the display could be provided with two light sources arranged along opposite side faces 74a, 74b of the waveguide 74. The light sources 65 preferably extend along all or substantially all of the respective side face of the waveguide and may be, for example fluorescent tubes.

The waveguide 74 is adhered to the polarizer 73 by adhesive 81 disposed along the edges of the polarizer 73. Since the adhesive 81 is disposed only along the edges of the polarizer 73, an air gap 82 exists between the waveguide 74 and the polarizer 73 over most of the area of the polarizer. As is well known, light from the light source(s) 75 enters the waveguide 74 and is trapped within the waveguide 74 by the phenomenon of total internal reflection—light propagating within the waveguide that is incident on the front surface or back surface of the waveguide 74 undergoes total internal reflection at the waveguide/air interfaces and is not emitted from the waveguide.

Alternatively, the waveguide 74 and polarizer 73 may be adhered using a low refractive index transparent adhesive—that is, an adhesive having a refractive index that is lower than the refractive index of the waveguide. The low refractive index adhesive may be disposed over the entire area of the polarizer 73, and internal reflection at the front face of the waveguide 74 arises from the difference between the refractive index of the adhesive and the refractive index of the waveguide.

According to the embodiment of FIG. 28, diffusive dots are provided at selected regions 84 of the front face 74c of the waveguide 74. If light propagating within the waveguide is incident on a region 84 of the front face 74c of the waveguide where diffusive dots are provided, the light is not specularly reflected but rather is scattered by the diffusive dots as indicated in FIG. 28. As a consequence, some of the light is scattered out of the waveguide towards the image display layer 8.

Light is scattered out of the waveguide 74 only in regions 84 where diffusive dots are present, and no light is emitted from the waveguide 74 where there are no diffusive dots. The waveguide 74 thus has regions that emit light (corresponding to the regions 84 where diffusive dots are present) and has regions that do not significantly emit light. If the regions 84 where diffusive dots are provided have the form of stripes that extend into the plane of the paper in FIG. 28, the regions of the waveguide 74 that emit light correspond in size, shape and position to the transmissive regions of a parallax barrier such as, for example the parallax barrier 13 of FIG. 6(*a*), and the regions of the waveguide 74 that do not emit light correspond in size, shape and position to the opaque regions of a parallax barrier. Thus, a parallax barrier is effectively defined at the front face 74c of the waveguide 74, within the thickness of the color filter substrate 71.

Areas of the waveguide 74 where there are no diffusive dots may be coated in an absorptive material to ensure no light is scattered from these areas. This reduces the intensity of light emitted by areas of the waveguide that are intended to correspond to the opaque regions of the parallax barrier 13 of FIG. 6(*a*).

The diffusive dots may consist of diffusive structures, diffractive structures or micro-refractive structures. Their precise structure is not important, provided that light is scattered from the regions 84 where the diffusive dots are provided and is not significantly scattered in regions where the diffusive dots are not provided.

The display 76 of FIG. 28 does not require a parallax barrier aperture array, so that no light emitted by the waveguide 74 is absorbed by opaque regions of a parallax barrier aperture array. For a given output from the light source(s) 75, the display 76 of FIG. 28 thus provides a brighter image than a display, such as the display of FIG. 6(*a*), which has a parallax barrier aperture array.

The polarizer 73 acts as a conventional entrance polarizer for the image display layer 8. Depending on the mode of operation of the image display layer, a second linear polarizer (not shown) may be provided on the opposite side of the image display layer to the polarizer 73.

The display 76 may be manufactured using a method similar to that shown in FIGS. 26(*a*) to 26(*d*). In this method, an image display element, comprising the front substrate 6, the image display layer 8 and a rear substrate, would initially be manufactured. The rear substrate would then be reduced in thickness to form the transparent layer 72. Next, the polarizer 73 would be adhered to the transparent layer 72, and the waveguide 74 would be adhered to the polarizer 73.

Alternatively, the color filter substrate 71 may be manufactured by adhering the polarizer 73 to the waveguide 74. The transparent layer 72 may then be adhered to the polarizer 73 in the case of, for example, a glass transparent layer 72. Alternatively, a layer of transparent plastics or transparent resin may be disposed over the polarizer 73 to form the transparent layer 72. The completed color filter substrate 71 is then assembled with the TFT substrate 6 to form the display 76. In this method, the waveguide 74 forms a base substrate of the color filter substrate 71.

Figure 29:
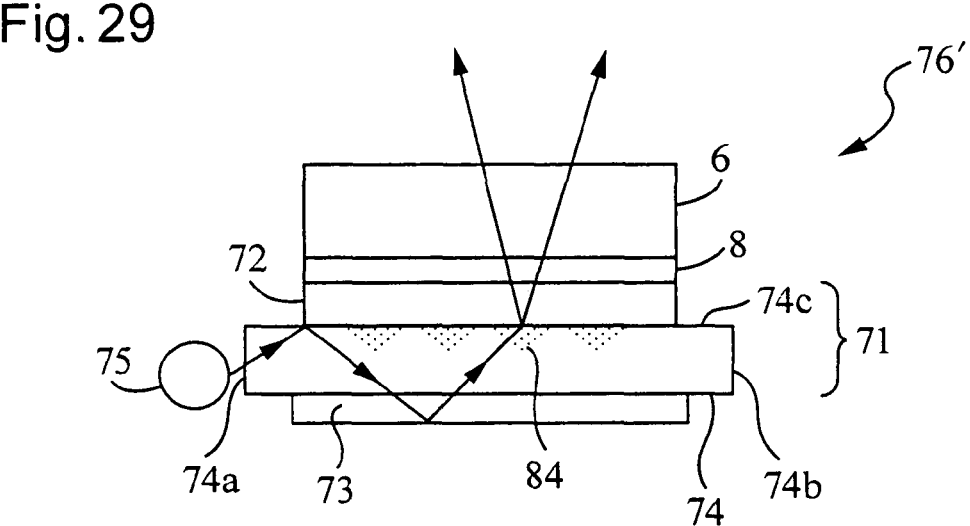
FIG. 29 illustrates a display according to a further example embodiment.

FIG. 29 is a schematic plan-sectional view of a multiple view directional display 76' according to a further example embodiment. The display 76' corresponds generally to the display 76 of FIG. 28, and only the differences will be described.

In the display 76' of FIG. 29 the polarizer 73 is placed adjacent to the rear face of the waveguide 74, and for example is adhered to the waveguide 74 using a transparent adhesive (not shown). The refractive indices of the waveguide 74, polarizer 73 and adhesive are chosen so that light propagating within the waveguide 74 passes into the polarizer 73 with substantially no internal reflection at the interface between the waveguide 74 and the polarizer 73. Internal reflection occurs at the rear face of the polarizer 73, as shown by the ray path in FIG. 29.

In this embodiment, the distance between the front face 74c of the waveguide 74 and the image display layer 8 is reduced by the thickness of the polarizer. Light that is internally reflected at the rear face of the waveguide is polarized upon reflection, and this polarization is preserved when light is scattered out of the waveguide.

Figure 30:
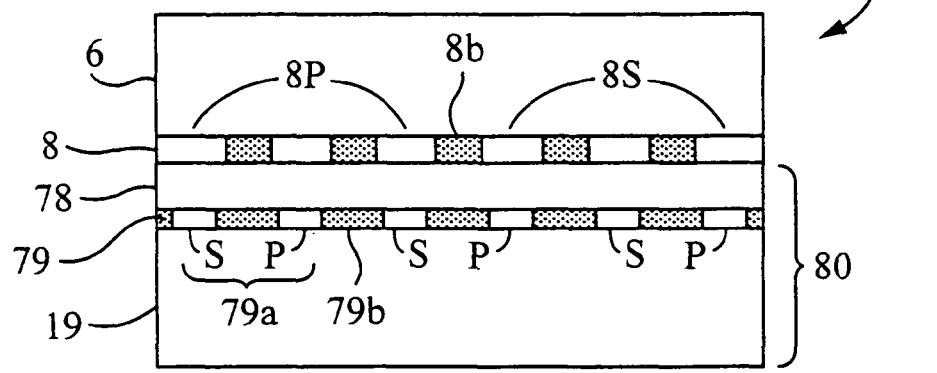
FIG. 30 illustrates a display according to a further example embodiment.

FIG. 30 is a schematic plan-sectional view of a multiple view directional display 77 according to a further example embodiment. The display 77 comprises a first transparent substrate 6 and a second transparent substrate 80, with an image display layer 8 disposed between the first substrate 6 and the second substrate 80. An array of color filters (not shown) is provided on the second substrate 80, and the second substrate will therefore be referred to as a color filter substrate.

The first substrate 6 is provided with pixel electrodes (not shown) for defining an array of pixels 8P,8S in the image display layer 8, and is also provided with switching elements (not shown) such as thin film transistors (TFTs) for selectively addressing the pixel electrodes. The substrate 6 will be referred to as a 'TFT substrate'. The image display layer 8 is, in this example, a liquid crystal layer 8. The invention is not limited to this, however, and any transmissive image display layer may be used.

The display 77 is assembled such that the color filters are each substantially opposite a respective pixel of the image display layer 8. Other components such as alignment layers may be disposed on the surfaces of the substrate 6, 80 adjacent to the image display layer, and a counter electrode or electrodes may also be disposed on the CF substrate 80; these components are conventional, and will not be described further. Furthermore, the display 77 may comprise further components such as polarizers, viewing-angle enhancement films, anti-reflection films etc., disposed outside the image display element; these components are also conventional and will not be described further.

In this embodiment the display comprises a parallax barrier 79 having transmissive portions 79a and opaque portions 79b. In this embodiment the opaque transmissive portions 79a of the parallax barrier 79 are polarizing apertures and transmit light of one polarization while substantially blocking light of an orthogonal polarization. The pixels 8S,8P emit/transmit light of either the first polarization state or the second polarization state. In FIG. 30 the two polarization states are taken to be the P- and S-linear polarization states. Pixels labelled "8S" or "8P" emit/pass light having the S-polarization or light having the P-polarization respectively. The transmissive portions 79a of the parallax barrier 79 are also labelled with a "P" or an "S" to denote whether they transmit light having the P-polarization or the S-polarization respectively.

The parallax barrier 79 is disposed over a base substrate 19. A transmissive spacer layer 78, which may be a layer of glass, transparent resin or transparent plastics, is provided between the image display layer 8 and the parallax barrier 79.

The parallax barrier may be formed of, for example, a patterned polarizer having regions that transmit P-polarized light but block S-polarized light and other regions that transmit S-polarized light but block P-polarized light. The opaque regions 79b may be deposited on the patterned polarizer by, for example, printing. Alternatively the parallax barrier may be formed of the combination of a uniform linear polarizer and a patterned retarder having regions that rotate the plane of polarization of light by 90° and other regions that do not rotate the plane of polarization of light; the opaque regions 79b may again be deposited by, for example, printing.

The parallax barrier 79 is arranged such that an aperture 79a that transmits light of a particular polarization is not in front of a pixel that emits/transmits light of that polarization. Thus, the apertures 79a that transmit the P-polarization state are not arranged in front of pixels 8P that transmit/emit the P-polarization state, and apertures 79a of the parallax barrier that transmit the S-polarization state are not arranged in front of pixels 8S that emit/transmit the S-polarization state. As a result, the light that is transmitted/emitted by a pixel of one polarization state can only pass through the parallax barrier 79 in first and second ranges of directions that are different from, and lie on opposite sides of, the normal to the display face of the display. Light that is emitted by, for example, a S-pixel in a direction parallel or close to the normal direction will be incident on an aperture 79a that transmits only the P-polarization or on an opaque portion 79b of the parallax barrier, and so will be blocked. The intensity of light emitted by the display of this embodiment in the normal direction, or in directions close to the normal direction, is therefore low. The device thus provides a black window between the viewing windows of the two images, and so provides the advantage explained above with reference to FIG. 11(*b*).

A black mask (denoted by non-transmissive regions 8b) is provided between adjacent pixels 8S, 8P. The angular extent of the black central window can be varied by altering the black mask: pixel ratio (while keeping the pixel pitch constant). The greater is the width of the black mask between adjacent pixels, the greater is the angular extent of the black central window.

The angular extent of the black central window is also determined by the width of the polarizing apertures 79a of the parallax barrier 79. The angular extent of the black central window may be varied by changing the width of the polarizing apertures (while keeping the aperture pitch constant). The smaller is the width of the polarizing apertures of the parallax barrier the greater will be the angular extent of the black central window.

In any of the embodiments described above which comprise a lens array, the lens array may be an array of GRIN (graded index) lenses, as described with reference to the embodiment of FIG. 20(*b*) above.

Figure 31:
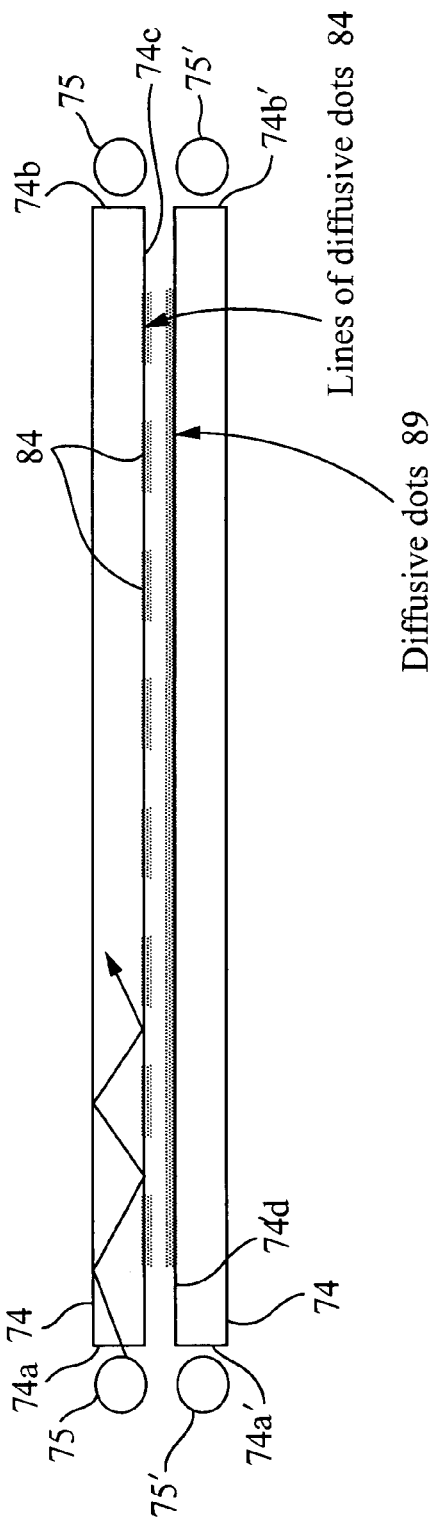
FIG. 31 illustrates a backlight suitable for use in a display.

FIG. 31 shows a modification of the backlight of the display 76 of FIG. 28. The backlight of FIG. 31 comprises a first waveguide 74 and one or more first light sources 75 arranged along sides of the first waveguide. Two first light sources 75 are shown in FIG. 31, arranged along opposite side faces 74a, 74b of the first waveguide 74, but the invention is not limited to this specific configuration and only one light source or more than two light sources could be provided. The light sources 75 preferably extend along all or substantially all of the respective side faces of the first waveguide and may be, for example fluorescent tubes.

Diffusive dots are provided at selected regions 84 of the back face 74c of the first waveguide 74. The regions 84 where diffusive dots are present may, for example, be stripe-shaped and extend into the plane of the paper in FIG. 31. If light propagating within the first waveguide is incident on a region 84 of the front face 74c of the waveguide where diffusive dots are provided, the light is not specularly reflected but rather is scattered out of the first waveguide as explained with reference to FIG. 28 above (in FIG. 31 the observer is assumed to be at the top of the page and light is scattered out of the first waveguide 74 in a generally upwards direction).

The backlight further comprises a second waveguide 74' and one or more second light sources 75' arranged along sides of the first waveguide. The second waveguide 74' is placed behind, and is generally parallel to, the first waveguide 74; the second waveguide 74' corresponds generally in size and shape to the first waveguide 74. Two second light sources 75' are shown in FIG. 31, arranged along opposite side faces 74a',74b' of the second waveguide 74', but the invention is not limited to this specific configuration, and only one second light source or more than two second light sources could be used. The light sources 75' preferably extend along all or substantially all of the respective side faces of the second waveguide and may be, for example fluorescent tubes.

Diffusive dots 89 are provided over substantially all of the front face 74d' of the second waveguide 74. Accordingly, when the second light sources 75' are illuminated, light is scattered out of the front surface 74d' of the second waveguide over most of its area.

The backlight of FIG. 31 is therefore switchable between a "patterned mode" and a "uniform mode". In the "patterned mode", the first light sources 75 are illuminated and the second light sources 75' are not illuminated. Light propagates only in the first waveguide 74, and the backlight has regions that emit light (these regions correspond to the regions 84 where diffusive dots are present) and has regions that do not emit light (these regions correspond to the regions where diffusive dots are not present). In the "uniform mode", the second light sources 75 are illuminated and light propagates in the second waveguide. Since diffusive dots 89 are provided over substantially the entire front face 74d' of the second waveguide 74', the backlight provides substantially even illumination over its entire area in the "uniform mode". A display provided with the backlight of FIG. 31 may be switched from a directional display mode to a conventional 2-D display mode by switching the backlight from the "patterned mode" to the "uniform mode".

In the "uniform mode", the first light sources 75 can be illuminated or can be not illuminated. If desired, the first light sources can be kept ON continuously, and the backlight is put in either the "uniform mode" or the "patterned mode" by switching the second light sources 75' ON or OFF respectively. (Keeping the patterned waveguide illuminated in the uniform mode may cause some variations in intensity across the area of the backlight, but this possible disadvantage may be outweighed in some application by the need to switch only the second light sources 75'.)

In order to ensure that internal reflection occurs at the back face 74c of the first waveguide, it is necessary that the space between the first waveguide 74 and the second waveguide 74' has a lower refractive index than the first waveguide 74. This can conveniently be achieved by providing an air-gap between the first waveguide 74 and the second waveguide 74', or alternatively the space the first waveguide 74 and the second waveguide 74' may be filled with a light-transmissive material having a low refractive index.

The rear surface of the regions 84 where diffusive dots are provided on the first waveguide 74 may be made reflective, for example by applying a metal coating. If this is done, any light that is scattered towards the second waveguide 74' by the diffusive dots will be reflected back towards an observer. (If the rear surface of the regions 84 where diffusive dots are provided on the first waveguide 74 is made reflective, it is necessary that the first light sources and the second light sources are illuminated to obtain the uniform mode, since the reflector would block light scattered upwards from the second waveguide 74.)

Each waveguide may be provided with an antireflection coating (not shown)

Figure 32:
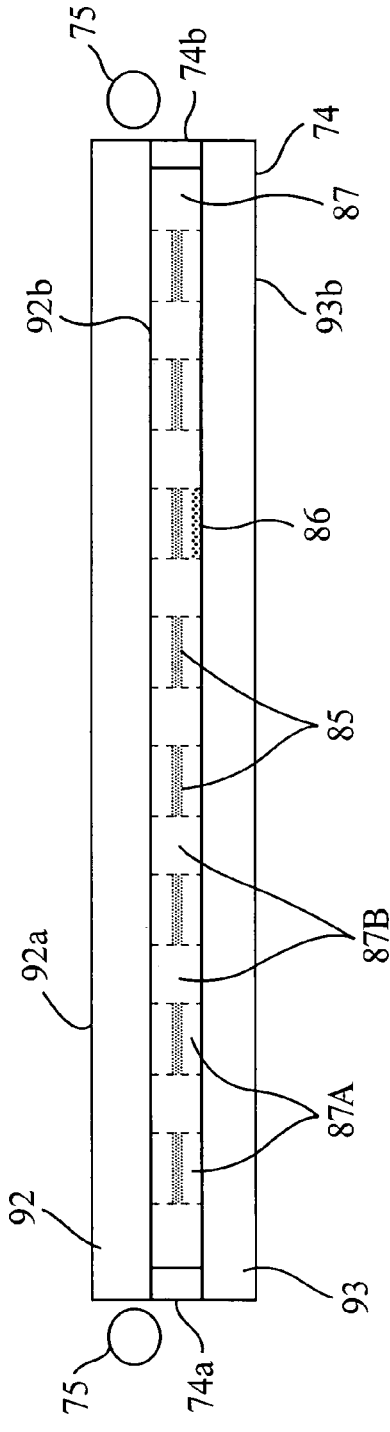
FIG. 32 illustrates a further backlight suitable for use in a display.

FIG. 32 shows another backlight according to an example embodiment. The backlight comprises a waveguide 74 and one or more light sources 75 arranged along sides of the waveguide. Two light sources 75 are shown in FIG. 32, arranged along opposite side faces 74a, 74b of the waveguide 74, but the invention is not limited to this specific configuration, and only one light source or more than two light sources could be used. The light sources 75 preferably extend along all or substantially all of the respective side faces of the waveguide and may be, for example fluorescent tubes.

The waveguide 74 comprises a layer of liquid crystal material 87 sandwiched between two light-transmissive substrates 92,93. The liquid crystal layer is addressable, for example by means of electrodes (not shown) that allow an electric field to be applied across the liquid crystal layer 87. Regions 87A, 87B of the liquid crystal layer (indicated by broken lines in FIG. 32) are addressable independently from one another, for example by the use of appropriately patterned electrodes that allow an electric field to be applied across a selected region of the liquid crystal layer. The regions 87A,87B of the liquid crystal layer may, for example, be stripe-shaped and extend into the plane of the paper in FIG. 32.

Regions 87A, 87B of the liquid crystal layer may be switched to a scattering mode or to a clear, light-transmissive mode. If all the liquid crystal regions are switched to a light-transmissive mode, light propagates in the waveguide with minimal scattering—light undergoes internal reflection at the upper face 92a of the upper substrate 92, passes through the upper substrate 92 and the liquid crystal layer 87 into the lower substrate 93, undergoes internal reflection at the lower surface 93b of the lower substrate 93 and is reflected back towards the upper substrate 92, and so on. Little or no light is emitted from the waveguide.

In order to cause emission of light from the waveguide, one or more of the liquid crystal regions are switched to form a scattering region shown schematically as 85 in FIG. 32. When light propagating within the first waveguide is incident on a scattering region 85, light is scattered out of the waveguide as explained with reference to FIG. 28 above (in FIG. 32 the observer is assumed to be at the top of the page and light is scattered out of the waveguide 74 in a generally upwards direction).

FIG. 32 shows the waveguide when every alternate liquid crystal region 87A is switched to produce a scattering region 85. The other liquid crystal regions 87B are switched so as to be non-scattering. Light is emitted only from regions of the front face of the waveguide 74 that correspond generally to the scattering regions 85, and the backlight operates in a "patterned mode".

If all the liquid crystal regions 87A, 87B are switched to form scattering 15 regions, the liquid crystal layer 87 scatters light over substantially its entire area so that light is emitted from substantially the entire area of the waveguide 74. Thus, when all liquid crystal regions 87A, 87B are switched to form scattering regions the backlight operates in a "uniform mode". The backlight can therefore be switched between a "patterned mode" and a "uniform mode", by switching the liquid crystal regions accordingly. A display provided with the backlight of FIG. 32 may be switched from a directional display mode to a conventional 2-D display mode by switching the backlight from the "patterned mode" to the "uniform mode".

In one implementation of backlight of FIG. 32, the rear face 92b of the upper substrate 92 is smooth over its entire area. This implementation requires that the layer 87 comprises a liquid crystal material that can be switched between a state in which it transmits light without significant scattering and a state in which it scatter light, for example, such as a polymer-dispersed liquid crystal (PDLC). A scattering region 85 is obtained by switching a region of the liquid crystal layer to its scattering mode.

Thus, the regions 87A, for example, of the liquid crystal layer are switched to the scattering mode to produce the scattering regions 85; light passing from the of the upper substrate 92 into regions 87A of the liquid crystal layer is scattered by the liquid crystal, and some light is reflected upwards and can pass out of the front face of the waveguide 74. Conversely, regions 87B of the liquid crystal layer are switched to the non-scattering mode; light passing from the upper substrate 92 into regions 87B of the liquid crystal layer simply passes through into the lower substrate without being scattered by the liquid crystal. With regions 87B of the liquid crystal layer in the non-scattering mode, the backlight is in its "patterned mode".

To obtain the "uniform mode" of the backlight, all regions 87A, 87B of the liquid crystal layer are switched to their scattering mode. The rear face of the waveguide 74 is then scattering over substantially its entire area.

In this implementation it is possible to vary the size and position of the scattering regions 85 and non-scattering regions. For example, it would be possible to switch two adjacent liquid crystal regions to the scattering mode, the next liquid crystal region to the non-scattering mode, the next two liquid crystal regions to the scattering mode, the next liquid crystal region to the non-scattering mode etc., to simulate a parallax barrier having a 2:1 aperture: barrier ratio.

Alternatively, the regions of the rear face 92b of the upper substrate 92 corresponding to the desired positions of the scattering regions 85 may be made rough so that these regions would always scatter light. The backlight could be switched between a "uniform mode" and a "patterned mode" by switching the liquid crystal regions 87B to the scattering mode or the non-scattering mode respectively.

As a further alternative, the back face 92b of the upper substrate may be optically rough over its entire area. This embodiment requires a layer 87 of a liquid crystal material having a refractive index that can be altered. A scattering region 85 is obtained by switching the corresponding liquid crystal region 87A so that the refractive index of the liquid crystal does not match the refractive index of the waveguide 74. Light propagating in the upper substrate will "see" the optically rough surface of the back face of the upper substrate, and will be scattered.

A non-scattering region is obtained by switching the corresponding liquid crystal region 87B so that the refractive index of the liquid crystal in region 87B matches the refractive index of the upper substrate 92. Light propagating in the upper substrate will not "see" the optically rough surface, and will pass into the liquid crystal layer without being scattered (being subsequently internally reflected at the rear face 93b of the lower substrate).

A reflector may be provided behind the scattering regions 85, if the position of the scattering regions is fixed, and this is shown at 86 in FIG. 32. Any light that is scattered towards the rear substrate 93 by the scattering region 85 will be reflected by the reflector 86 towards the observer.

Figure 33:
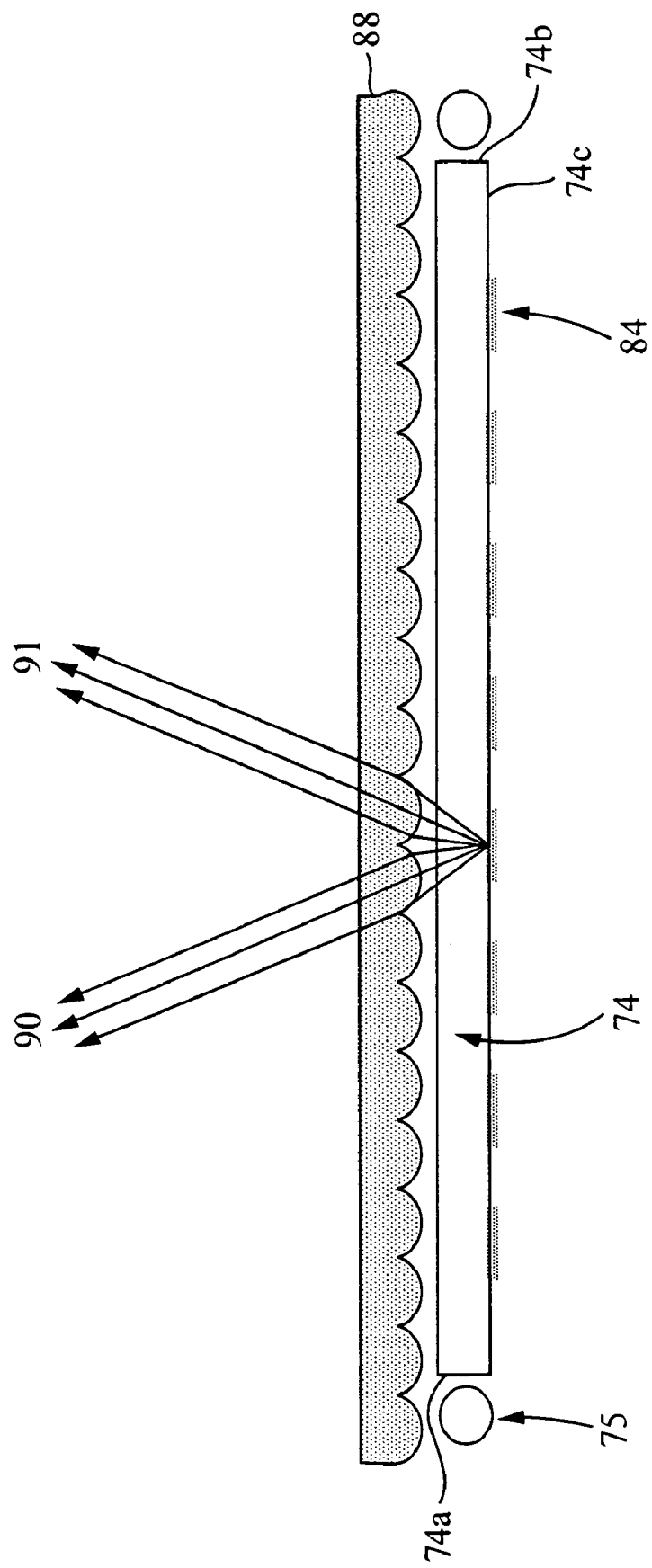
FIG. 33 illustrates a further backlight suitable for use in a display.

FIG. 33 shows a further backlight. The backlight comprises a waveguide 74 and one or more light sources 75 arranged along sides of the waveguide. Two light sources 75 are shown in FIG. 33, arranged along opposite side faces 74a, 74b of the waveguide 74, but the invention is not limited to this specific configuration and only one light source or more than two light sources could be used. The light sources 75 preferably extend along all or substantially all of the respective side faces of the waveguide and may be, for example fluorescent tubes.

Diffusive dots are provided at selected regions 84 of the back face 74c of the waveguide 74. The regions 84 where diffusive dots are present may, for example, be stripe-shaped and extend into the plane of the paper in FIG. 31. If light propagating within the first waveguide is incident on a region 84 of the front face 74c of the waveguide where diffusive dots are provided, the light is not specularly reflected but rather is scattered out of the first waveguide as explained with reference to FIG. 28 above (in FIG. 33 the observer is assumed to be at the top of the page, and light is scattered out of the first waveguide 74 in a generally upwards direction).

A lens array 88 is disposed in front of the waveguide 74. The lens array directs left emitted by the waveguide 74 predominantly into a first direction (or first range of directions) 90 and into a second direction (or second range of directions) 91. The first direction (or first range of directions) 90 and the second direction (or second range of directions) 91 are preferably separated by a third range of directions which includes the normal direction. Since light is directed predominantly into the first and second directions (or first and second ranges of directions) 90,91, the intensity of light in the first and second directions (or first and second ranges of directions) 90,91 is greater than the intensity in the third range of direction. The first direction (or first range of directions) 90 and the second direction (or second range of directions) 91 are on opposite sides of the normal direction, and are preferably substantially symmetrical with respect to the normal.

The backlight of FIG. 33 is particularly suitable for use with a directional display. A typical dual view display, for example, displays two images, with the images being displayed along directions lying on opposite sides of the normal direction. The backlight of FIG. 33 directs light predominantly into the directions in which the two images are displayed by the dual view display, and so produces bright images. In contrast, a conventional backlight has its greatest intensity along the normal direction, and has a low intensity when viewed from an off-axis direction.

A 4 view illumination system can be created by using a 2D array of microlenses, and a 2D array of diffusive dots. This will provide four views arranged two views above two views, so providing both horizontal and vertical separation of views.

Figure 34:
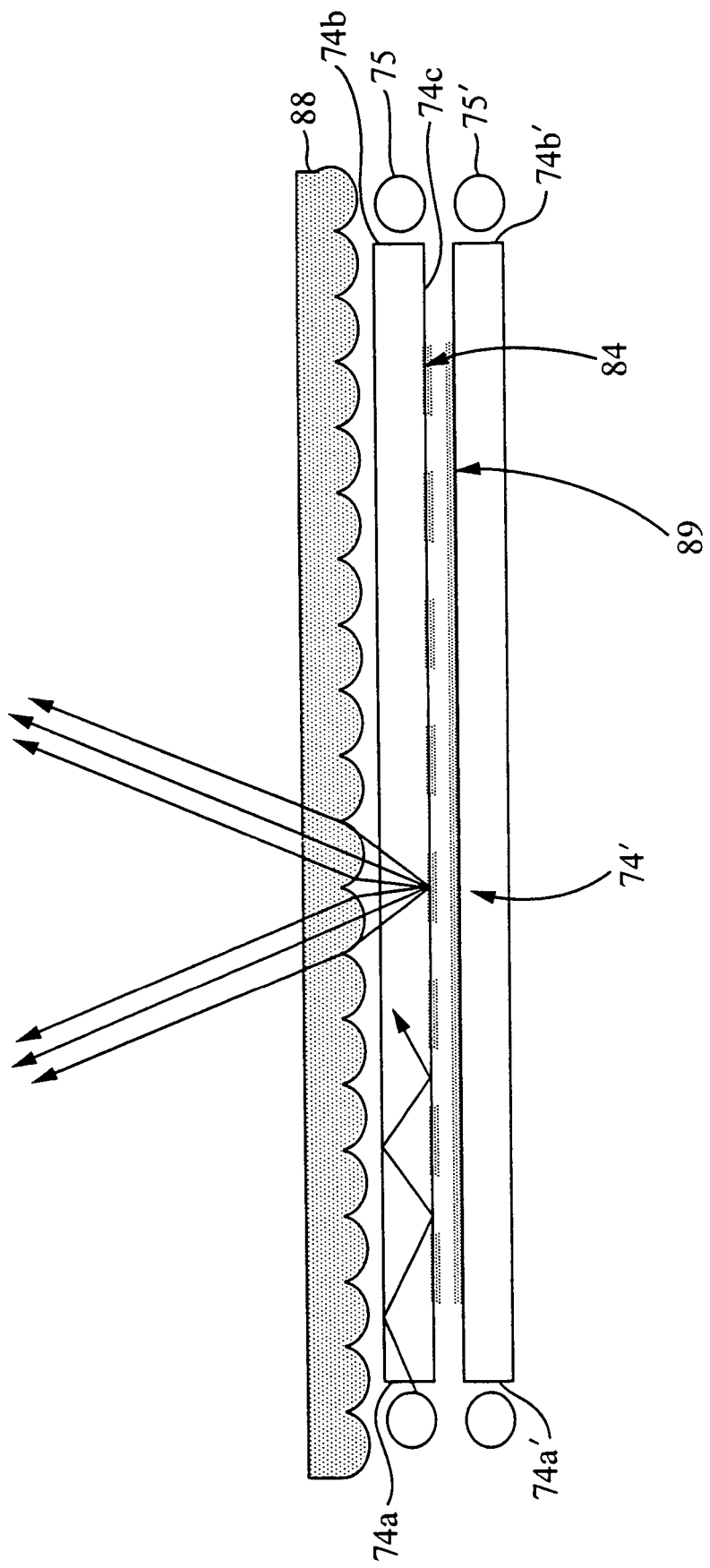
FIG. 34 illustrates a further backlight suitable for use in a display.

FIG. 34 shows a further backlight. This backlight is similar to the backlight of FIG. 33 in that it is provided with a lens array for directing the emitted light into two preferred directions (or ranges of directions) 90,91. The backlight of FIG. 34 further comprises a second waveguide 74' and second light sources 75' arranged along respective sides of the second waveguide 75. Diffusive dots 89 are provided over substantially the entire front face of the second waveguide 75'. The second waveguide 75' of FIG. 34 corresponds generally to the second waveguide 75' of FIG. 31. The backlight of FIG. 34 may be switched between a "patterned mode" and a "uniform mode", in the manner described above for the backlight of FIG. 31.

The backlights of FIGS. 31 to 34 may be incorporated in, for example, the display 76 of FIG. 28 or the display 76' of FIG. 29.

In the embodiments of FIGS. 31 to 34, the density of diffusive dots can be adjusted to alter the spatial illumination uniformity, to compensate for the decrease in intensity of light propagating within the waveguide as the distance from a light source 75 increases. This may be applied to both waveguides in the embodiments of FIGS. 31 and 34

In the embodiments of FIGS. 31 to 34 the diffusive dots may be replaced by a micro reflecting structure such as prisms, protrusions etc. This could be used, for example, for controlling the directionality of emission from the regions of the waveguides where diffusive dots are provided.

In the embodiments described above the parallax optic has been disposed on the same substrate as the color filters. It would alternatively be possible to dispose the parallax optics on the TFT substrate 6 of the display and, for every embodiment described above with a parallax optic provided on the color filter substrate, there is a corresponding embodiment in which a parallax optic is provided on the TFT substrate. In such modified embodiments, an array of switching elements such as an array of TFTs and the elements of the parallax optics would be disposed over a base substrate of the TFT substrate, possibly with a spacer layer interposed between the parallax optic and the thin film transistors. The separation between the parallax barrier and the image display layer would again be substantially the thickness of the spacer layer (assuming that the spacer layer was disposed over the parallax optic). Moreover, in the embodiments of FIGS. 22 to 25, the prisms 53 may be disposed on the TFT substrate.

Furthermore, in some liquid crystal panels the color filters are disposed on the same substrate as the thin film transistors. The invention may then be applied to such a device; For example, a light-transmissive spacer layer (for example a resin, glass or plastics spacer layer) may be disposed over the TFTs (or other switching elements) and the color filters, and the parallax optic may be disposed over the spacer layer.

Figure 4:
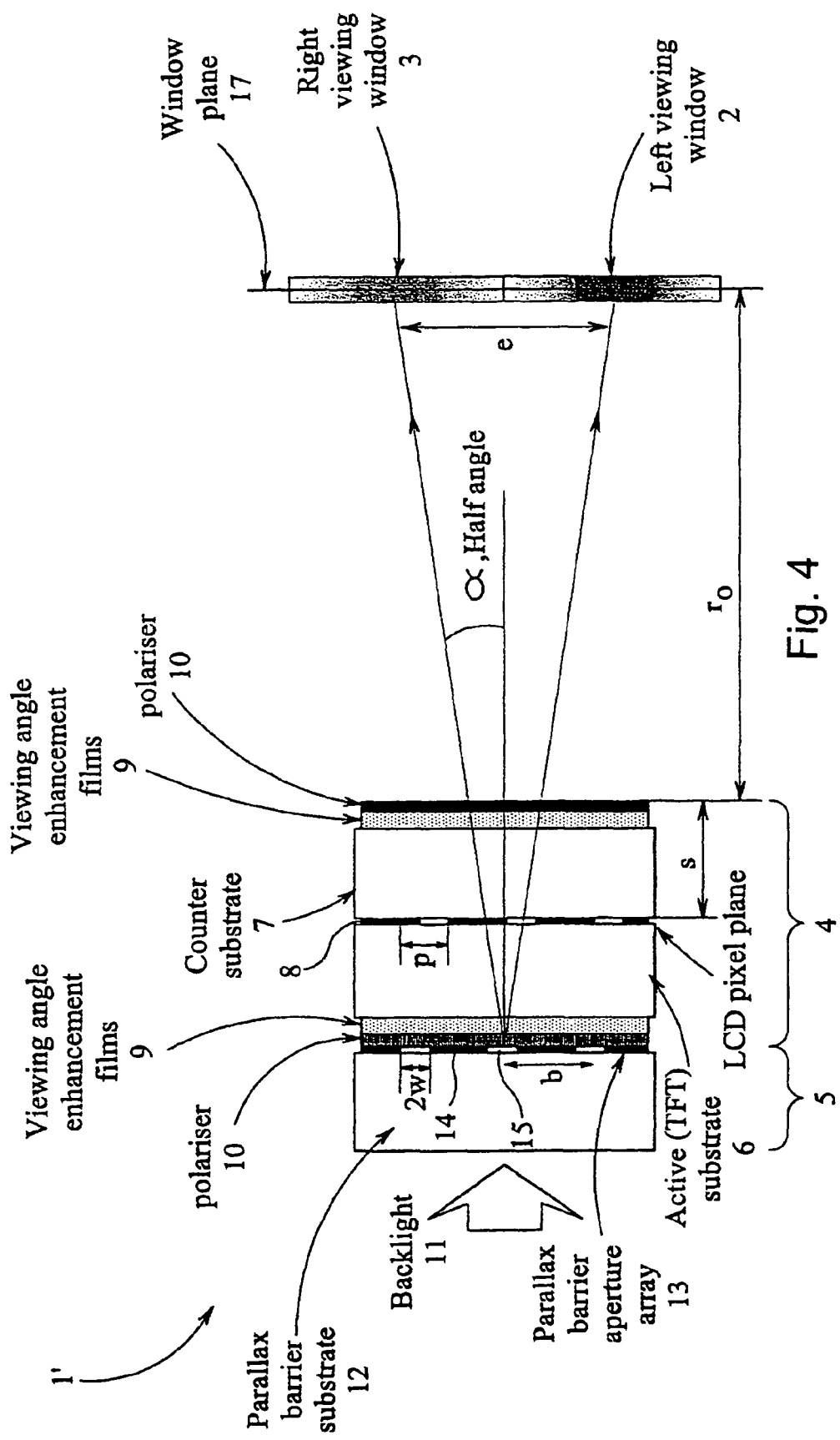
FIG. 4 is a schematic plan view of another conventional auto-stereoscopic display device.

Some of the foregoing example embodiments of the invention, with the exception of those shown in FIGS. 22-25, and 28 to 34, may be used as either a rear barrier device (as in FIG. 4) or as a front barrier device (as in FIG. 1).

Where a device in which the parallax optic is a parallax barrier is used in the rear-barrier mode of FIG. 4, it is preferable if the parallax barrier elements are reflective on the side facing the back light. Light from the back light that is incident on the opaque regions of the barrier will then be reflected, and can be re-reflected from the back light so that it may pass through the parallax barrier and thus through the display device. This would increase the brightness of the display. The surface of the parallax barrier elements facing away from the backlight is preferably absorbing, to prevent cross-talk.

In one aspect of the technology, a parallax optic is provided which comprises plural spaced apart lenses, the lenses being arranged in an array in an array plane and spaced apart within the array plane. Preferably the spaced apart lenses are separated by regions in the array plane which are non-transmissive of/to visible light. The regions which are non-transmissive to visible light can be filled with light-absorptive material or light reflecting material or both. The regions which are non-transmissive to visible light can be, for example, black mask regions (e.g., regions occupied by a light non-transmissive mask). In some embodiments, the spaced apart lenses of the parallax optic are discrete elements of a lens array. In these embodiments, the spaced apart lenses are discrete in the sense that they are insular, e.g., not integrally formed or connected together as a single layer (although the discrete lens elements may all be formed on an adjacent substrate layer). In other embodiments, the lens elements are formed as convex elements integral with and extending from a lenticular layer. In these embodiments, the lenticular layer may or may not be formed on a separate substrate, depending on factors such as thickness of the lenticular layer. In the various embodiments, and as subsequently illustrated, the black mask (or the light non-transmissive regions) does not extend beyond a height or extent of projection of the lens elements (e.g., of the lenticules or plural spaced apart lenses). For example, the black mask or the light non-transmissive regions can lie in a plane that extends through the lens elements.

Figure 35:
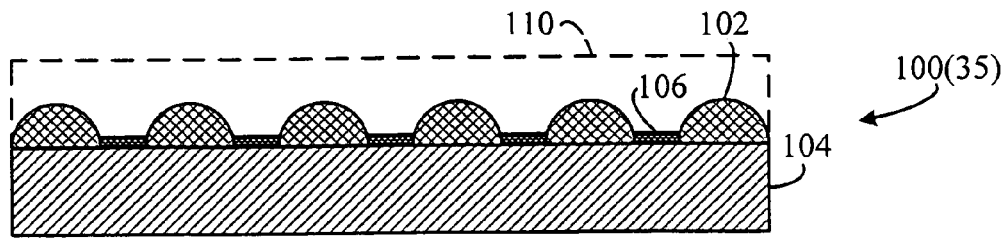
FIG. 35 is a side sectioned view of a parallax optic according to one example embodiment.

FIG. 35 shows a first example embodiment of a parallax optic 100(35) having discrete, spaced-apart lenses. The parallax optic 100(35) of FIG. 35 comprises plural discrete lens elements 102 formed as an array on an underlying lenticular substrate 104. In the embodiment of FIG. 35, lens elements 102 are formed as plano-convex lens elements on lenticular substrate 104. The lenticular substrate 104, being formed as a separate layer from the lens elements 102, has a planar top layer upon which the lens elements 102 are formed. Preferably the lens elements 102 are formed simultaneously, and (as in other example embodiments hereinafter described) may be formed from materials such as a light-transmissive resin or light transmissive plastics, which may be patterned.

Portions of the top surface of lenticular substrate 104 upon which the lens elements 102 are not formed are regions which are non-transmissive of/to visible light. Such regions between the discrete lens elements 102 can be occupied by a light absorptive material, a light reflective material, or both. In the particular implementation shown in FIG. 35, the non-transmissive regions are occupied by a black masking material 106. The black mask 106 can be deposited or otherwise formed on the top surface of lenticular substrate 104, and preferably has a thickness considerably smaller than the height or extent of projection of the lens elements 102 from the lenticular substrate 104. In one example, non-limiting implementation, the black mask 106 is realized by coating the lenses with a black photo-resist, and etching the black mask off the lenses by standard lithographic techniques. The lenses are therefore left transmissive, whilst the areas between the lenses have the absorbing coating. In this and subsequent embodiments, rather than the light non-transmissive regions being occupied by a material, the top surface of lenticular substrate 104 in these regions can be treated in any suitable manner for rendering the surface light non-transmissive.

In the particular embodiment shown in FIG. 35, the lens elements 102 of the lenticular array formed by the discrete lens elements 102 are plano-convex. If desired, the parallax optic 100(35) of FIG. 35 can optionally be provided with a spacer 110 which extends over the entire lenticular array and the black mask 106. Spacer 110 can be formed from glue, air, or other fluid. If spacer 110 is solid, preferably a top surface of the spacer 110 is planarized to facilitate, e.g., incorporation of parallax optic 100(35) in or to an image display element. The optional nature of spacer 110 is emphasized in this and other embodiments in that the spacer 110 is shown with phantom lines.

Figure 36:
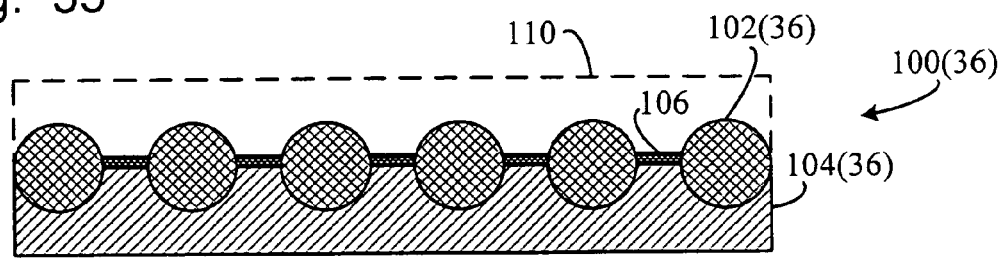
FIG. 36 is a side sectioned view of a parallax optic according to another example embodiment.

FIG. 36 shows another embodiment of a parallax optic having discrete lens elements 102. The parallax optic 100(36) of FIG. 36 comprises convexo-convex lens elements 102(36). The discrete, spherical or quasi-spherical lens elements 102 (36) are formed on or encased on at least one side thereby by a lenticular substrate 104(36). The non-transmissive regions between the lens elements 102(36) can be filled by the light absorptive or light reflective material, again exemplified by black mask 106, or the top surface of lenticular substrate 104(36) treated to render the regions non-transmissive. An optional (preferably planarizing) spacer 110 can also be formed over lens elements 102(36) of the lenticular array and over the black mask 106.

Figure 37:
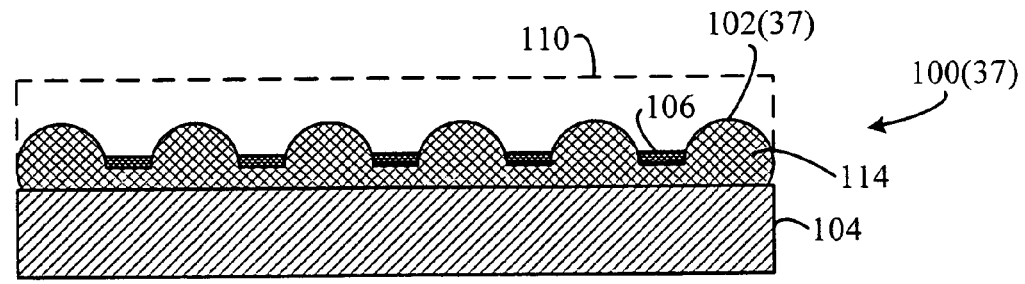
FIG. 37 is a side sectioned view of a parallax optic according to another example embodiment.

FIG. 37 shows a first example embodiment of a parallax optic having non-discrete lens elements 102(37), i.e., lens elements 102(37) extending as convex elements from a common, integral lenticular layer 114. The lenticular layer 114 and the lens elements 102(37) extending therefrom in convex fashion are formed from a same material through which the lens elements 102(37) are connected to one another. Regions between lens elements 102(37) are rendered non-transmissive by one or more techniques as previously described, including but not limited to provision of black mask 106. The lenticular layer 114 can be formed on or adhered to a lenticular substrate 104, if desired. Alternatively, the lenticular layer 114 can have a thickness or other properties to serve itself as the lenticular substrate 104. Further, the parallax optic 100 (37) of FIG. 37 can be provided with an optional spacer 110, as previously explained.

Figure 38:
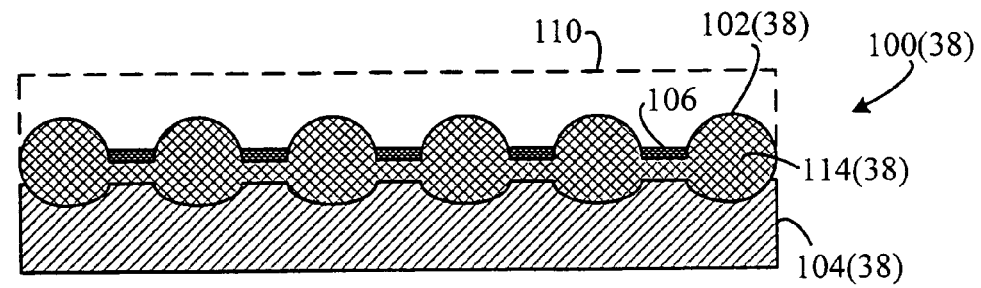
FIG. 38 is a side sectioned view of a parallax optic according to another example embodiment.

Whereas the parallax optic 100(37) of FIG. 37 has plano-convex lens elements 102(37) formed as an array, FIG. 38 illustrates another embodiment wherein the lens elements 102(38) of the integral lenticular layer 114(38) are formed as essentially convexo-convex lens elements. The convexo-convex lens elements 102(38) have convexities of each lens element extending from both top and bottom surfaces, with regions of non-transmissivity provided between lens elements 102(38). In the FIG. 38 embodiment, lenticular substrate 104(38) is provided with grooves or channels to accommodate the convex projections of lens elements 102(38) which contact the lenticular substrate 104(38).

Figure 39:
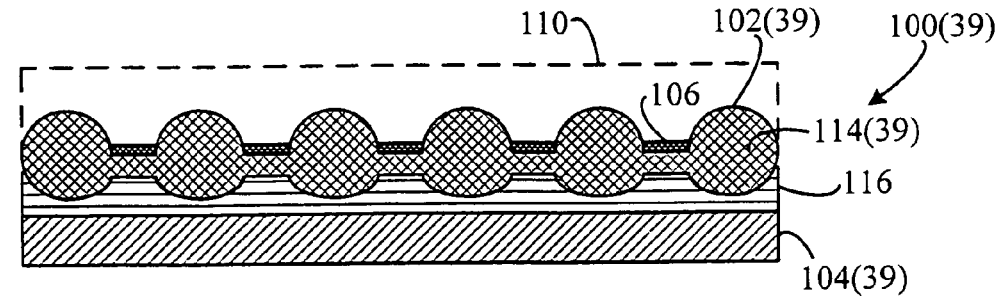
FIG. 39 is a side sectioned view of a parallax optic according to yet another example embodiment.

The parallax optic 100(39) of FIG. 39 resembles parallax optic 100(38) of FIG. 38, but differs in that lenticular substrate 104(39) has a planar top surface over which a lens support layer 116 is formed. It is the lens support layer 116 in the embodiment of FIG. 39 that is configured to accommodate the convex projections of one side of lenticular layer 114(39).

Figure 40:
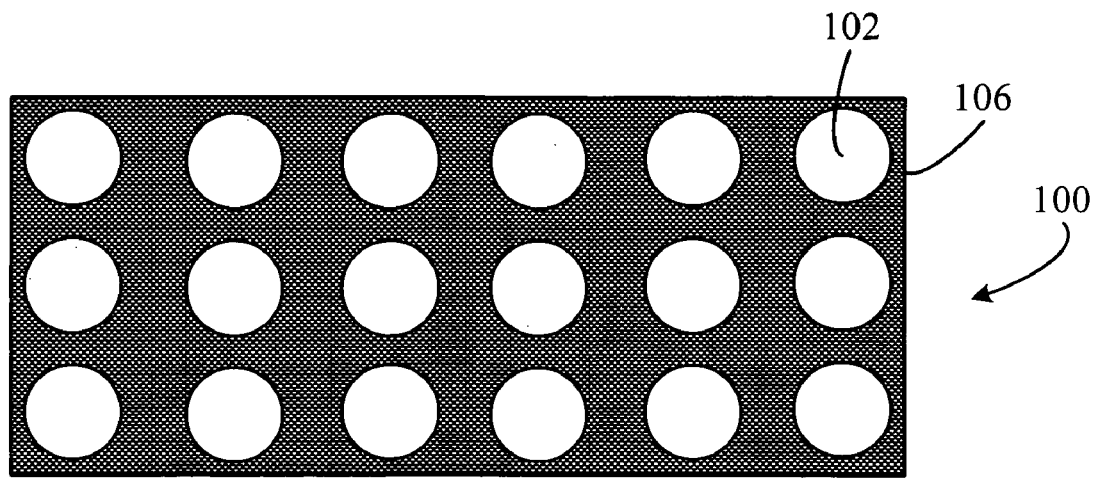
FIG. 40 is a top view of a parallax optic according an example embodiment.

FIG. 40 illustrates the appearance of the non-transmissive regions of an example parallax optic as seen from above the lenticular array. In the particular illustration of FIG. 40 in which the parallax optic is represented by a generic parallax optic 100, a black mask 106 is shown in the non-transmissive regions between generic lens elements 102. The black mask 106 can be deposited as a layer, or otherwise (when pre-cut with apertures for the lens elements 102) laid over the lenticular array in a manner to expose the lens elements 102.

In other aspects of the technology herein described, parallax optic devices according to any of the preceding embodiments or other embodiments encompassed hereby are combined with one or more image display elements to form an image display device. For embodiments of image display devices featuring or providing two-dimensional (2D) viewability, the parallax optic is preferably near or included in the image display element. Numerous examples of image display elements having included or incorporated parallax optics have been previously described, one such embodiment being that of FIG. 15(d) which also happens to have a parallax optic with a black mask in regions between lens elements. On the other hand, for embodiments of image display devices featuring or providing three-dimensional (3D) viewability, the parallax optic is situated outside the image display element.

Figure 41:
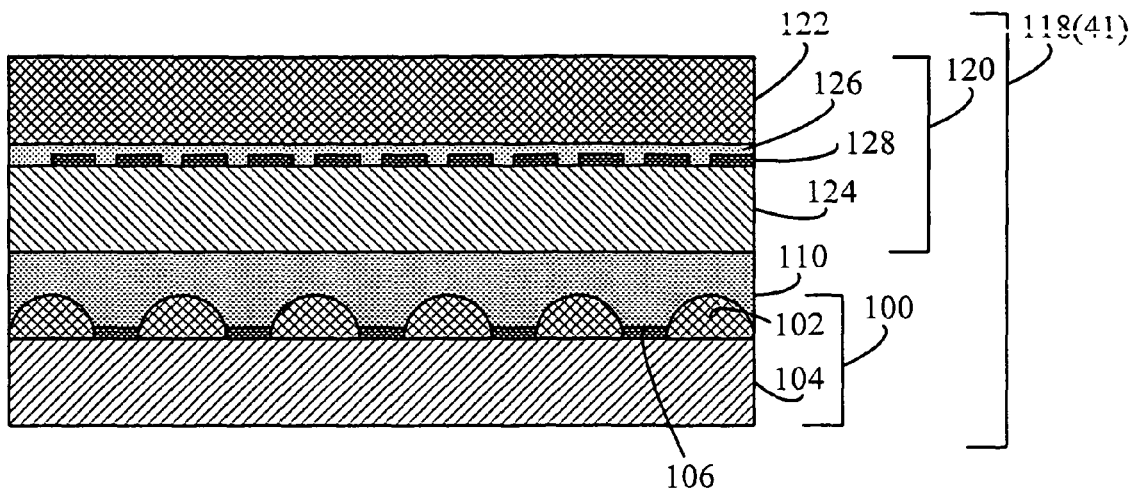
FIG. 41 is a side sectioned view of an image display device according to an example embodiment.

FIG. 41 shows a first example embodiment of an image display device which combines a parallax optic (such as parallax optic 100 of the embodiment of FIG. 35) with an example image display element having a 3D viewing capability. In particular, FIG. 41 shows image display device 118(41) comprising parallax optic 100 and image display element 120. The parallax optic 100 is covered by planarizing spacer 110, as understood from the preceding discussion of the FIG. 35 embodiment. The image display element 120 of FIG. 41 comprises both a thin film transistor substrate 122 and a counter substrate 124, with pixels of liquid crystal 126 and a color filter 128 formed between the thin film transistor substrate 122 and the counter substrate 124.

The construction of the image display device and the elements thereof can be accomplished in various ways, particularly with (but not limited to) reference to the foregoing embodiments. After formation of the image display element 120, the parallax optic 100 is formed or otherwise bonded to the counter substrate 124 to provide the image display device 118(41). Thus, for the example embodiment of FIG. 41, the parallax optic 100 is situated outside the image display element 120.

Figure 42:
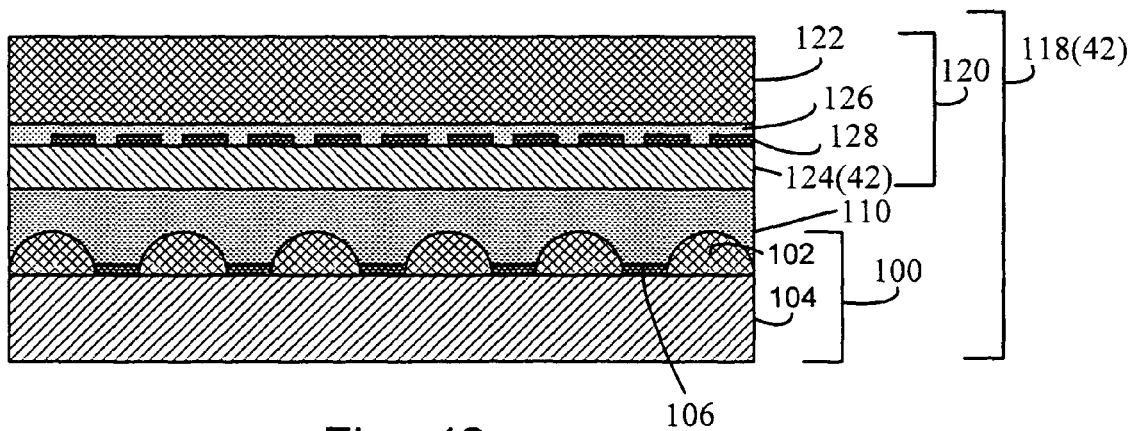
FIG. 42 is a side sectioned view of an image display device according to another example embodiment.

Whereas the counter substrate 124 of the embodiment of FIG. 41 has a considerable and conventional thickness, the counter substrate 124(42) of the embodiment of FIG. 42 has been thinned in thickness, and actually is considerably thinner than the counter substrate 124 of the embodiment of FIG. 41. For example, the counter substrate 124(42) can be thinned so that its thickness is 400 microns or less, which is thinner than a conventional counter substrate (a conventional counter substrate having a thickness of in a range of from about 0.4 mm to 1.1 mm). The thinning of the counter substrate 124(42) of the FIG. 42 can be accomplished by various techniques, such as chemical etching, or polishing, for example. The formation and/or bonding of the parallax optic 100 on the thinned counter substrate 124(42) enables or permits the thinning of the counter substrate 124(42) since, among other things, the parallax optic 100 provides stability and other properties which otherwise might be lacking in view of the thinning of the counter substrate 124(42). The composition and structure of the remainder of the image display device 118 of FIG. 42 is understood from comparable structure of other embodiments. For example, the structure of the parallax optic 100 illustrated in FIG. 42 embodiment happens to be that of the parallax optic 100 of FIG. 35, although it should be understood that other parallax optic embodiments as described herein or encompassed hereby may alternatively be used.

Figure 43:
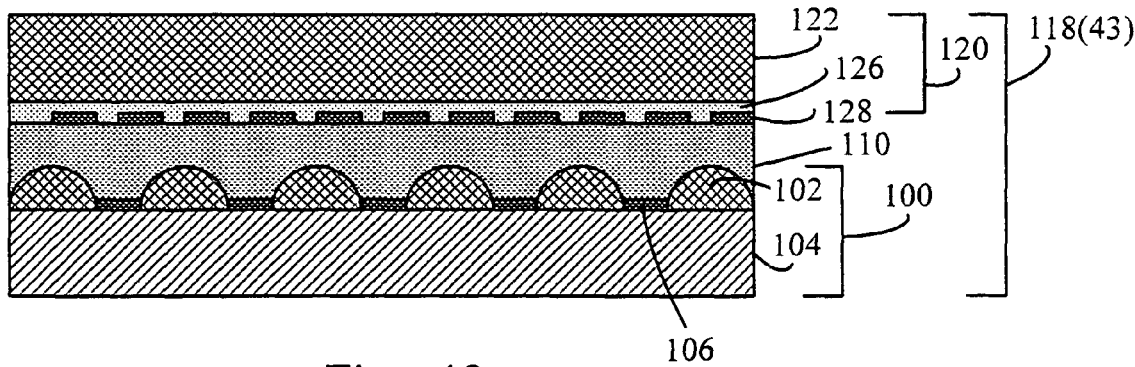
FIG. 43 is a side sectioned view of an image display device according to a further example embodiment.

The image display device 118(42) of the embodiment of FIG. 42 thus shows that strategic use of the parallax optic can permit the counter substrate to be thinned, thereby advantageously promoting compactness and yet maintaining stability for a 3D viewable display. It should be understood that, if desired, the counter substrate 124 can be completely eliminated as shown in FIG. 43 and understood from the previously described embodiments, including the embodiment of FIG. 15(d).

Figure 44:
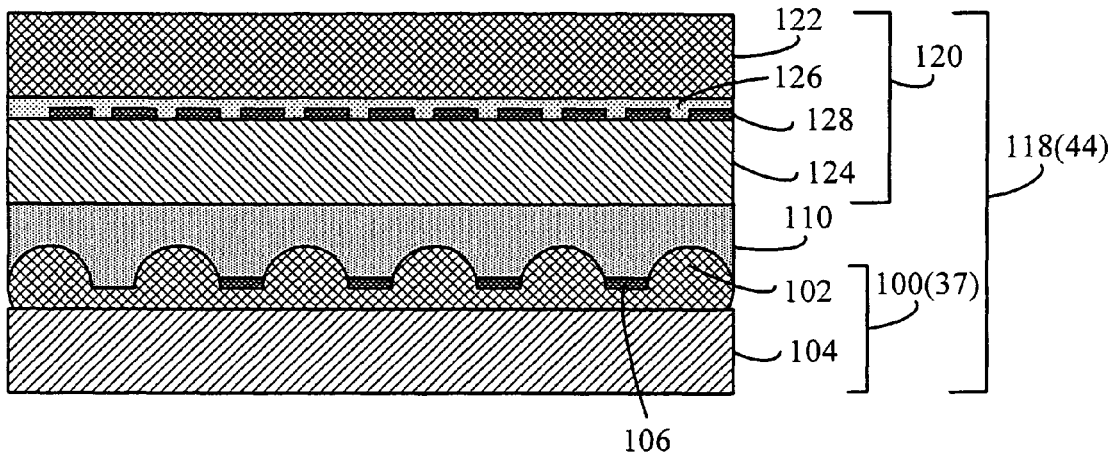
FIG. 44 is a side sectioned view of an image display device according to yet yet another example embodiment.
Figure 45:
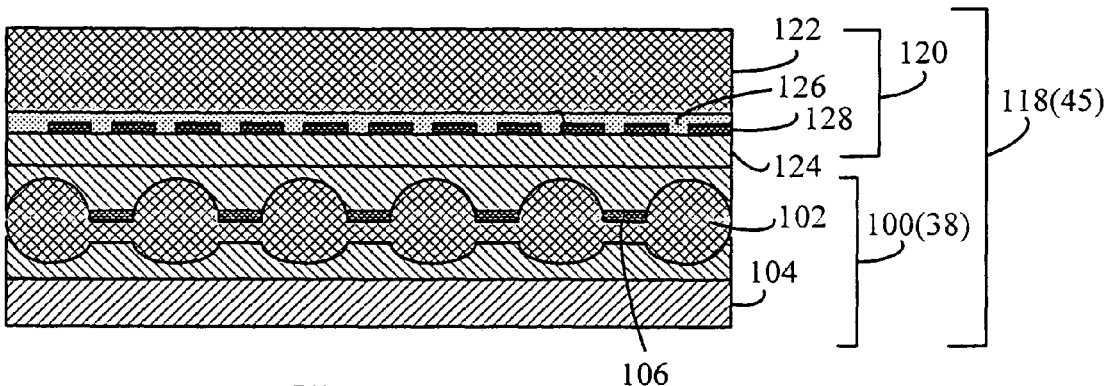
FIG. 45 is a side sectioned view of an image display device according to yet another example embodiment.

Whereas the image display devices of FIG. 41 through FIG. 42 are illustrated in conjunction with a parallax optic such as the type of FIG. 35, it should be understood that image display devices including or incorporating other embodiments of parallax optics are also within the ambit of the disclosed technology. For example, FIG. 44 illustrates an embodiment of an image display device 118(44) which is similar to that of FIG. 40, but which instead employs a parallax optic such as that of FIG. 37. As another non-limiting example, FIG. 45 illustrates an embodiment of an image display device 118(45) which is also similar to that of FIG. 41, but which instead employs a parallax optic 100 such as that of the type of FIG. 38.

Figure 46:
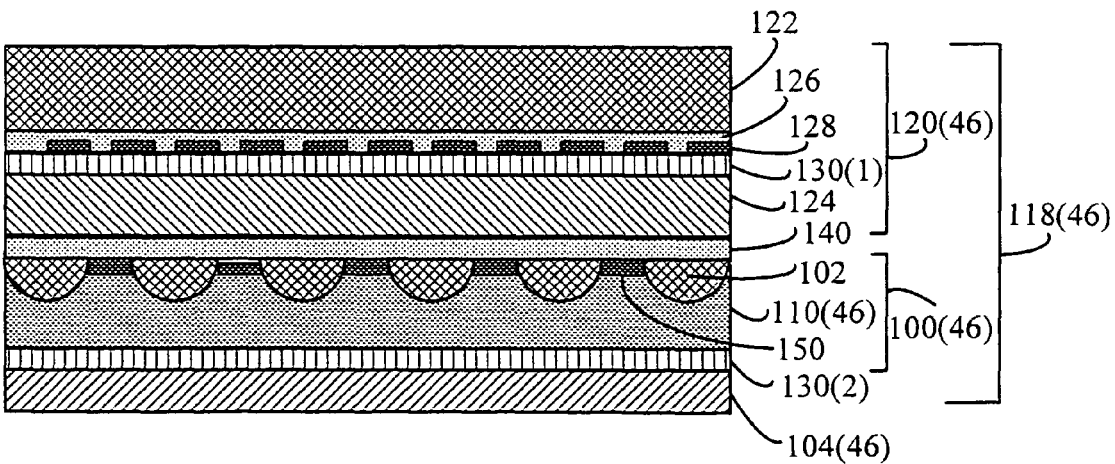
FIG. 46 is a side sectioned view of an image display device according to still another example embodiment.

Various embodiments previously described explain how transmissivity of a parallax optic can be selectively controlled. For example, some such embodiments incorporate a liquid crystal layer as part of the parallax optic to control transmissivity (in addition to a separate liquid crystal layer used to provide the displayed image itself). The regions of non-transmissivity of the parallax optic of the embodiments such as those of FIG. 35-FIG. 39 can also incorporate selective non-transmissivity by utilizing liquid crystals in the regions between lens elements. FIG. 46 shows a non-limiting example of one such embodiment, and particularly an image display device 118(46) comprising image display element 120(46) and parallax optic 100(46).

The image display element 120(46) comprises thin film transistor substrate 122 and a counter substrate 124, with pixels of liquid crystal 126 and a color filter 128 formed between the thin film transistor substrate 122 and the counter substrate 124. In addition, a first polarizer 130(1) is formed between thin film transistor substrate 122 and a counter substrate 124. A second liquid crystal layer 140 is formed between counter substrate 124 and parallax optic 100(46). The parallax optic 100(46) comprises lens elements 102, which in turn are covered by spacer 110(46). The spacer 110(46) is, in turn, covered by a second polarizer 130(2). The second polarizer 130(2) can be covered by a further substrate 104(46). Thus, the lenses can be formed on a separate substrate, or the lenses could be formed directly onto the display substrate.

In the FIG. 46 example embodiment, regions 150 provided between lenses 102 may be switched on and off by operation of second liquid crystal layer 140. In particular, voltage is applied to the regions of the second liquid crystal layer 140 to change its properties such that it appears transparent. Polarizers 130(1) and 130(2) are provided for operation of the second liquid crystal layer 140, e.g., for polarizing of light and addressing regions of the second liquid crystal layer 140 (as understood from discussion of previous embodiments).

In embodiments of image display devices herein described wherein the parallax optic is outside of the image display element, it is understood that the parallax optic and the image display element can be formed separately and then united by appropriate techniques such as bonding, for example.

Figure 47:
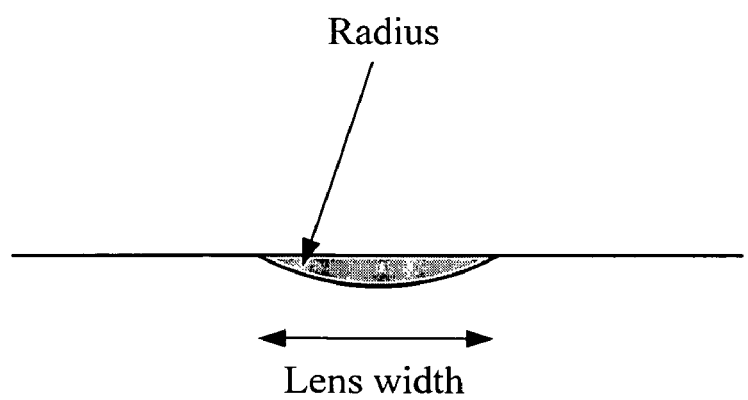
FIG. 47 is a schematic illustration of lens dimensions.

The lens elements of the parallax optics of the embodiments of FIG. 35 through FIG. 39 are formed as or located in an array. In some implementations of these embodiments, and the embodiments of the image display devices which incorporate or include these same, at least one parameter of the array is chosen for controlling the f-number of the array. For example, one or more of the following parameters for the lens array is chosen for controlling the f-number of the array: lens radius (e.g., the radius of each lens element); lens width, and lens refractive index. Lens radius and lens width are understood with reference to FIG. 47. In addition, the refractive index of materials surrounding the lens elements can also be chosen to control the f-number of the lens array.

Various embodiments been described above with reference to an image display element that comprises a liquid crystal layer. The invention is not, however, limited to this particular image display element and any suitable image display element may be used. As an example, an OLED (organic light-emitting device) image display element may be used.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A multiple view directional display comprising:
   an image display element, the image display element comprising:
      a first substrate;
      a second substrate; and
      an image display layer sandwiched between the first substrate and the second substrate, the image display layer comprising an array of pixels; and
   a parallax optic comprising plural spaced apart lenses, the parallax optic disposed adjacent to the image display layer,
   wherein the spaced apart lenses are separated by regions which are selectively non-transmissive to visible light, and
   wherein the regions which are selectively non-transmissive to visible light comprise a liquid crystal material.

2. A multiple view directional display comprising:
   an image display element, the image display element comprising:
      a first substrate;
      a second substrate; and
      an image display layer sandwiched between the first substrate and the second substrate, the image display layer comprising an array of pixels; and
   a parallax optic, positioned adjacent to the image display layer, the parallax optic for providing multiple-view directionality, the parallax, optic comprising plural spaced apart lenses,
   wherein the spaced apart lenses are separated by regions which are selectively non-transmissive to visible light,
   wherein the regions which are selectively non-transmissive to visible light comprise a liquid crystal material.

3. A multiple view directional display comprising:
   an image display element, the image display element comprising:
      a first substrate;
      a second substrate;
      a third substrate adhered to the second substrate, the third substrate comprising a parallax optic for providing multiple-view directionality; and
      an image display layer disposed adjacent the second substrate and sandwiched between the first substrate and the second substrate, the image display layer comprising an array of pixels;
   wherein the parallax optic of the third substrate is positioned adjacent to the second substrate of the image display element, and wherein the parallax optic facilitates the second substrate having a thickness of 400 microns or less,
   wherein the parallax optic comprises:
      a lens array; and
      light non-transmissive regions provided between lenticules of the array.

4. A display as claimed in claim 3 wherein the lenticules are spaced apart discrete lenses.

5. A display as claimed in claim 3 wherein the lenticules are formed as convex elements on a lenticule layer.

6. A display as claimed in claim 3 wherein the lenticules are disposed within the image display element.

7. A display as claimed in claim 3 wherein the lenticules are disposed outside the image display element.

8. A display as claimed in claim 3 wherein the light non-transmissive mask does not extend beyond a height or extent of projection of the lenticules of the array.

9. A display as claimed in claim 3 wherein the light non-transmissive mask lies in a plane that extends through the lenticules of the array.

10. A multiple view directional display comprising:
an image display element, the image display element comprising:
a first substrate;
a second substrate; and
an image display layer sandwiched between the first substrate and the second substrate, the image display layer comprising an array of pixels; and
a parallax optic disposed adjacent to the image display layer, the parallax optic comprising:
a lens array; and
a light non-transmissive mask provided between lenticules of the array;
wherein the light non-transmissive mask does not extend beyond a height or extent of projection of the lenticules of the array.

11. A display as claimed in claim 10, wherein the lenticles of the array are separated by regions which are selectively non-transmissive to visible light.

12. A display as claimed in claim 11, wherein the regions which are selectively non-transmissive to visible light comprise a liquid crystal display.

13. A multiple view directional display comprising:
an image display element, the image display element comprising:
a first substrate;
a second substrate; and
an image display layer sandwiched between the first substrate and the second substrate, the image display layer comprising an array of pixels; and
a parallax optic disposed adjacent to the image display layer, the parallax optic comprising:
a lens array; and
a light non-transmissive mask provided between lenticules of the array;
wherein the light non-transmissive mask lies in a plane that extends through the lenticules of the array.

14. A multiple view directional display comprising:
an image display element, the image display element comprising:
a first substrate;
a second substrate; and
an image display layer sandwiched between the first substrate and the second substrate, the image display layer comprising an array of pixels; and
a parallax optic positioned adjacent to the image display layer, the parallax optic for providing multiple-view directionality, the parallax optic comprising plural spaced apart lenses, the spaced apart lenses being separated by regions which are non-transmissive to visible light;
wherein the non-transmissive regions do not extend beyond a height or extent of projection of the plural spaced apart lenses.

15. A multiple view directional display comprising:
an image display element, the image display element comprising:
a first substrate;
a second substrate; and
an image display layer sandwiched between the first substrate and the second substrate, the image display layer comprising an array of pixels; and
a parallax optic positioned adjacent to the image display layer, the parallax optic for providing multiple-view directionality, the parallax optic comprising plural spaced apart lenses, the spaced apart lenses being separated by regions which are non-transmissive to visible light;
wherein the non-transmissive regions lie in a plane that extends through the plural spaced apart lenses.

16. A parallax optic for use with an image display device comprising a first substrate, a second substrate and an image display layer sandwiched between the first substrate and the second substrate, the image display layer comprising an array of pixels, the parallax optic comprising:
a lens array; and
a light non-transmissive mask provided between lenticules of the array,
wherein the parallax optic is disposed adjacent to the image display layer;
wherein the light non-transmissive mask does not extend beyond a height or extent of projection of the lenticules of the array.

17. A parallax optic for use with an image display device comprising a first substrate, a second substrate and an image display layer sandwiched between the first substrate and the second substrate, the image display layer comprising an array of pixels, the parallax optic comprising:
a lens array; and
a light non-transmissive mask provided between lenticules of the array,
wherein the parallax optic is disposed adjacent to the image display layer;
wherein the light non-transmissive mask lies in a plane that extends through the lenticules of the array.

18. A parallax optic for use with an image display element comprising a first substrate, a second substrate and an image display layer sandwiched between the first substrate and second substrate, the image display layer comprising an array of pixels for providing multiple-view directionality, and the parallax optic comprising:
plural spaced apart lenses, the spaced apart lenses being separated by regions which are non-transmissive to visible light,
wherein the parallax optic is positioned adjacent to the image display layer; and
wherein the non-transmissive regions do not extend beyond a height or extent of projection of the spaced apart lenses.

19. A parallax optic for use with an image display element comprising a first substrate, a second substrate and an image display layer sandwiched between the first substrate and second substrate, the image display layer comprising an array of pixels for providing multiple-view directionality, and the parallax optic comprising:
plural spaced apart lenses, the spaced apart lenses being separated by regions which are non-transmissive to visible light,
wherein the parallax optic is positioned adjacent to the image display layer; and
wherein the non-transmissive regions lie in a plane that extends through the spaced apart lenses.

20. A multiple view directional display comprising:
an image display element, the image display element comprising:
a first substrate;

a second substrate;

a third substrate adhered to the second substrate; and an image display layer disposed adjacent the second substrate and sandwiched between the first substrate and the second substrate, the image display layer comprising an array of pixels; and a parallax optic positioned outside the image display element and formed on the second substrate for providing multiple-view directionality, and wherein the parallax optic facilitates the second substrate having a thickness of 400 microns or less, wherein the parallax optic comprises:

a lens array; and light non-transmissive regions provided between lenticules of the array.

* * * * *